United States Patent [19]

Clark et al.

[11] Patent Number: 5,200,705
[45] Date of Patent: Apr. 6, 1993

[54] DIPMETER APPARATUS AND METHOD USING TRANSDUCER ARRAY HAVING LONGITUDINALLY SPACED TRANSDUCERS

[75] Inventors: Brian Clark, Missouri City; Stephen D. Bonner, Sugar Land; Jacques Jundt, Missouri City, all of Tex.; Martin Luling, Danbury, Conn.; Richard A. Rosthal, Houston, Tex.

[73] Assignee: Schlumberger Technology Corporation, Houston, Tex.

[21] Appl. No.: 786,138

[22] Filed: Oct. 31, 1991

[51] Int. Cl.⁵ .................... G01V 3/18; G01V 3/38; E21B 47/12; E21B 49/00
[52] U.S. Cl. .................... 324/338; 73/152; 175/50; 324/347; 324/369; 364/422
[58] Field of Search ........... 324/323, 338, 339, 343, 324/347, 351, 355, 356, 366, 369, 371, 375; 73/151, 152; 181/102, 105; 250/254, 264–266; 175/40, 50; 364/422; 367/25, 35

[56] References Cited

U.S. PATENT DOCUMENTS

| | | |
|---|---|---|
| 3,186,222 | 6/1965 | Martin . |
| 3,187,252 | 6/1965 | Hungerford ............ 324/343 |
| 3,305,771 | 2/1967 | Arps . |
| 3,408,561 | 10/1968 | Redwine et al. . |
| 3,967,201 | 6/1976 | Rorden . |
| 4,360,777 | 11/1982 | Segesman ............ 324/339 |
| 4,553,097 | 11/1985 | Clark ............ 324/338 |
| 4,567,759 | 2/1986 | Ekstrom et al. ............ 73/152 |
| 4,578,675 | 3/1986 | MacLeod ............ 340/855 |
| 4,692,908 | 9/1987 | Ekstrom et al. ............ 367/27 |
| 4,725,837 | 2/1988 | Rubin ............ 340/855 |
| 4,739,325 | 4/1988 | MacLeod ............ 340/854 |
| 4,747,303 | 5/1988 | Fontenot ............ 73/152 |
| 4,786,874 | 11/1988 | Grosso et al. ............ 324/369 |
| 4,839,644 | 6/1989 | Safinya et al. ............ 340/854 |
| 4,979,151 | 12/1990 | Ekstrom et al. ............ 367/35 |
| 5,017,778 | 5/1991 | Wraight ............ 250/254 |
| 5,045,795 | 9/1991 | Gianzero et al. ............ 324/369 X |

FOREIGN PATENT DOCUMENTS 685727 5/1964 Canada ............ 324/373

OTHER PUBLICATIONS

S. Gianzero et al., "A New Resistivity Tool for Measurement-While-Drilling", SPWLA Twenty-Sixth Annual Logging Symposium, Jun. 17–20, 1985, pp. 1–22.
T. I. F. Grupping, et al., "Performance Update of a Dual-Resistivity MWD Tool with Some Promising Results in Oil-Based Mud Applications", SPE 18115, pp. 73–85, Oct. 2–5, 1988, Houston, Tex.
T. I. F. Grupping et al., "Recent Performance of the Dual-Resistivity MWD Tool", SPE Formation Evaluation, pp. 171–176, Jun. 1990.
S. Gianzero, et al., "Determining the Invasion Near the Bit with the MWD Toroid Sonde", SPWLA Twenty-Seventh Annual Logging Symposium, pp. 1–17, Jun. 9–13, 1986.
"Dipmeter Interpretation", Volume I–Fundamentals, pp. 1–60, 1971, Schlumberger Ltd. Publication.
"Diplog-Analysis and Practical Geology", pp. 1–57, 1983, Dresser Atlas Publication.

Primary Examiner—Gerard R. Strecker
Attorney, Agent, or Firm—Martin M. Novack; John J. Ryberg; Wayne Kanak

[57] ABSTRACT

A disclosed embodiment utilizes one or more toroidal coil antennas mounted, in an insulating medium, on a drill collar to induce currents which travel in a path that includes the drill collar and earth formations around the drill collar. At least one array of electrodes is provided on at least one stabilizer blade of the drill collar and is utilized to detect currents transmitted by toroidal coil antennas which return via the formations to the electrodes laterally; that is, approximately normal to the axis of the drill collar. Signal traces are obtained from measurements taken at respective ones of the transducers, and a dip characteristic of the formations is determined from the signal traces and from signals representing the rotational orientation of the drill collar.

86 Claims, 38 Drawing Sheets

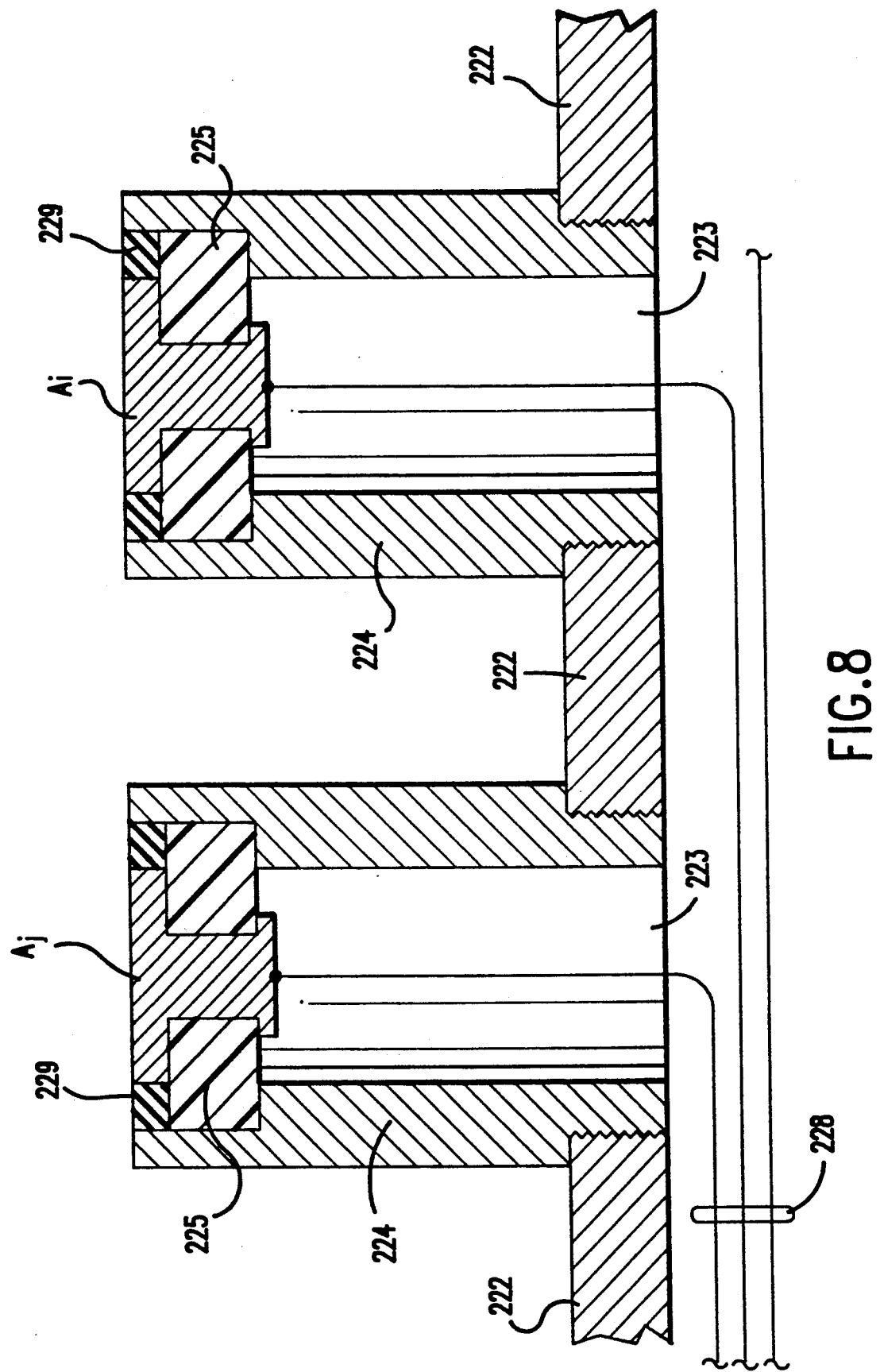

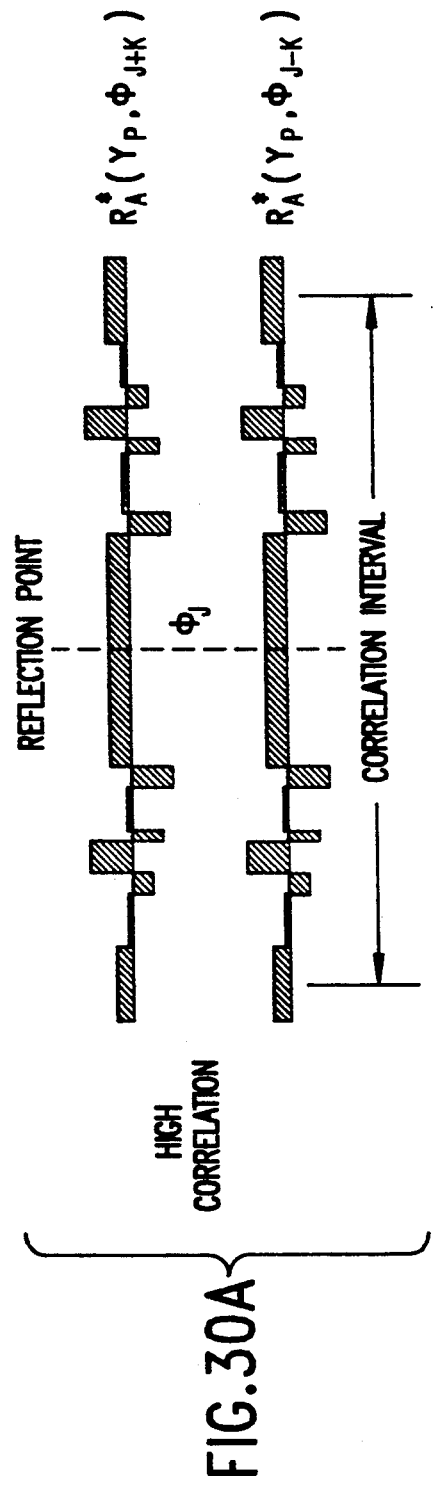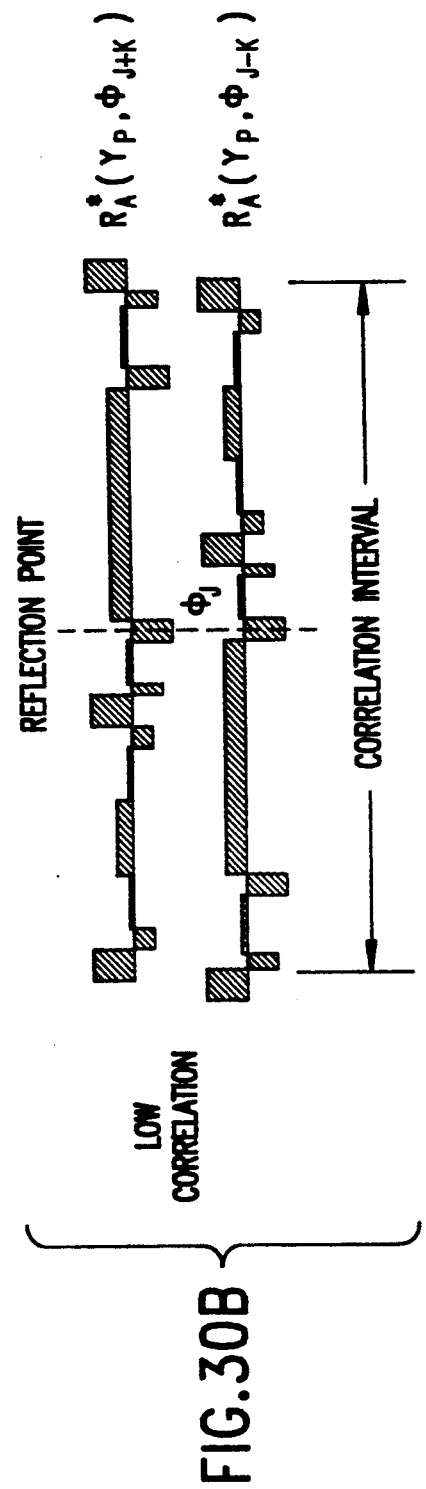

DIPMETER APPARATUS AND METHOD USING TRANSDUCER ARRAY HAVING LONGITUDINALLY SPACED TRANSDUCERS

RELATED APPLICATIONS

The present application is generally related to copending U.S. Pat. application Ser. Nos. 786,137, and 786,199, both filed of even date herewith, and both assigned to the same assignee as the present application.

1. Field of the Invention

This invention relates to the field of well logging and, more particularly, to well logging methods and apparatus for determining dip characteristics of dipping beds in earth formations surrounding a borehole. Aspects of the invention have general application to the well logging art, but the invention is particularly useful for logging-while-drilling (also called measurement-while-drilling).

2. Background of the Invention

In the well logging of earth boreholes it is common practice to lower various types of investigating devices into the borehole for measuring properties of subsurface earth formations surrounding the borehole. In so-called "wireline" well logging, measurements are taken in a well bore (with the drill string removed) by lowering a logging device in the well bore on a wireline cable and taking measurements with the device as the cable is withdrawn.

An important type of wireline investigating device is a so-called "dipmeter" logging device that measures, among the other things, the angular dipping of geological formation beds intersecting the well bore. A form of wireline dipmeter which is in common use includes three or more pad members that are symmetrically disposed around an elongated housing on arm members. In operation, the arm members act to push the pad members against the borehole wall. The wall-engaging face of each pad member includes one or more electrodes which are used to measure the electrical resistivity or conductivity of the earth formation material in the immediate vicinity thereof. This provides three or more resistivity measurements taken on three sides of the borehole. By correlating the three or more sets of measurements which are obtained as the entire apparatus is moved longitudinally through the borehole, it is possible to determine the dip angles and directions of subsurface earth strata. In general, the greater the dip of the strata, the greater is the difference in vertical depth at which corresponding resistivity changes are measured on the three or more sides of the borehole.

Wireline dipmeters measurements are widely used for determining formation dip relative to the horizontal and to magnetic North. Wireline dipmeters measure deviation of the wellbore from vertical, orientation of the borehole's deviation with respect to magnetic North, and at least three micro-resistivities and their orientation with respect to magnetic North. Typical dipmeter applications include: determining regional dip, identifying geological features such as faults, unconformities, channels, sand bars, or reefs, and identifying and quantifying fractures and thin beds. Geological data derived from dipmeter logs are used to understand the structure of the formations penetrated by the well, to determine if the well has been drilled in the correct location, to determine if the well is on course, to evaluate the well, to plan well completion, and to determine where to drill other wells in the field.

A dipmeter measurement made while drilling (i.e., without the need for withdrawing the drill string) would have very important application because it would provide critical information to the geologist and driller while the drilling is taking place. This information could be used immediately to change the well trajectory, or to take safety precautions. Such a measurement-while-drilling (MWD) dipmeter would be particularly useful in drilling horizontal wells for steering, or for locating fractures. However, conventional wireline dipmeter technology has not been practically applicable to a dipmeter for measurement-while-drilling for several reasons.

First, the micro-resistivities measured by a conventional wireline dipmeter require at least three moveable mechanical arms on the dipmeter sonde. Each mechanical arm expands and holds its pad firmly against the borehole wall as the dipmeter is pulled by the wireline cable upward through the borehole. Moveable arms for pads would be impractical for MWD because the mechanical environment is very severe, and movable arms would be easily broken.

Second, wireline dipmeter pads are typically electrically isolated from the main body of the dipmeter, and the currents emitted from the micro-resistivity electrodes are returned to the dipmeter sonde several feet distance from the pad. The standard wireline dipmeter tool has a length of insulating material on the sonde to prevent the currents from returning too close to the pads. This length of insulating material is impractical for MWD because of the hostile drilling environment which would damage or destroy the insulating material. Furthermore, the wireline design requires the pad to be electrically isolated from the sonde body. It would be difficult if not impossible to electrically isolate a pad from the drill collar body of an MWD logging device and still retain the necessary ruggedness.

A third problem is a depth measurement for the MWD tool while it is downhole. MWD telemetry rates are too slow to send several microresistivity traces to the surface for dip processing every few feet. Downhole dipmeter processing would imply a downhole depth measurement, which MWD tools normally cannot provide. Presently, depth is a surface measurement, typically based on hook load, traveling block height, and drill string length measurements. These measurements are processed at the surface to give bit depth versus time, which cannot presently be communicated to the MWD tool downhole. MWD tools are normally ignorant of their depth in the hole, and record data versus time. The MWD data is recorded downhole in the tool versus time, and/or sent uphole via mud pulse. In either case, depth is added to the data when the data is received at surface (via mud pulse or memory dump). Accordingly, downhole dip processing which requires depth information is problematic.

A fourth problem is that a very precise depth measurement is normally required for a dipmeter log. In a wireline dipmeter, resistivity traces are obtained by pulling the dipmeter out of the borehole while measuring the resistivity in front of three or more pads. Typically, the relative depth accuracy among the resistivity traces over a distance of a few feet must be better than an inch. For example, a 1 inch depth error over a 1 foot distance, would result in a 2 degree error in dip for a 54 degree dipping bed. So-called speed buttons, accelerometers, and special processing techniques are commonly used to improve the accuracy of the depth measurement for wireline dipmeters. Even if the depth information were available to the downhole tool, MWD depth measurements are generally less accurate than wireline depth measurements for several reasons, including compression of the drill string with weight on bit, limited accuracy of the traveling block measurement, and inaccurate knowledge of the precise drill string length.

It is among the objects of the present invention to provide a dipmeter for measuring-while-drilling which overcomes these problems.

There are several techniques of resistivity logging used in dipmeters and other logging applications which employ elements such as electrodes or coils. Various arrangements of electrodes, on the logging device and at the earth's surface, have been utilized to measure electrical currents and/or potentials from which formation resistivity can be derived. For example, in dipmeters and in various other resistivity measuring devices, button electrodes have been employed on a pad which is urged against the borehole wall. These electrodes have been used to obtain azimuthal resistivity measurements, and focusing techniques have been employed to obtain resistivity measurements that have substantial lateral extent into the formations and provide relatively high vertical resolution resistivity information.

Various techniques for measuring resistivity while drilling have also been utilized or proposed. For reasons similar to those advanced above with regard to dipmeters, particularly the hostile environment, general resistivity measuring techniques employed in wireline logging may or may not be adaptable for use in a measuring-while-drilling equipment. One resistivity measuring approach for MWD is to utilize a plurality of toroidal coil antennas, spaced apart, that are mounted in insulating media around a drill collar or recessed regions thereof. A transmitting antenna of this nature radiates electromagnetic energy having a dominant transverse magnetic component, and can use the electrically conductive body of the drill collar to good advantage, as described next.

In U.S. Pat. No. 3,408,561 there is disclosed a logging-while-drilling system wherein a receiving toroidal coil is mounted in a recess on a drill collar near the drill bit and a transmitting toroidal coil is mounted on the drill collar above the receiver coil. The drill collar serves as part of a one-turn "secondary winding" for the toroidal antennas, the remainder of such "secondary winding" including a current return path through the mud and formations. The voltage induced in the receiver toroidal coil provides an indication of the resistivity of formations around the drill bit. U.S. Pat. No. 3,305,771 utilizes a similar principal, but employs a pair of spaced-apart transmitting toroidal coils and a pair of spaced-apart receiving toroidal coils between the transmitting toroidal coils.

As generally described in the prior art, a transmitter toroidal coil mounted on a drill collar induces current in the drill collar which can be envisioned as leaving the drill collar, entering the formations below the transmitter coil, and returning to the drill string above the transmitter coil. Since the drill collar below the transmitter coil is substantially an equipotential surface, a portion of the current measured by a lower receiver toroidal coil mounted near the drill bit tends to be laterally focused. This can provide a "lateral" resistivity measurement of formations adjacent the drill collar. Also, a portion of current leaving the drill stem below the receiver coil (mostly where the bit contacts the formations) provides a "bit resistivity" measurement; that is, a measurement of the resistivity of the formations instantaneously being cut by the bit. (See, for example, the above-identified U.S. Pat. Nos. 3,408,561 and 3,305,771, and publications entitled "A New Resistivity Tool For Measurement While Drilling", SPWLA Twenty-Sixth Annual Logging Symposium (1985) and "Determining The Invasion Near The Bit With The MWD Toroid Sonde", SPWLA Twenty-Seventh Annual Logging Symposium (1986).) Thus, the prior art indicates that a measuring-while-drilling logging device using toroidal coil transmitting and receiving antennas can be employed to obtain lateral resistivity measurements and/or bit resistivity measurements.

Reference can also be made to the following which relate to measurement-while-drilling using electrodes and other transducers: U.S. Pat. No. 4,786,874, U.S. Pat. No. 5,017,778, and copending U.S. Pat. application Ser. No. 525,268, filed May 16, 1990, now U.S. Pat. No. 5,130,950, assigned to the same assignee as the present application.

Resistivity measurements obtained using transmitting and receiving toroidal coils on a conductive metal body are useful, particularly in measuring-while-drilling applications, but it would be desirable to obtain measurements which can provide further information concerning the downhole formations; for example, lateral resistivity information having improved vertical resolution and azimuthal resistivity information useful in dipmeter logging. It is among the further objects of the present invention to devise equipment which can provide such further resistivity measurement information for dipmeter logging.

SUMMARY OF THE INVENTION

A form of the present invention utilizes one or more toroidal coil antennas mounted, in an insulating medium, on a drill collar to induce currents which travel in a path that includes the drill collar and earth formations around the drill collar. As is known in the art, one or more toroidal coil receiving antennas can be mounted, in an insulating medium, on the drill collar to obtain the types of measurements described in the Background hereof. A form of the present invention expands on the toroid-to-toroid type of measurement to obtain further useful information about the downhole formations. In accordance with a feature of this form of the invention, at least one array of electrodes is provided on at least one stabilizer blade of the drill collar and is utilized to detect currents transmitted by the transmitter toroidal coil antennas which return via the formations to the electrodes laterally; that is, approximately normal to the axis of the drill collar. The electrodes preferably have relatively small vertical and circumferential extents, and the toroid-to-electrode measurements taken with these electrodes are useful in obtaining formation resistivity with relatively high vertical and azimuthal resolution.

The invention overcomes obstacles to a practical MWD dipmeter that were summarized in the Background hereof. Providing electrodes on one or more stabilizer blades permits measurements in close proximity to the borehole wall without the need for moveable arms. The prior art problem of electrical isolation of pads from a dipmeter sonde is overcome by using the toroid-to-electrode approach with the toroidal coil antennas preferably mounted on the drill collar at opposite ends of the stabilizer blades. There is no need to electrically isolate the stabilizer blades from the drill collar (nor could this practically be done) and, as will be described, it is only necessary to mount the electrodes in insulating media in the stabilizer blade(s) with a small surface area of insulation exposed to the borehole environment.

In a form of the invention the depth measurement obstacles to an MWD dipmeter are overcome by making substantially simultaneous resistivity measurements at different depths (i.e., from different electrodes of an array) using one or more electrode arrays. Electrodes in these arrays have known spacings and positions on the stabilizer blades. Each array can produce a nearly instantaneous resistivity trace, before the measurement subassembly has moved significantly in the borehole. Thus, in this form of the invention the geometries of the arrays can be used in computing dip characteristics, rather than depth derived from a surface measurement.

In accordance with an embodiment of the invention, there is provided a measuring-while-drilling system for determining a dip characteristic of formations surrounding a borehole being drilled by a drill bit at the end of a drill string. A drill collar is provided in the drill string, and a stabilizer blade is mounted on the drill collar. (As used herein, the term "drill collar" is used generically, and not in a limiting sense, to mean a section of the drill string on which equipment can be mounted. Also, as used herein, "mounted on" and "mounted in" are both intended to generically include "mounted on or in", and "disposed on" and "disposed in"are both intended to generically include "disposed on or in".) A stabilizer blade is mounted on the drill collar, and a plurality of transducers are mounted in the stabilizer blade, the transducers having respectively different locations along the longitudinal direction of the drill collar. Means are provided for producing indications of the relative rotational orientation of the drill collar. Means coupled with the transducers are provided for generating a plurality of signals from measurements taken at respective ones of the plurality of transducers. Means are then provided for determining a dip characteristic of the formations from the plurality of signals and the orientation indications.

In one preferred embodiment of the invention, the stabilizer blade comprises a metal blade, and the transducers are metal button electrodes mounted in insulating media in the blade. A toroidal coil antenna is disposed on said drill collar, and means are provided for energizing the toroidal coil antenna to induce a current which travels in a path that includes the drill collar and the formations. In this embodiment, the means for generating signals comprises means for measuring the electrical effect of said current on the electrodes to obtain the resistivity of the formation in the region generally opposing the electrode. (In the present application, any references to the determination or use of resistivity are intended to generically mean conductivity as well, and vice versa. These quantities are reciprocals, and mention of one or the other herein is for convenience of description, and not intended in a limiting sense.)

In a form of the invention, the maximum dip angle that can be determined without axial movement depends on the length of the transducer array, and a feature hereof permits determination of large dip angles by combining or appending measurement data taken at different axial positions of the measurement subassembly. A correlation technique is utilized to determine longitudinal offset between measurements taken at different axial locations of the measurement subassembly, and the offset is used in combining the signals. The combined signal can then be used in determining formation dip characteristics when relatively large dip angles are encountered.

In a further form of the invention, measurement signals from two or more longitudinally spaced electrodes are utilized to obtain azimuthal resistivity measurements around the borehole by exploiting the natural rotation of the drill string, or a portion thereof. This embodiment can be used to determine dip angles that approach 90 degrees. The general technique comprises the following steps: providing first and second spaced apart transducers on the drill string, the transducers having respectively different locations along the longitudinal direction of the drill string; producing indications of the relative rotational orientation of the drill string in the region where the transducers are located; generating first and second signals from measurements taken at the first and second transducers, respectively; and determining a dip characteristic of the formations from the first and second signals and the orientation indications.

In a preferred embodiment of this form of the invention, the first and second signals are generated during rotation of the electrodes, and the step of determining a dip characteristic of the formations includes correlating at least one of the signals with a reversed version of itself to determine a dip direction of the formations. The first and second signals can be correlated to determine an angular offset therebetween to obtain the formation dip angle. Signals from further electrodes, generated during rotation of the electrodes, can be included in the correlation to obtain dip characteristics.

Further features and advantages of the invention will become more readily apparent from the following detailed description when taken in conjunction with the accompanying drawings.

BRIEF DESCRIPTION OF THE DRAWINGS

FIG. 8 is a cross-sectional view of electrode buttons mounted on a strip in accordance with an embodiment of the invention.

FIGS. 30A and 30B illustrate the correlation of the resistivity plot of FIG. 29 with its mirror image.

DETAILED DESCRIPTION

Figure 1:
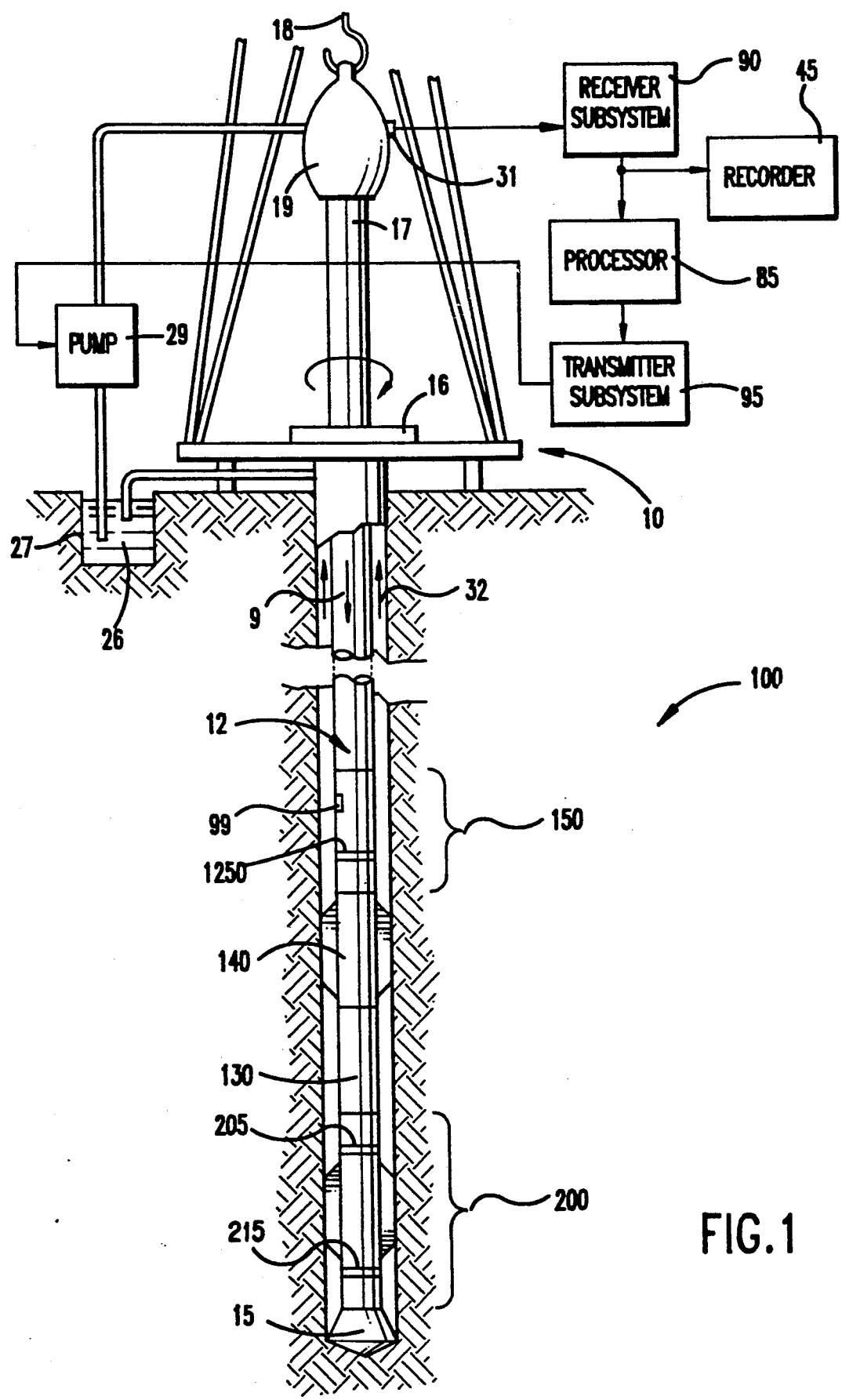
FIG. 1 is a schematic diagram, partially in block form, of a measuring-while-drilling apparatus in accordance with an embodiment of the invention, and which can be used in practicing embodiments of the method of the invention.

Referring to FIG. 1, there is illustrated an embodiment of the invention in the form of a measurement-while-drilling apparatus. (As used herein, and unless otherwise specified, measurement-while-drilling (also called measuring-while-drilling or logging-while-drilling) is intended to include the taking of measurements in an earth borehole, with the drill bit and at least some of the drill string in the borehole, during drilling, pausing, and/or tripping.) A platform and derrick 10 are positioned over a borehole that is formed in the earth by rotary drilling. A drill string 12 is suspended within the borehole and includes a drill bit 15 at its lower end. The drill string 12 and the drill bit 15 attached thereto are rotated by a rotating table 16 (energized by means not shown) which engages a kelly 17 at the upper end of the drill string. The drill string is suspended from a hook 18 attached to a travelling block (not shown). The kelly is connected to the hook through a rotary swivel 19 which permits rotation of the drill string relative to the hook. Alternatively, the drill string 12 and drill bit 15 may be rotated from the surface by a "top drive" type of drilling rig. Drilling fluid or mud 26 is contained in a pit 27 in the earth. A pump 29 pumps the drilling fluid into the drill string via a port in the swivel 19 to flow downward (arrow 9) through the center of drill string 12. The drilling fluid exits the drill string via ports in the drill bit 15 and then circulates upward in the region between the outside of the drill string and the periphery of the borehole, commonly referred to as the annulus, as indicated by flow arrows 32. The drilling fluid thereby lubricates the bit and carries formation cuttings to the surface of the earth. The drilling fluid is returned to the pit 27 for recirculation. An optional directional drilling assembly (not shown) with a mud motor having a bent housing or an offset sub could also be employed.

Mounted within the drill string 12, preferably near the drill bit 15, is a bottom hole assembly 100 which includes capabilities for measuring, processing, and storing information, and communicating with the earth's surface. (As used herein, near the drill bit means within several drill collar lengths from the drill bit.) The assembly 100 includes a measuring and local communications apparatus 200 which is described further hereinbelow. In the example of the illustrated bottom hole arrangement, a drill collar 130 and a stabilizer collar 140 are shown successively above the apparatus 200. The collar 130 may be, for example, a pony collar or a collar housing measuring apparatus which performs measurement functions other than those described herein. The need for or desirability of a stabilizer collar such as 140 will depend on drilling parameters. Located above stabilizer collar 140 is a surface/local communications subassembly 150. The subassembly 150, described in the abovereferenced copending U.S. Pat. application Ser. No. 786,137, incorporated herein by reference, includes a toroidal antenna 1250 used for local communication with the apparatus 200, and a known type of acoustic communication system that communicates with a similar system at the earth's surface via signals carried in the drilling fluid or mud. The surface communication system in subassembly 150 includes an acoustic transmitter which generates an acoustic signal in the drilling fluid that is typically representative of measured downhole parameters. One suitable type of acoustic transmitter employs a device known as a "mud siren" which includes a slotted stator and a slotted rotor that rotates and repeatedly interrupts the flow of drilling fluid to establish a desired acoustic wave signal in the drilling fluid. The driving electronics in subassembly 150 may include a suitable modulator, such as a phase shift keying (PSK) modulator, which conventionally produces driving signals for application to the mud transmitter. These driving signals can be used to apply appropriate modulation to the mud siren. The generated acoustic mud wave travels upward in the fluid through the center of the drill string at the speed of sound in the fluid. The acoustic wave is received at the surface of the earth by transducers represented by reference numeral 31.

The transducers, which are, for example, piezoelectric transducers, convert the received acoustic signals to electronic signals. The output of the transducers 31 is coupled to the uphole receiving subsystem 90 which is operative to demodulate the transmitted signals, which can then be coupled to processor 85 and recorder 45. An uphole transmitting subsystem 95 can also be provided, and can control interruption of the operation of pump 29 in a manner which is detectable by transducers in the subassembly 150 (represented at 99), so that there is two way communication between the subassembly 150 and the uphole equipment. The subsystem 150 may also conventionally include acquisition and processor electronics comprising a microprocessor system (with associated memory, clock and timing circuitry, and interface circuitry) capable of storing data from a measuring apparatus, processing the data and storing the results, and coupling any desired portion of the information it contains to the transmitter control and driving electronics for transmission to the surface. A battery may provide downhole power for this subassembly. As known in the art, a downhole generator (not shown) such as a so-called "mud turbine" powered by the drilling fluid, can also be utilized to provide power, for immediate use or battery recharging, during drilling. It will be understood that alternative acoustic or other techniques can be employed for communication with the surface of the earth.

Figure 2:
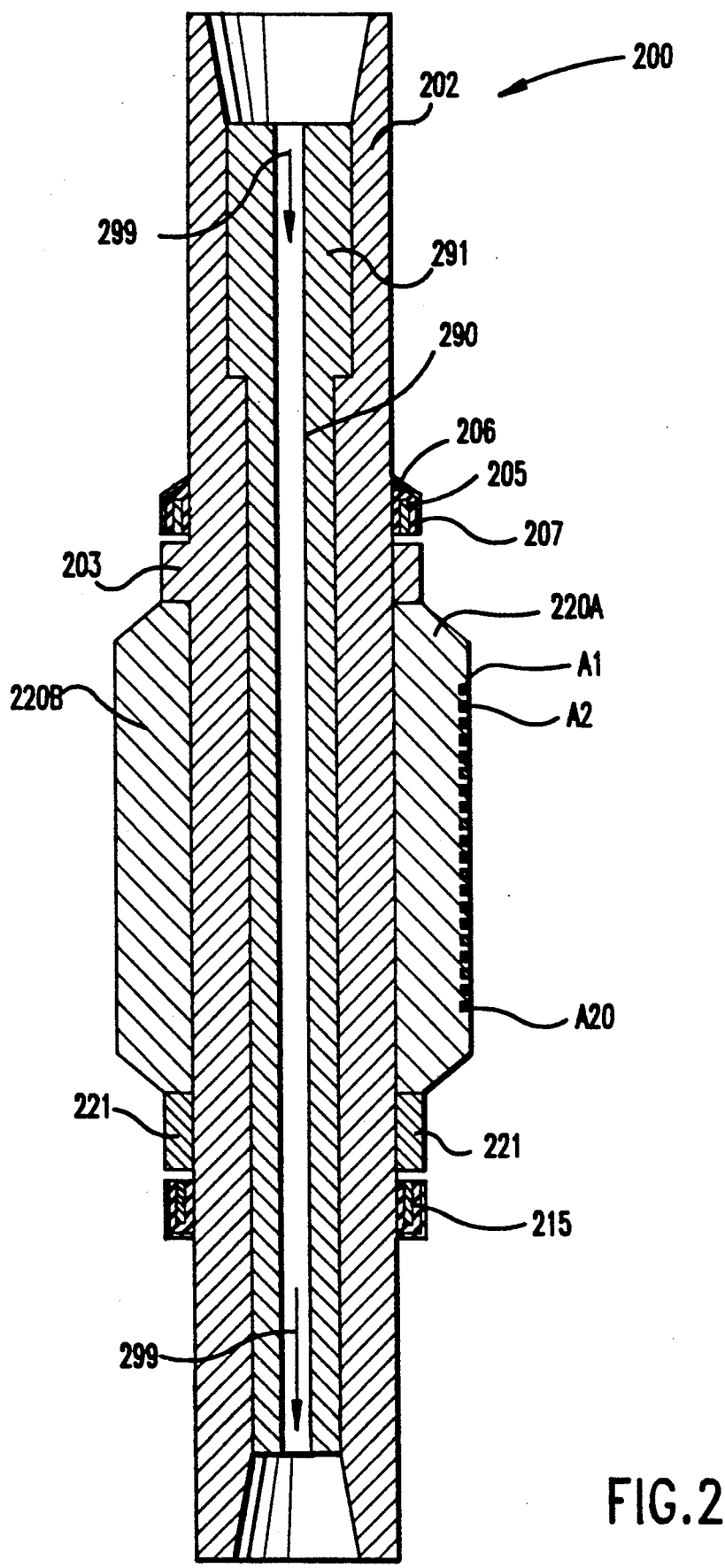
FIG. 2 a cross-sectional view of a measurement subassembly utilized in the determination of formation dip characteristics in accordance with an embodiment of the invention.

As seen in FIG. 2, the subsystem 200 includes a section of tubular drill collar 202 having mounted thereon a transmitting antenna 205, and receiving electrodes A1, A2 ... A20. In the present embodiment the transmitting antenna 205 comprises a toroidal antenna (see also FIG. 3) having coil turns wound on a ferromagnetic toroidal core that is concentric with the axis of the drill collar 202. The core may have a circular or rectangular cross-section, although other shapes can be used. As described hereinbelow, a second similar transmitter can be employed. The receiving electrodes A1, A2 ... A20 are button electrodes mounted in insulating media in a stabilizer blade 220A. A further stabilizer blade, 220B, is visible in FIGS. 2 and 3. As will be described, in embodiments hereof electrodes can be provided in a plurality of stabilizer blades.

Figure 3:
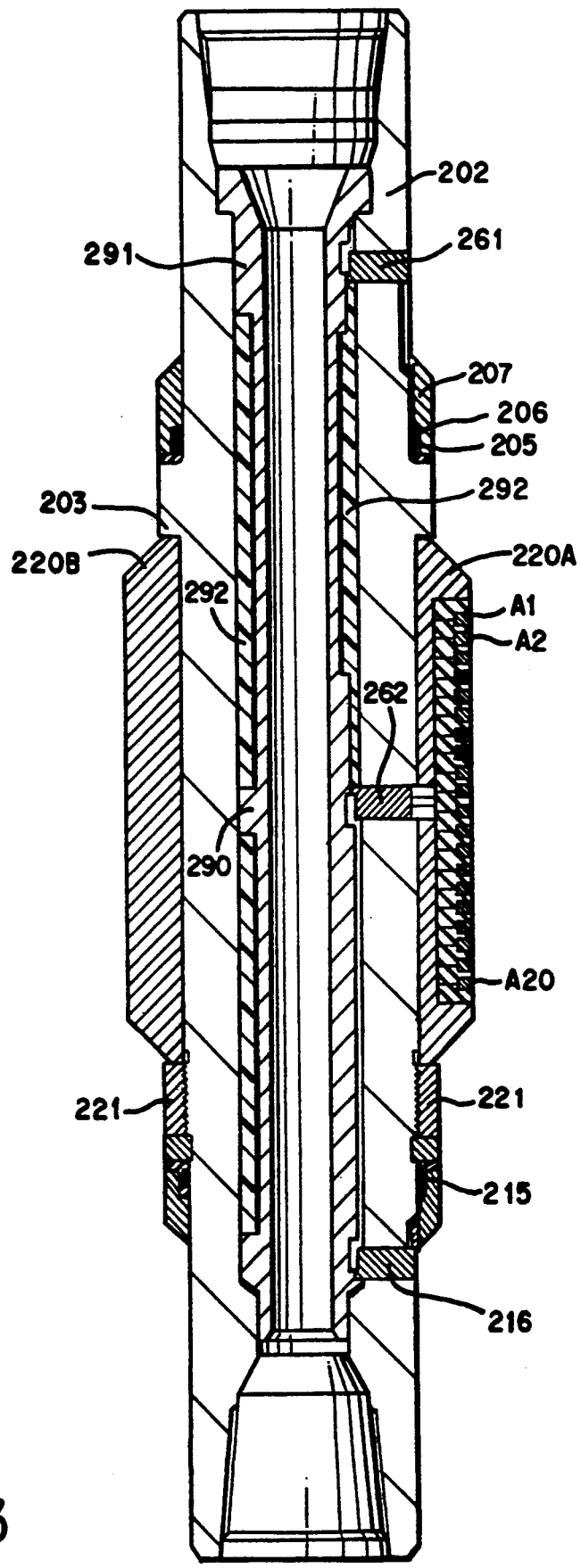
FIG. 3 is a cross-sectional view of a portion of the subassembly of FIG. 2, in greater detail.

Referring now to FIG. 3 as well as FIG. 2, there is illustrated further detail of the structure of the measurement and communication subsystem 200 that is housed in the drill collar 202. An annular chassis 290, which contains most of the electronics, fits within the drill collar 202. In this embodiment the drilling mud path is through the center of the chassis, as illustrated by arrows 299 (FIG. 2). The chassis 290 has a number of slots, such as for containment of batteries (at position 291, see FIG. 2) and circuit boards 292 (FIG. 3). In the disclosed embodiment, the circuit boards are in the form of elongated thin strips, and can accordingly be planar, it being understood that other circuit board configurations or circuit packaging can be utilized. The transmitting toroidal antenna 205 (which can also be utilized in a communications mode as a receiver) is supported in a suitable insulating medium, such as a fiberglass-epoxy composite or Viton rubber 206. The assembled coil, in the insulating medium, is mounted on the collar 202 in a subassembly which includes a protective tapered metal ring 207 that is secured to the collar surface such as by bolts. The antenna wiring, and other wiring, is coupled to the annular circuit assembly via bulkhead feedthroughs, as represented at 261 (for wiring to antenna 205), and 262 (for wiring to electrodes A1, A2 ... A20).

The stabilizer blades hereof are formed of steel, integral with a steel cylindrical sleeve that slides onto the drill collar 202 and abuts a shoulder 203 formed on the drill collar, and may have, for example, the type of keyed-on construction described in the abovereferenced copending U.S. Pat. application Ser. No. 786,199, incorporated herein by reference. The stabilizer is secured to collar 202 with lock nuts 221. Blades 220A and 220B are conventionally provided with hard facing surfaces, e.g. of tungsten carbide. The faces of button electrodes A1, A2 ... A20 have generally round (in this case, circular) peripheries which will be generally adjacent the borehole wall. The button electrode faces can have generally cylindrical curvatures to conform to the stabilizer surface or can have flat faces with surfaces that are slightly recessed from the stabilizer surface shape. These electrodes traverse only a small fraction of the total circumferential locus of the borehole and provide azimuthal resistivity measurements. Also, these electrodes have a vertical extent that is a very small fraction of the vertical dimension of the stabilizer on which they are mounted, and provide relatively high vertical resolution resistivity measurements. In the illustrated embodiment, the surfaces of electrodes A1, A2.... A20 have diameters of about one-half inch (1.27 cm). The electrodes are mounted in an insulating medium, such as Viton rubber, which isolates the electrode surface from the surface of the stabilizer blade 220A. A fiberglass epoxy composite can be used around the base of the electrode. The electrodes A1, A2.... A20 provide a return path from the formations to the collar 202, and the current is measured to determine lateral resistivity of the region of the formation generally opposing the electrode. The current return to the drill collar tends to be laterally focused (see also the above-referenced copending U.S. Pat. application Ser. No. 786,137).

Figure 4:
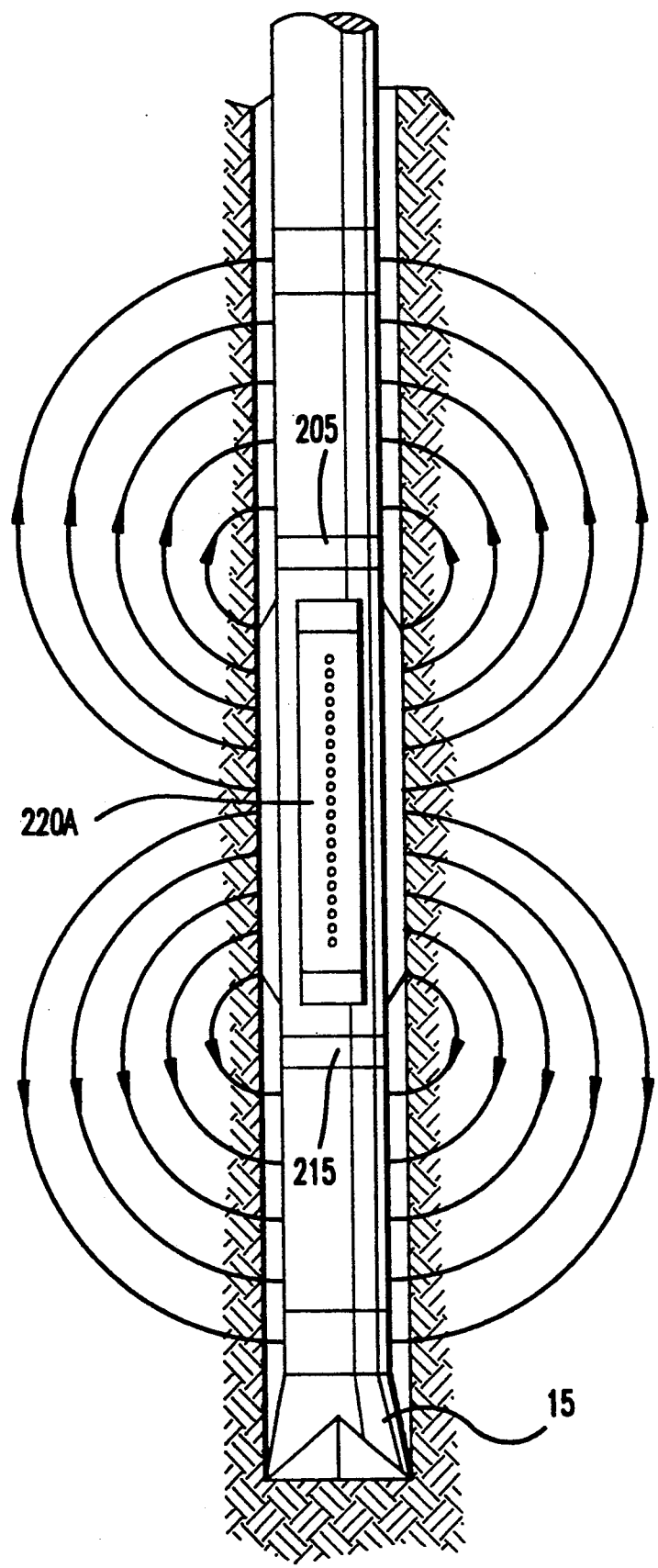
FIG. 4 shows a portion of the bottom hole assembly of FIG. 1, including toroidal coil transmitting antennas and a simplified representation of the electrical field pattern resulting therefrom.

A second toroidal coil transmitter 215 (which uses feedthrough 216), mounted below the stabilizers, and wired in series opposition with the toroidal coil transmitter 205, can be used to help equalize the current patterns and the effective depths of investigation of the electrodes over the length of the array. When the two toroidal coil antennas are energized with alternating current they produce opposite voltage drops across the drill collar at the two locations of the antennas. For example, the voltage on the stabilizer blade can be taken as V, and the drill collar above the upper toroidal antenna 205 and below the lower toroidal antenna 215 taken as ground. This arrangement causes currents to flow from the stabilized section into the formation, which return above the upper transformer and below the lower transformer, as illustrated in the simplified diagram of FIG. 4. (Of course, when the AC potential reverses the current paths will also reverse.) Frequencies of the order of 100 Hz to 1 MHz can be used, with frequencies in the low kilohertz range being generally preferred.

Figure 6:
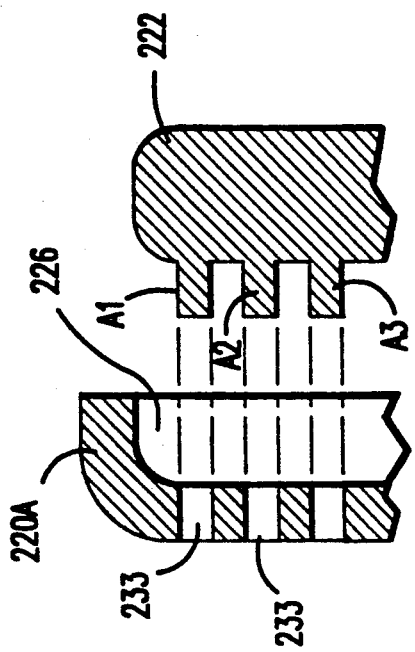
FIG. 6 shows a cross-sectional exploded view, as taken through a section defined by section lines 6—6 of FIG. 5, of the stabilizer blade and electrodes of the FIG. 5 embodiment.
Figure 7:
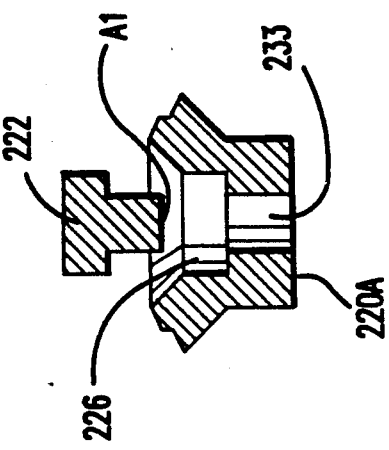
FIG. 7 shows a cross-sectional exploded view, as taken through a section defined by section lines 7—7 of FIG. 5, of the stabilizer blade and electrodes of the FIG. 5 embodiment.
Figure 5:
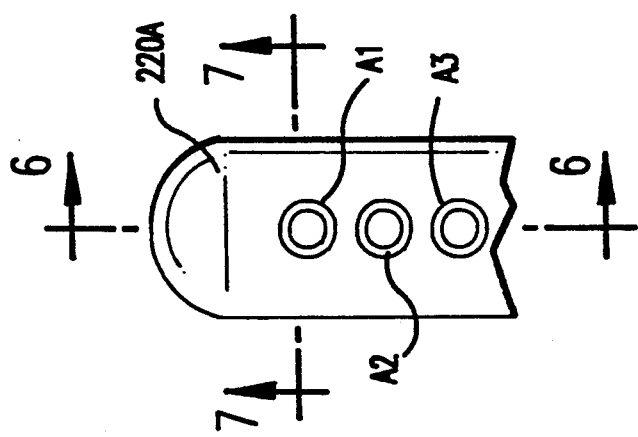
FIG. 5 illustrates a front view of a portion of a stabilizer blade and electrodes in accordance with an embodiment of the invention.

There are various ways in which the electrodes can be mounted in the stabilizer blade 220A. In an embodiment illustrated in FIGS. 5-8 a carrier strip 222, which may be formed of metal, has threaded openings 223 which receive threaded cylindrical shells 224 which may also be formed of metal. Each shell houses an electrode button (e.g. Ai Aj in FIG. 8) mounted in an annular button holder 225, formed of an insulating material such as a fiberglass-epoxy composite, that is seated on a shoulder of the inner surface of shell 224. The region around the electrode periphery is sealed with an insulating material such as Viton rubber 229. Wiring is coupled to the electrode and, with wiring from other electrodes, forms a bundle 228 that passes through a channel in the stabilizer blade and is coupled, via bulkhead connector(s) 262 to circuitry on circuit boards 292 (e.g. FIG. 3). The strip 222, with button electrodes in place, is inserted in an elongated slot 226 in the stabilizer, as shown in FIGS. 6 and 7, with the shells 224 fitting into cylindrical apertures 233 in the stabilizer blade.

Figure 9:
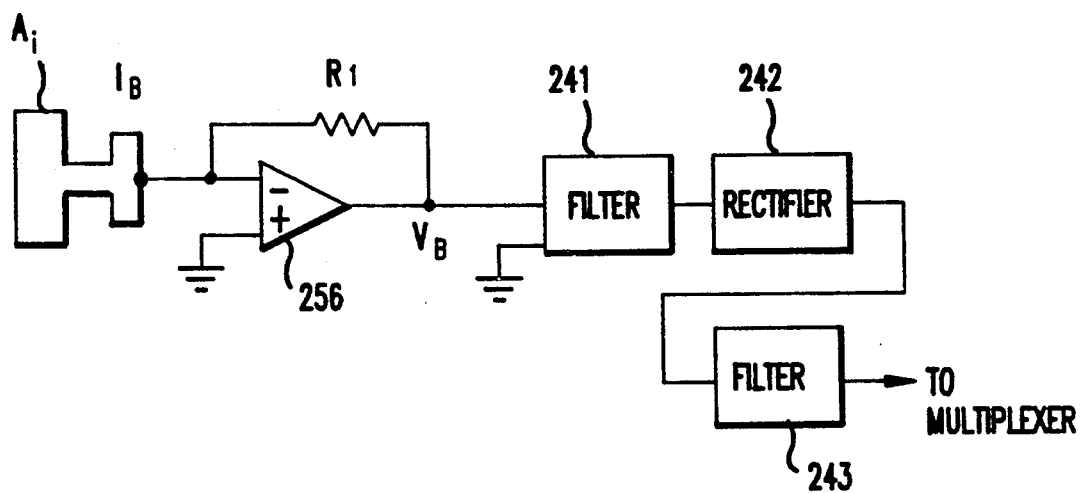
FIG. 9 is a schematic diagram of circuitry for producing a measurement signal from an electrode in accordance with an embodiment of the invention.

As seen in FIG. 9, the electrode Ai is coupled, via the wiring first shown in FIG. 8, to the inputs of an operational amplifier 256. A feedback resistor $R_1$ is coupled between the output of the operational amplifier 256 and its inverting input, and the output is designated $V_B$. The non-inverting input of operational amplifiler 256 is coupled to ground.

The gain of operational amplifier 256 is very high, and the voltage difference between the inverting and non-inverting input terminals is very small, virtually zero. The input impedance of the operational amplifier is very high, and essentially no current flows into either input terminal. Thus, if the current flow in the electrode Ai is $I_B$, the output voltage is $V_B = R_1 \times I_B$.

Figure 10:
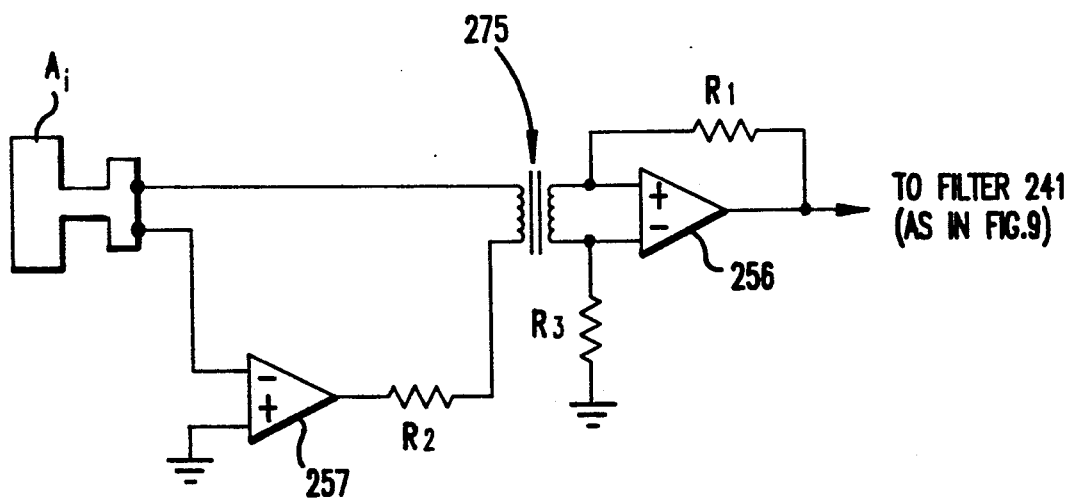
FIG. 10 is a schematic diagram of circuitry for producing a measurement signal from an electrode in accordance with another embodiment of the invention.

FIG. 10 illustrates an alternative arrangement in which a second conductor from the electrode is coupled to the inverting input of an operational amplifier 257. The non-inverting input of the operational amplifier 257 is coupled to ground reference potential (e.g. the drill collar body near the electrodes) and the output of the operational amplifier 257 is coupled via resistor $R_2$ to the bottom terminal of the primary winding of transformer 275. The circuit operates to actively hold the potential of the electrode to the potential of the surrounding metal notwithstanding the resistance of the wiring connecting the electrode to the transformer and to ground reference potential. As shown in FIG. 9, the output of the current sensing circuit (FIG. 9 or FIG. 10) is coupled to a filter stage 241 which blocks DC offset and bandwidth limits around the transmitter frequency. The output of filter circuit 241 is coupled to full wave rectifier 242, ripple filter 243, and then a multiplexer to be described in conjunction with FIG. 11.

The apparent resistivity of the formation is inversely proportional to the current I measured at the electrode. If the voltage at the electrode relative to the voltage of the drill collar surface above and below the toroidal coil transmitter coils 205 and 215, respectively, is V, the apparent resistivity is $R_{app} = kV/I$, where k is a constant that can be determined empirically or by modeling. If desired, a correction can be applied to compensate for electromagnetic skin effect.

Figure 11:
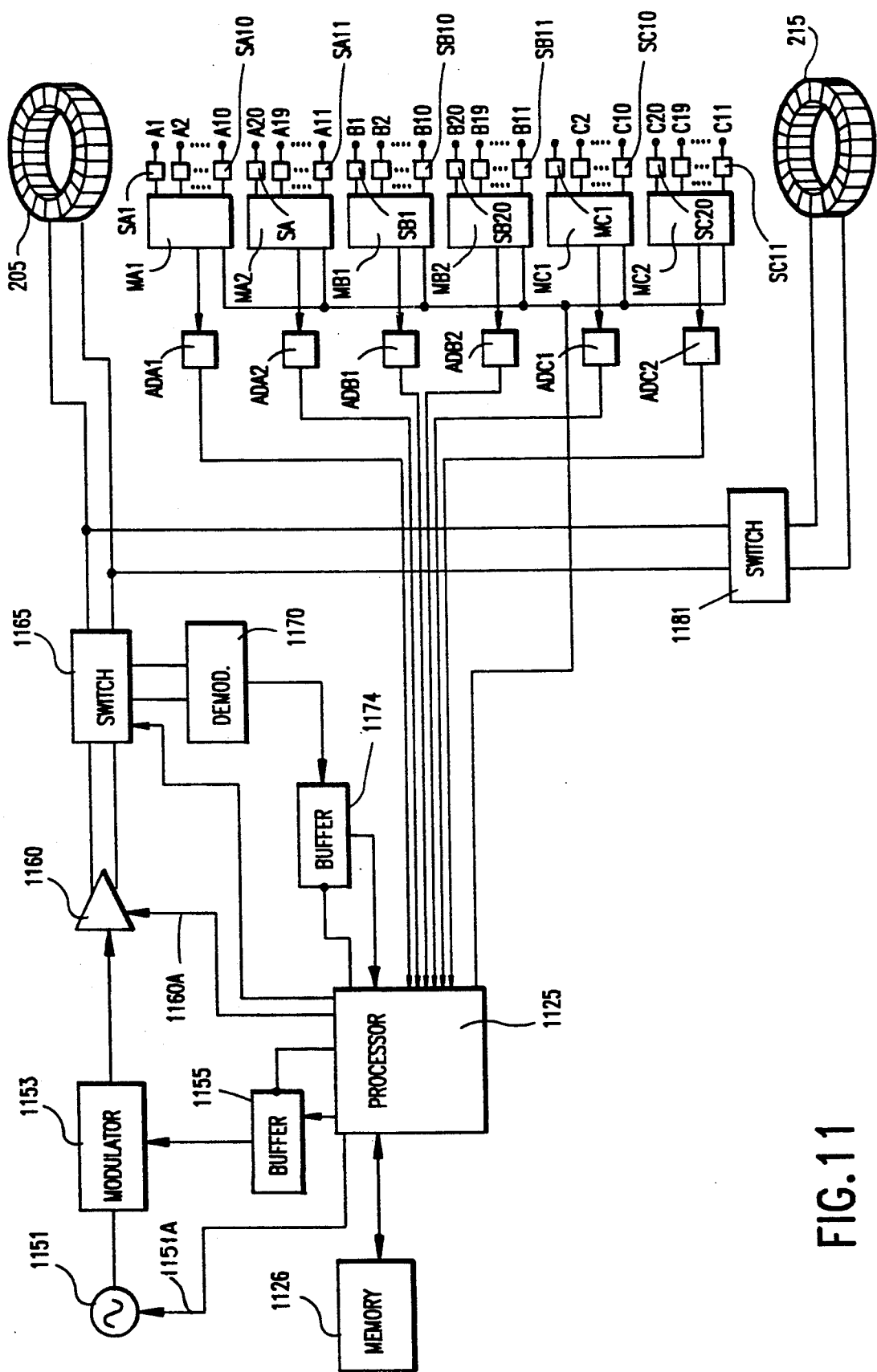
FIG. 11 is a schematic diagram, partially in block form, of downhole circuitry in accordance with an embodiment of the invention.

FIG. 11 shows a block diagram of an embodiment of downhole circuitry in subassembly 200 for implementing measurements and/or for transmitting information to the surface/local communications subassembly 150. The button electrodes A1, A2..... A20 of electrode array of stabilizer 220A are coupled, via the previously described sensing, amplification, filtering and rectifying circuits of FIGS. 9 and 10 (now referred to by reference numerals SA1, SA2, ... SA20, respectively), to multiplexers MA1 and MA2. In embodiments to be subsequently described, a plurality of stabilizer blades with electrode arrays are employed. Accordingly, FIG. 11 also illustrates electrode arrays of stabilizer blades 220B and 220C (to be described), respectively designated B1, B2 ... B20, and C1, C2 ... C20. The electrodes B1, B2 ... B20 are coupled via circuits SB1, SB2 ... SB20, to multiplexers MB1 and MB2, and the electrodes C1, C2 ... C20 are coupled via circuits SC1, SC2, ... SC20 to multiplexers MC1 and MC2. The circuits SB1, SB2, ... SB20, and SC1, SC2, ... SC20 are also of the types described in conjunction with FIGS. 9 and 10. The six multiplexers are under control of a computer or processor 1125. The processor 1125 may be, for example, a suitable digital microprocessor, and includes memory 1126, as well as typical clock, timing, and input/output capabilities (not separately represented). The processor can be programmed in accordance with routines to be described hereinbelow. The outputs of the multiplexers are coupled to respective analog-to-digital converters ADA1, ADA2, ADB1, ADB2, ADC1 and ADC2, the outputs of which are coupled to processor 1125. These, and other analog-to-digital converters and digital-to-analog converters hereof, are assumed to have appropriate clocking and control lines (not separately shown), as is conventional in the art.

In the illustrated embodiment, the transmitting function of subassembly 200 operates in two different modes. In a first mode, the transmitter toroidal coils 205 and 215 transmit measurement signals, and the signals received at the electrodes are processed to obtain formation measurement information. In a second mode of operation, the transmitter toroidal coil 215 is disabled by switch 1181, and the transmitter toroidal coil 205 is utilized for communication with the transmitter/receiver in the surface/local communications subassembly 150 (FIG. 1). For further detail of the communications mode, reference can be made to the above-referenced copending U.S. Pat. application Ser. No. 786,137.

A sinewave generator 1151, which may be under control of processor 1125 (line 1151A) is provided and has a frequency, for example, of the order of 100 Hz to 1 MHz, with the low kilohertz range being generally preferred for measurement. If desired, the communications carrier frequency can be different than the frequency uses in the measurement mode. The generated sinewave is coupled to a modulator 1153 which operates, when the system is transmitting in a communications mode, to modulate the sinewave in accordance with an information signal from the processor 1125. The processor signal is coupled to modulator 1153 via buffer 1155.

(Buffer 1155, as well as other buffers hereof, can be part of the processor memory and control capability, as is known in the art.) In the present embodiment the modulator 1153 is a phase modulator, although it will be understood that any suitable type of modulation can be utilized. The output of modulator 1153 is coupled to a power amplifier 1160, which is under control of processor 1125 (line 1160A). The output of power amplifier 1160 is coupled, via electronic switch 1165, to the transmitter toroidal coil antenna 205. Also coupled to the toroidal coil antenna 205, via another branch of electronic switch 1165, is a demodulator, 1170 which may be a phase demodulator. The output of demodulator 1170 is, in turn, coupled to the processor 1125 via buffer 1174. The processor controls electronic switch 1165, depending on whether the toroidal coil antenna 205 is to be in its usual transmitting mode, or, occasionally, in a receiving mode to receive control information from the surface/local communications subassembly 150. During the communications mode, the switch 1181 is controlled by the processor to disable the second toroidal coil antenna 215.

In certain embodiments hereof, each stabilizer blade has an array of several electrode buttons, preferably at least ten such electrode buttons. Twenty electrode button arrays are represented in illustrated examples hereof. As will become understood hereinbelow, some embodiments hereof can utilize a single array of electrodes, while other embodiments can utilize a plurality (e.g. two, three or four) of arrays of electrodes. Also, some embodiments can utilize as few as two electrodes. In the next description, data acquisition is illustrated in terms of an example of interrogating twenty electrodes in each of three arrays, and acquisition is implemented either during rotation or when stationary. It will be understood, however, that the data acquisition technique can be modified as necessary, consistent with the principles hereof.

Available clock speed and electronic circuit speed permit very fast (almost instantaneous) acquisition of data, and parallel acquisition can be used to acquire a set of data almost simultaneously from all electrodes. However, simultaneous acquisition, and the circuit cost thereof, is generally not necessary. As an example, for a drilling rotational speed of 300 RPM, it will take 550 microseconds to rotate 1 degree. Therefore, acquisition and analog-to-digital conversion of the signals, even sequentially, is readily attainable before there has been 1 degree of rotation. If the diameter of the stabilizer surface (as measured perpendicular to the axis of the drill collar) is about one foot, and the electrode button diameter is about one-half inch, the button spans about 5 degrees of arc of a 360 degree circumference. If the stabilizer diameter is about one and a one-half feet, a half inch diameter electrode button would span about 3 degrees of arc. Accordingly, data acquisition is readily attainable within an elapsed time during which an electrode button moves by only a fraction of its diameter.

There are various ways in which the data acquisition can be driven. For example, as described hereinbelow, the data acquisition can be driven as a function of rotational angle, for example using a signal that indicates azimuth and is derived from coils orthogonal to the drill collar axis which use the direction of the earth's magnetic field as a reference. Alternatively, acquisition can be driven as a function of time, with rotational information being measured and subsequently associated with the time at which the data acquired. Further, acquisition can be with the subassembly 200 stationary, with azimuthal information available from a device in the subassembly 200 itself or, for example, from another subassembly that provides direction, inclination, and "toolface" (azimuth).

In an illustrated embodiment, six (of a total of sixty) electrode current values are acquired in parallel per cycle, so ten sub-cycles are needed, and acquisition in less than 1 degree of rotation (at 300 RPM) would permit about 50 microseconds per sub-cycle. In the present embodiment, during each sub-cycle a group of six electrodes, two from each of the three stabilizer blades, are acquired, with the electrode pairs in each group starting at the widest spacing between pairs and finishing at the closest spacing between pairs. For example, the groups can be as follows:

| Group 1 | A1 | A20 | B1 | B20 | C1 | C20 |
|---|---|---|---|---|---|---|
| Group 2 | A2 | A19 | B2 | B19 | C2 | C19 |

-continued

| Group 3 | A3 | A18 | B3 | B18 | C3 | C18 |
|---|---|---|---|---|---|---|
| Group 4 | A4 | A17 | B4 | B17 | C4 | C17 |
| Group 5 | A5 | A16 | B5 | B16 | C5 | C16 |
| Group 6 | A6 | A15 | B6 | B15 | C6 | C15 |
| Group 7 | A7 | A14 | B7 | B14 | C7 | C14 |
| Group 8 | A8 | A13 | B8 | B13 | C8 | C13 |
| Group 9 | A9 | A12 | B9 | B12 | C9 | C12 |
| Group 10 | A10 | A11 | B10 | B11 | C10 | C11 |

Figure 12:
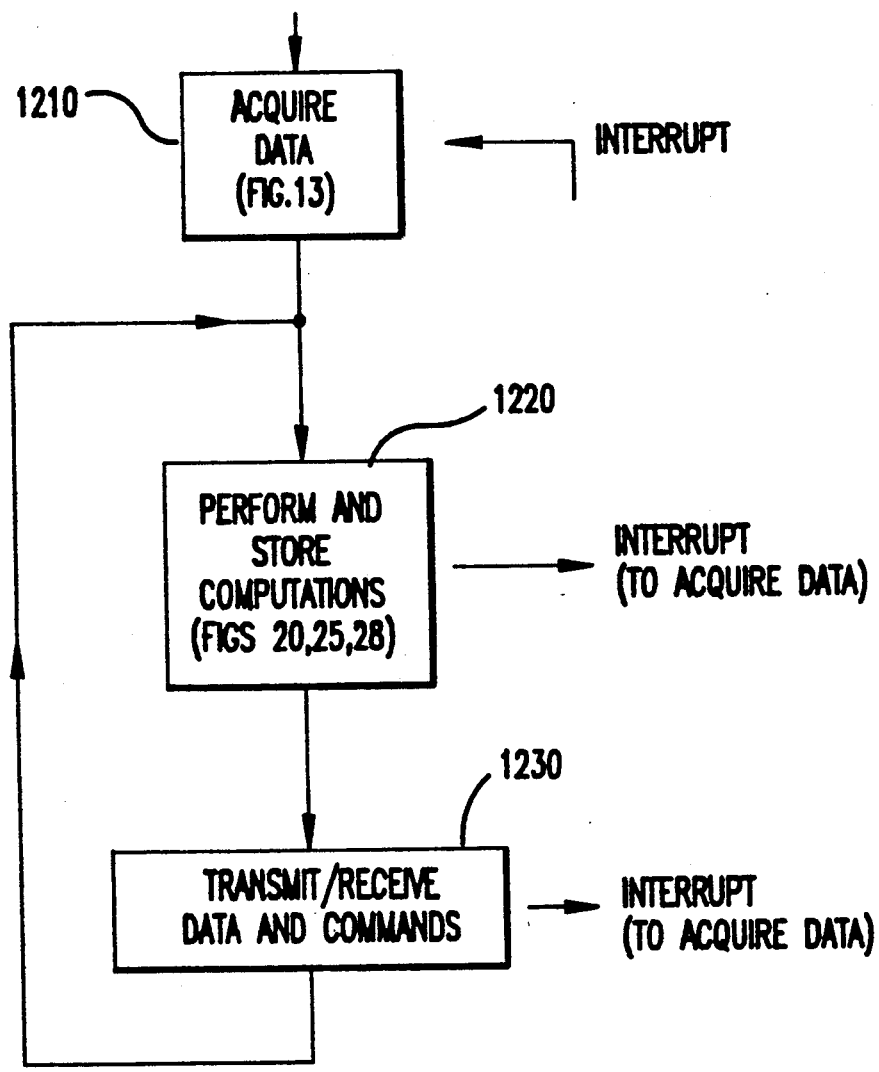
FIG. 12 is a flow diagram for a processor of the main routine for data acquisition, computation and storage, and local communication in accordance with an embodiment of the invention.

FIG. 12 illustrates the main flow diagram for controlling the processor 1125 (FIG. 11) on a prioritized basis, for acquiring data from electrodes, performing and storing computations of formation dip characteristics, and transmitting and/or receiving data and/or commands to and/or from the communications sub 150. In the scheme of FIG. 12, data acquisition has the highest priority, although other approaches can be used. The block 1210 represents implementation of the data acquisition routine described in conjunction with the flow diagram of FIG. 13 below. In the embodiments hereof, to be described, data acquisition may be driven on a time periodic basis, or as a function of rotation angle, or on command (e.g., from the surface via the communications sub, or in response to some sensed or computed condition). An interrupt, resulting from any of these conditions, will cause immediate entry to the data acquisition routine. Upon completion of a data acquisition cycle, the block 1220 is entered, this block representing the computation and storage of formation dip characteristics, in accordance with one or more routines to be described hereinbelow. If an interrupt occurs during such computation, the routine can be suspended and returned to after the next data acquisition cycle. Upon completion of a computation routine, the block 1230 is entered, this block representing the transmitting and/or receiving of data and/or commands to and/or from the communications sub, for ultimate communication with the earth's surface. Again, an interrupt may suspend this routine. Reference can be made, for example, to the abovereferenced copending U.S. Pat. application Ser. No. 786,137. Upon transmission and/or receipt of a frame of data, the block 1220 can be re-entered for further computation. It will be understood that other sequences of routines can be utilized, consistent with the principles of the present invention.

Figure 13:
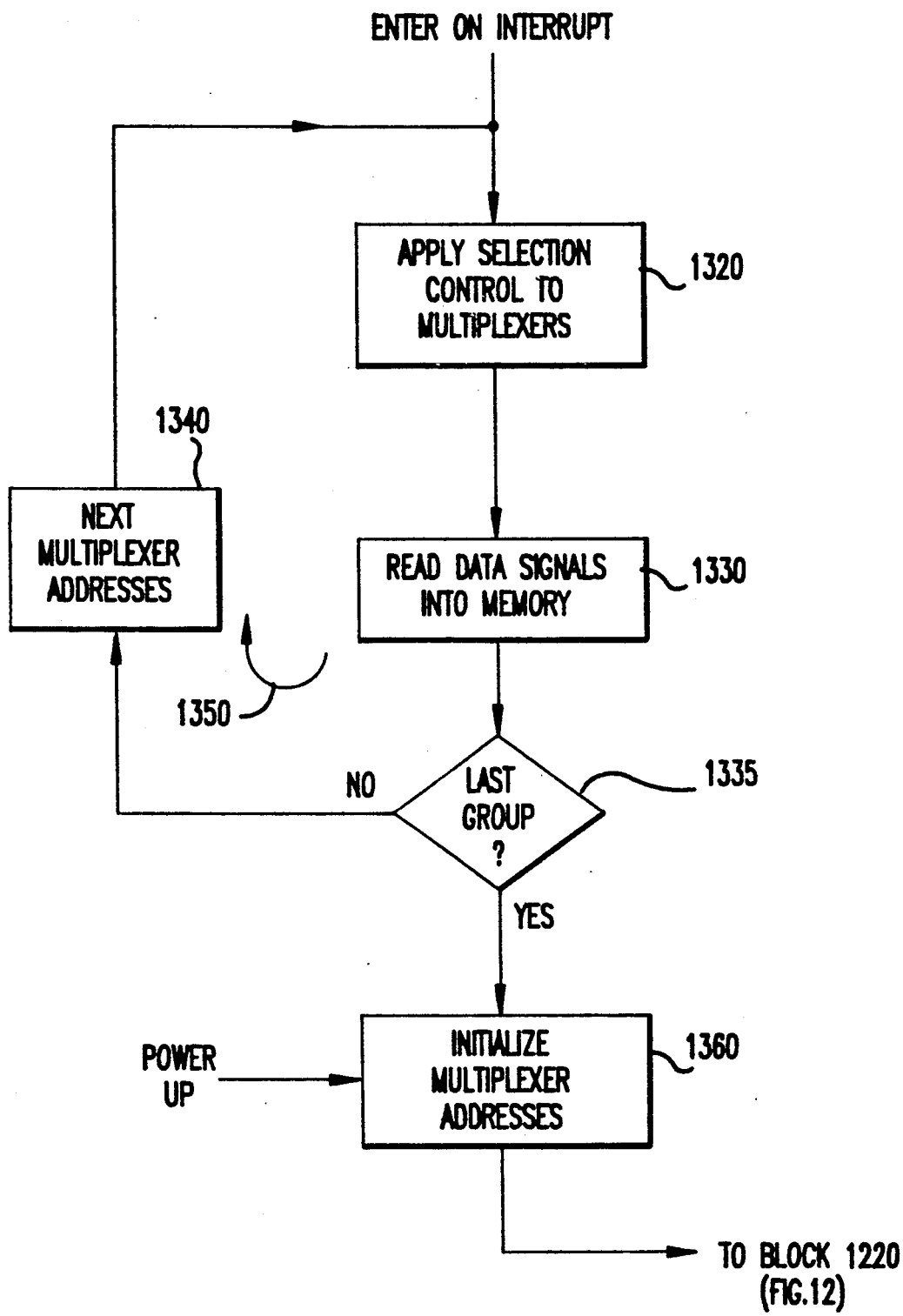
FIG. 13 is a flow diagram of a routine for a processor for data acquisition by interrogation of electrodes in accordance with an embodiment of the invention.

FIG. 13 illustrates the routine of data acquisition that is represented by the block 1210 of FIG. 12. Upon occurrence of an interrupt (e.g. by virtue of a periodic clock signal, a signal driven by rotational angle, or a control signal), the block 1320 is entered, this block representing the applying of selection control to the multiplexers MA1, MA2, etc. (FIG. 11) for acquisition of signals from a group of electrodes, as previously described. (For the initial loop through this routine, the multiplexer addresses will be initialized at the first group of addresses set by virtue of block 1360, which was the last operation implemented during the previous data acquisition cycle. This block is also entered upon "power up", so that the multiplexer addresses are appropriately initialized for the first data acquisition cycle.) The data signals (six of them for the circuit arrangement of FIG. 11) are then read into memory, as represented by the block 1330. Inquiry is then made (diamond 1335) as to whether the last group of addresses has been reached; that is, whether the last group of electrodes (the tenth group in the circuit of FIG. 11) has been interrogated. If not, the addresses are incremented (block 1340), the block 1320 is re-entered, and the loop 1350 continues until data has been acquired from all electrodes. When this occurs, the block 1360 is entered and the addresses are initialized to await the next acquisition cycle. The routine then returns to the block 1220 of the main routine (FIG. 12).

Figures 14A, 14B:
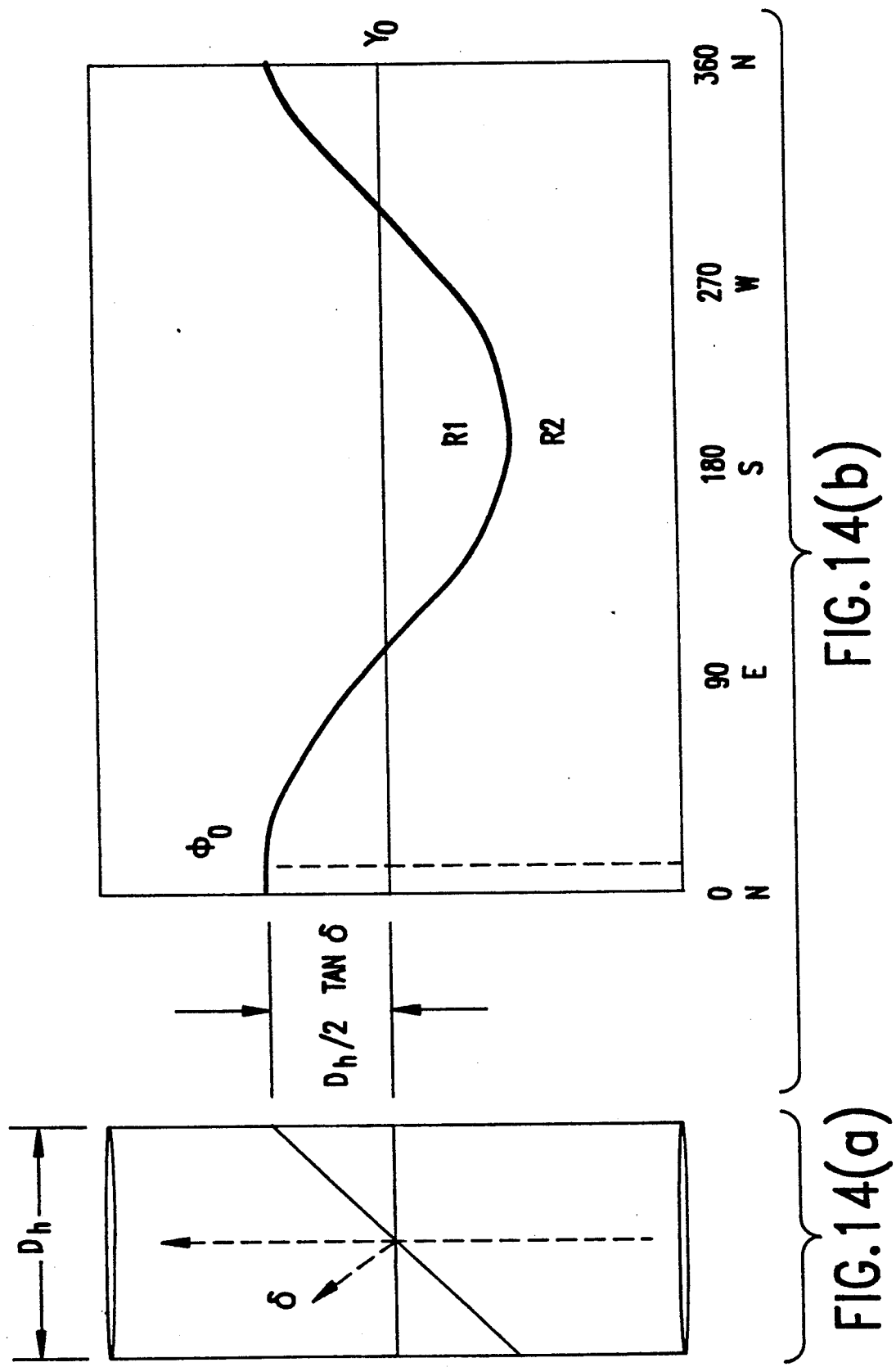
FIG. 14, at (a) shows a side view of the borehole intersecting a dipping bed boundary, and at (b) shows a resistivity boundary as a function of azimuth on the borehole wall for the dipping bed boundary of (a).
Figure 16:
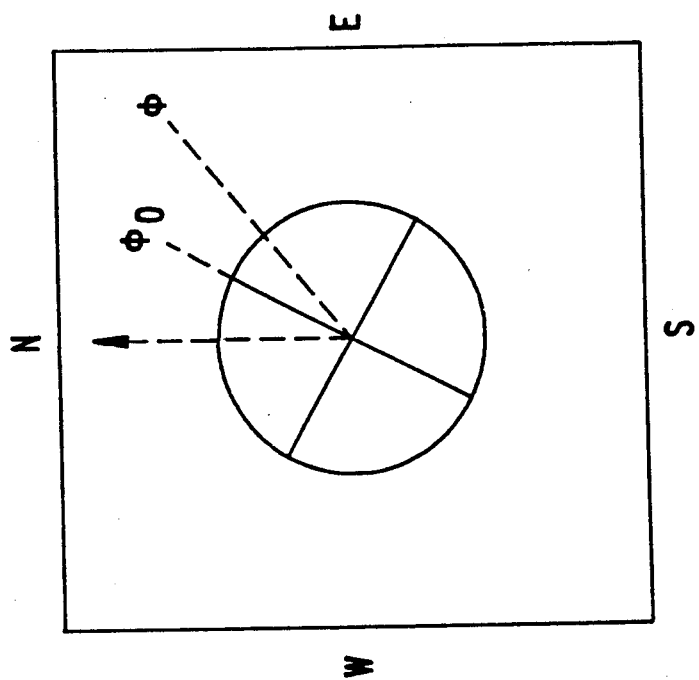
FIG. 16 is a top view of the borehole, showing the azimuth of the dipping bed boundary.
Figure 15:
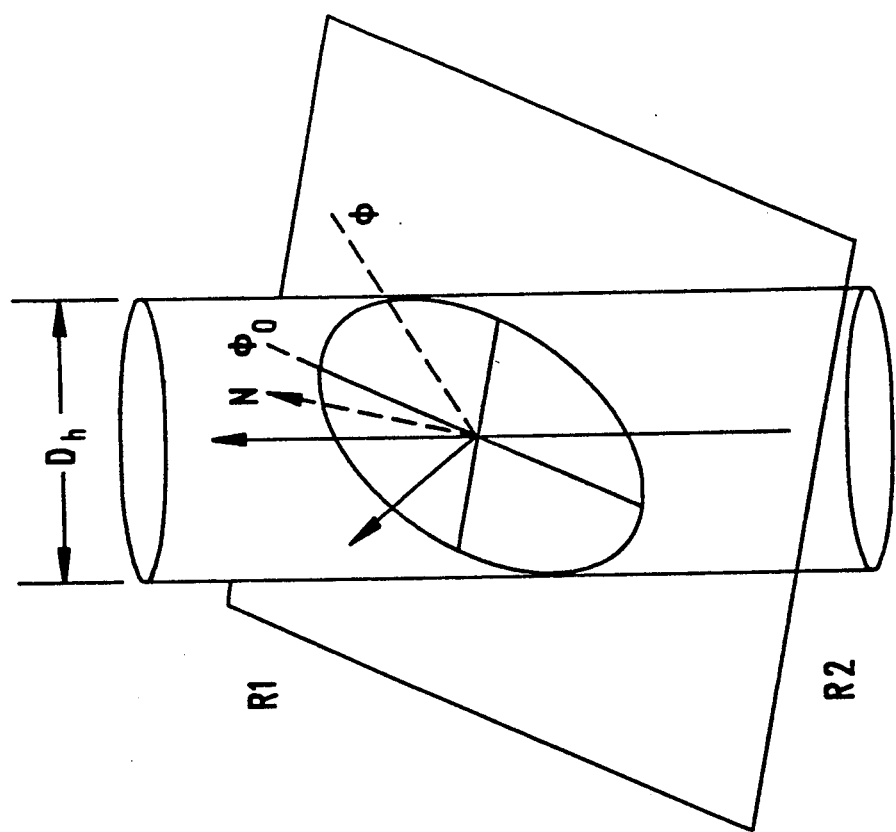
FIG. 15 is a perspective view of the borehole showing the dipping bed boundary.

Various routines for determining formation dip characteristics and some of the underlying theory will next be treated. Consider the intersection between two dipping beds traversed by a borehole, as shown in FIG. 14 (side view of borehole shown in (a); resistivity borderline on the borehole wall shown in (b)), FIG. 15 (perspective view) and FIG. 16 (top view). The borehole is taken as vertical in this example for ease of illustration. The borehole diameter is $D_h$, the resistivity of the upper bed is R1, the resistivity of the lower bed is R2, the boundary dips at an angle $\delta$, the up-dip direction is $\Phi_0$ with respect to magnetic north, and the intersection of the bed boundary with the borehole axis is $Y_0$. The boundary (Y) between the two beds on the borehole wall, illustrated in FIG. 14(b), is described by a sinusoidal function of the form:

$$Y = Y_0 + \frac{D_h}{2} \text{TAN}(\delta)\text{COS}(\Phi - \Phi_0) \quad (1)$$

Figure 17:
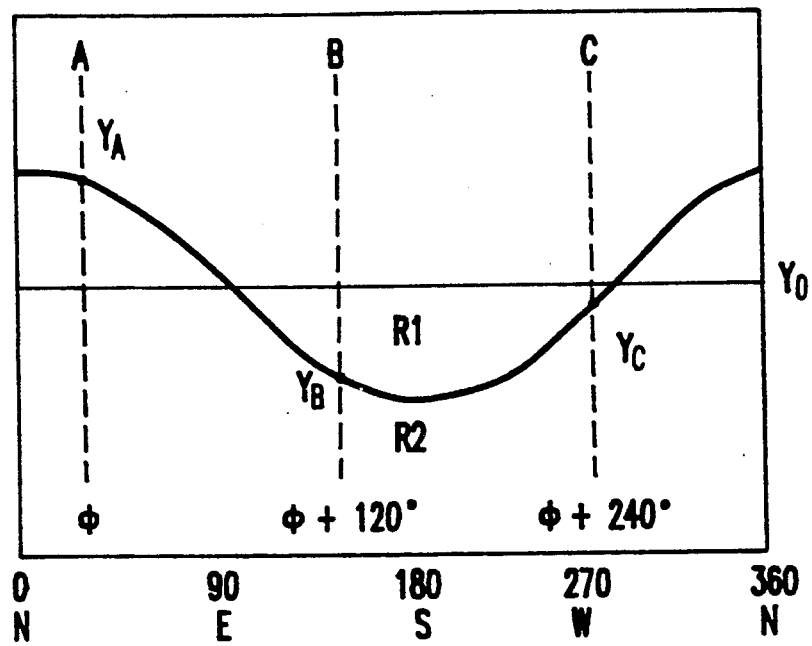
FIG. 17 illustrates the position of the bed boundary on the borehole wall as a function of azimuthal angle, and the positions of three electrode arrays.
Figure 18:
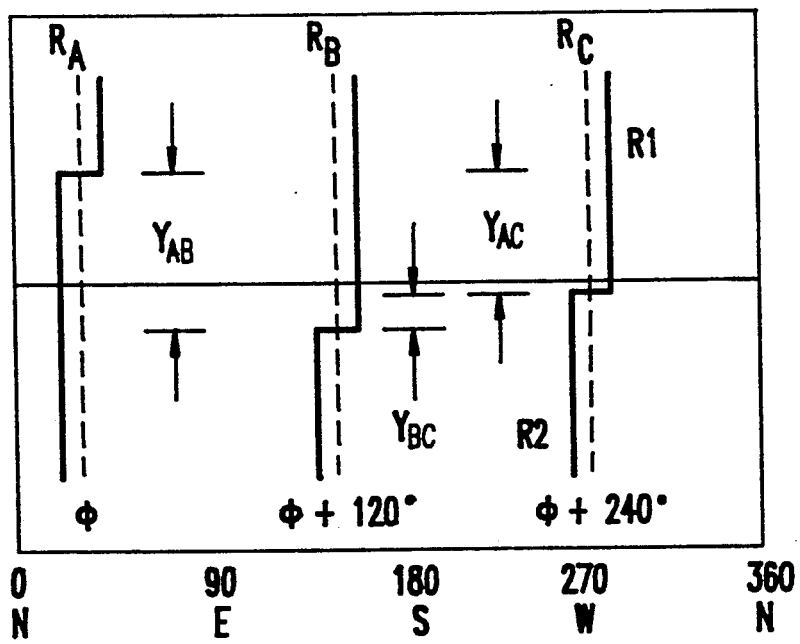
FIG. 18 illustrates the resistivity signals or traces of the arrays of the FIG. 17 example in the longitudinal direction.

Assume that the three electrode arrays (A, B and C), 120 degrees apart, from which resistivity data is obtained (FIG. (11)), are in the positions illustrated in FIG. 17 with respect to the sinusoidal boundary. The length of the array (for example, about 2 feet) is L, and the number of electrodes (for example, 20, as above) is N. The positions of the electrodes are $\{Y_1, Y_2, \ldots, Y_N\}$, and the resistivities measured at arrays A, B, and C are respectively: $\{R_A(Y_1), R_A(Y_2), \ldots, R_A(Y_N)\}$, $\{R_B(Y_1), R_B(Y_2), \ldots, R_B(Y_N)\}$, and $\{R_C(Y_1), R_C(Y_2), \ldots, R_C(Y_N)\}$. The bed boundary will be located in all three arrays (and, therefore, in the resistivity traces therefrom) when the dip angle $\delta$ satisfies the condition that $\text{TAN}(\delta) < L/D_h$. The boundary crosses the three arrays at:

$$\text{Array } A: Y_A = Y_0 + \frac{D_h}{2} \text{TAN}(\delta)\text{COS}(\Phi - \Phi_0), \quad (2a)$$

$$\text{Array } B: Y_B = Y_0 + \frac{D_h}{2} \text{TAN}(\delta)\text{COS}(\Phi + 120^\circ - \Phi_0), \quad (2b)$$

$$\text{Array } C: Y_C = Y_0 + \frac{D_h}{2} \text{TAN}(\delta)\text{COS}(\Phi + 240^\circ - \Phi_0), \quad (2c)$$

where $\Phi_0$ is the up-dip direction with respect to magnetic north. FIG. 18 shows the signals (traces) for the resistivities measured at each array, designated $R_A$, $R_B$ and $R_C$, and the axial spacings between the intersections with the boundary in each trace, $Y_{AB}$, $Y_{BC}$ and $Y_{AC}$. Correlations are calculated between traces for A, B, and C, to obtain: $Y_{AB} = Y_A - Y_B$, $Y_{AC} = Y_A - Y_C$, and $Y_{BC} = Y_B - Y_C$. For example, with reference to FIG. 19, $Y_{AB}$ is calculated using the correlation function:

$$C(P, S) = \frac{\sum_{I=0}^{Q} R^*_A(Y_{P+I}) R^*_B(Y_{S+I})}{\sqrt{\sum_{I=0}^{Q} \{R^*_A(Y_{P+I})\}^2 \sum_{I=0}^{Q} \{R^*_B(Y_{S+I})\}^2}} \quad (3)$$

where $$R^*_A(Y_{P+I}) = R_A(Y_{P+I}) - \frac{1}{Q+1} \sum_{J=0}^{Q} R_A(Y_{P+J}), \quad (4a)$$

$$R^*_B(Y_{S+I}) = R_B(Y_{S+I}) - \frac{1}{Q+1} \sum_{J=0}^{Q} R_B(Y_{S+J}). \quad (4b)$$

The correlation function C(P,S) is a measure of the similarity between resistivities measured on two different arrays, between $\{R_A(Y_P), \ldots R_A(Y_{P+Q})\}$ and $\{R_B(Y_S), \ldots, R_B(Y_{S+Q})\}$. The correlation function ranges from $-1$ for complete anti-correlation, to $+1$ for complete correlation between the two resistivity data sets. The starred values, i.e. $R_A^*(Y_{P+I})$ have an average of zero over the correlation interval $\{Y_P, \ldots, Y_{P+Q}\}$. For a given P, the maximum value for C(P,S) occurs when the axial displacement between the two curves is such that they overlay, i.e. when $Y_P - Y_S = Y_{AB}$. Because the correlation function is used to estimate $Y_{AB}$, the estimated value is written as $Y_{AB}(P) = Y_P - Y_S$, corresponding to the maximum of C(P,S), which is denoted as $C_{max}(P)$. Typically, in this type of correlation, the correlation function is computed for different values of P, such as $\{P=1, Q/2, Q, 3Q/2, \ldots, N-Q\}$, and a set of estimates, $\{Y_{AB}(P)\}$, is obtained. A good estimate of $Y_{AB}$ is the weighted average of the individual estimates:

$$Y_{AB} = \frac{\sum_{P=1}^{N-Q} C_{max}(P) Y_{AB}(P)}{\sum_{P=1}^{N-Q} C_{max}(P)}, \text{ where } P \text{ is incremented by } Q/2. \quad (5)$$

Similar correlations are calculated between traces B and C, and between A and C to obtain estimates for $Y_{BC}$ and $Y_{AC}$. The dip direction ($\Phi_0$) and dip angle ($\delta$) are then found from the two equations:

$$\Phi_0 = \Phi - TAN^{-1}\left(\sqrt{3} \frac{Y_{AC} - Y_{AB}}{Y_{AC} + Y_{AB}}\right) \quad (6)$$

and $$\delta = TAN^{-1}\left(\frac{4}{3D_h} \sqrt{Y_{AC}^2 + Y_{AB}^2 - Y_{AC}Y_{AB}}\right) \quad (7)$$

These quantities can be computed and stored downhole, and $\Phi_0$ and $\delta$ can be sent to the surface. If desired several measurements of $\Phi_0$ and $\delta$ can be made, averaged, and the averaged values sent uphole. Resistivity traces can also be recorded in downhole memory for later playback at surface. The recorded data can be used, inter alia, to identify features such as fractures, and to provide log quality control.

Figure 19:
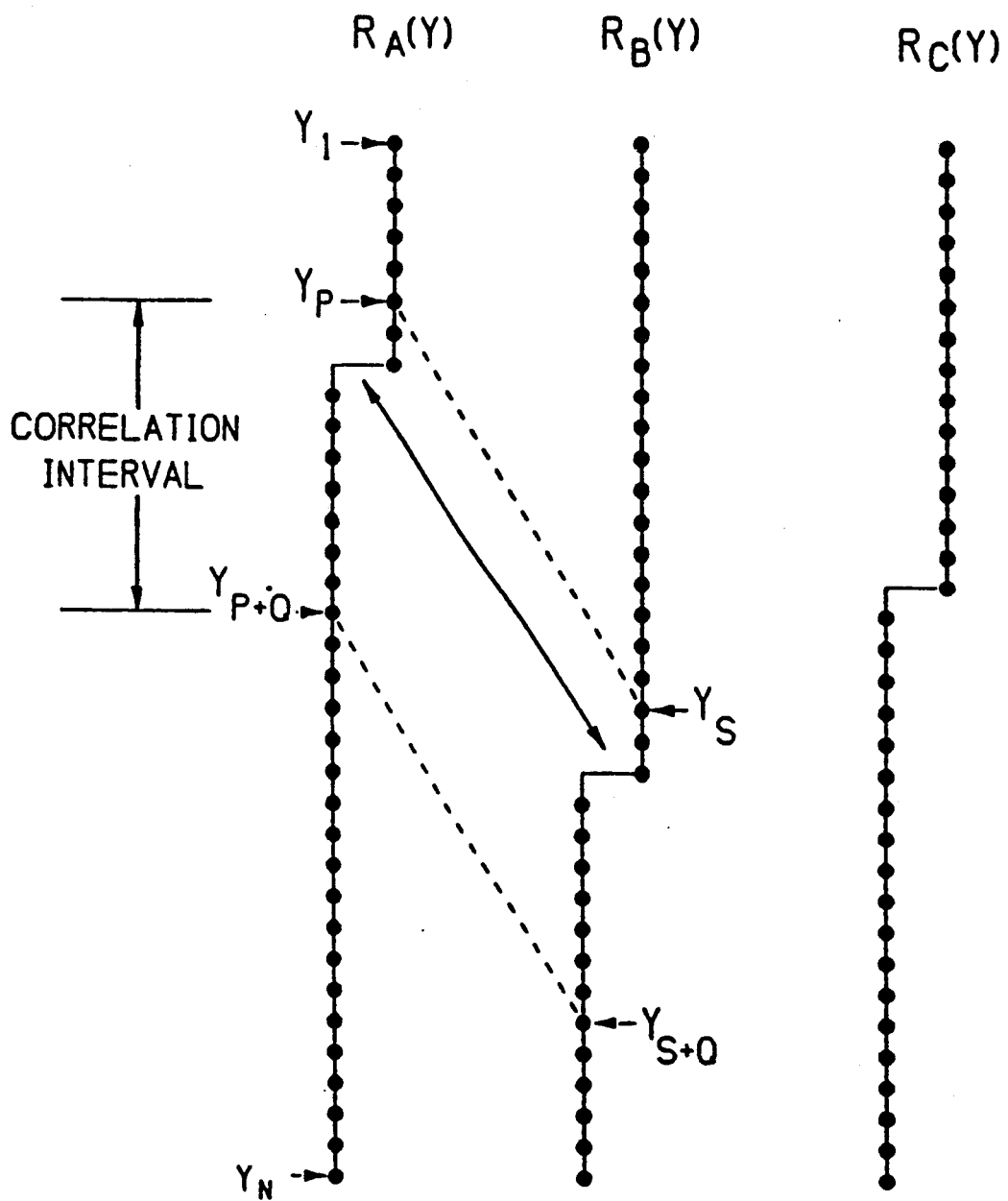
FIG. 19 illustrates resistivity measurements at electrode positions and is useful in understanding a correlation technique for determining the offset between signals measured with different arrays or at different array positions.
Figure 20A:
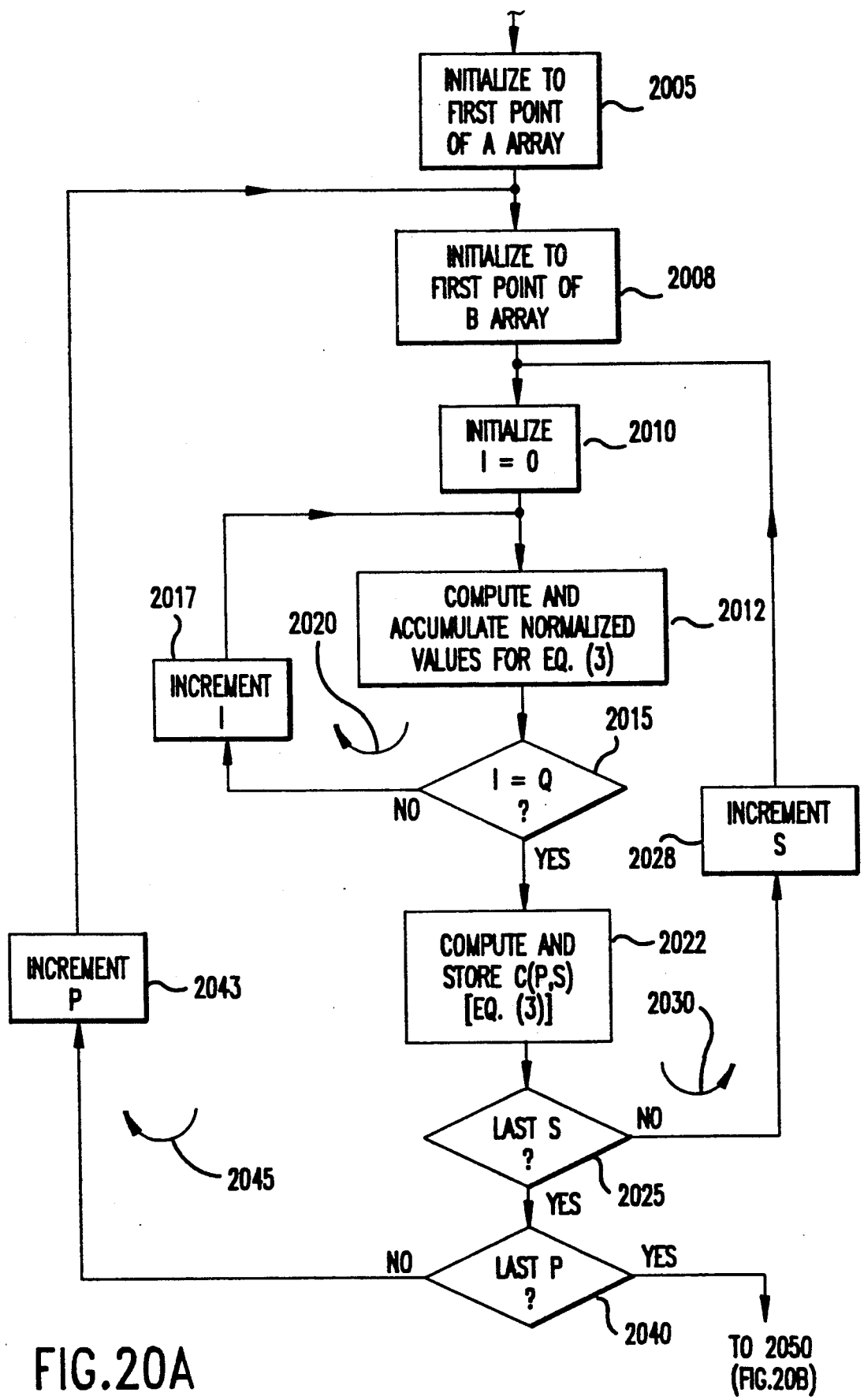
FIG. 20, which includes FIGS. 20A, 20B and 20C placed one below another, is a flow diagram of a routine for programming a processor to determine dip angle and dip direction in accordance with an embodiment of the invention.
Figure 20B:
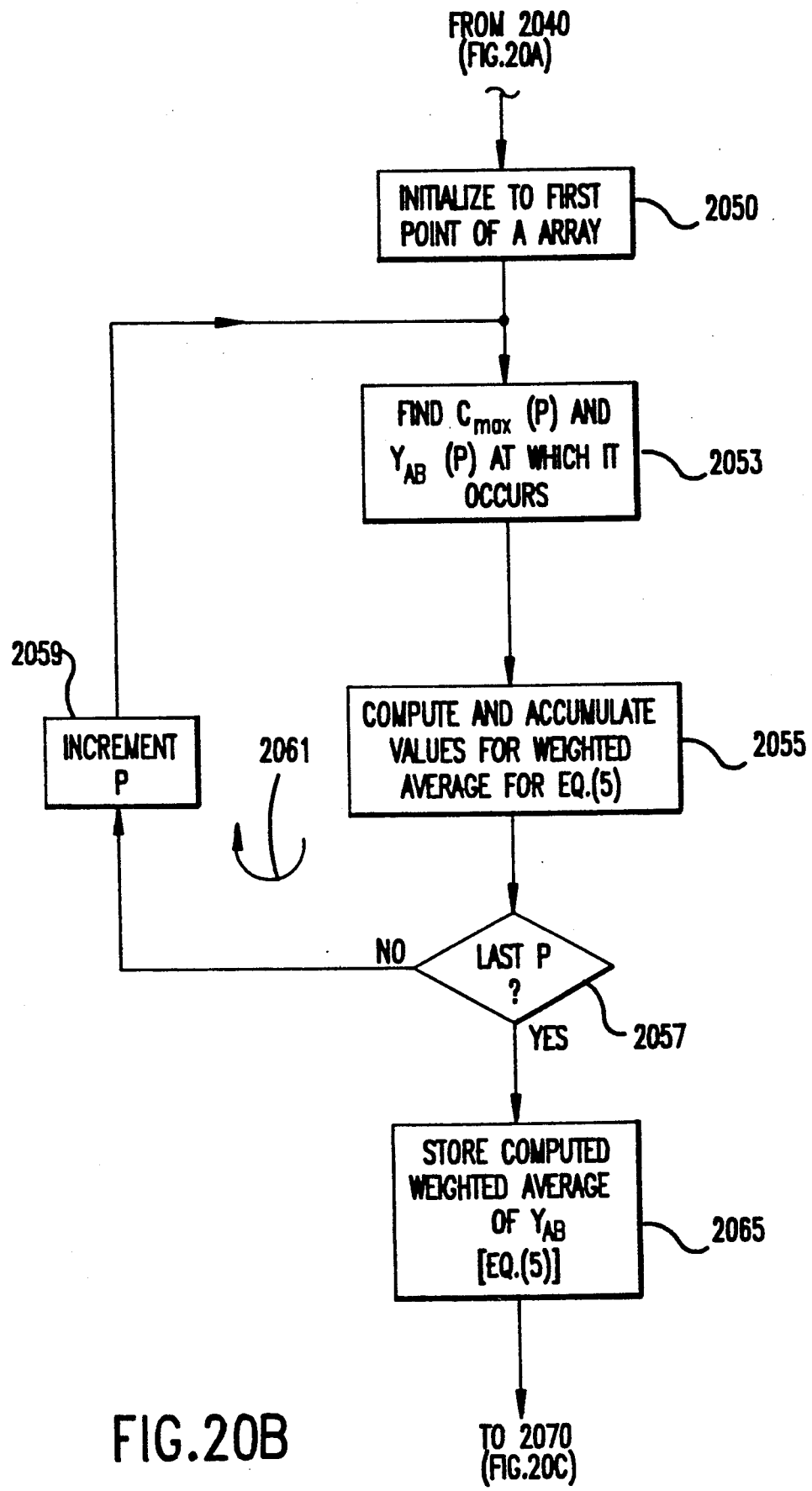
Figure 20C:
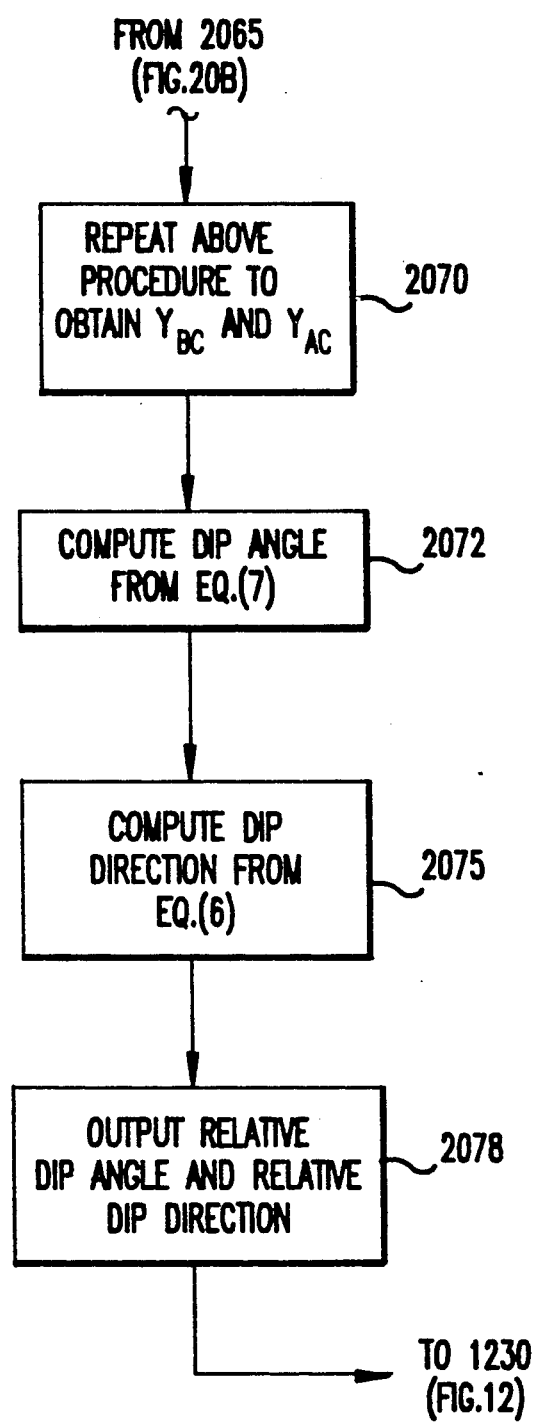

Referring to FIG. 20, there is shown a flow diagram of a routine for programming a processor (such as processor 1125) to determine the dip angle and the dip direction, consistent with the techniques described in conjunction with FIGS. 14-19. The block 2005 represents initializing an array index for the A array to the first point (or electrode) to be considered, for example the point $Y_1$ in FIG. 19, representing the top electrode of the A array. Similarly, the block 2008 represents the initializing of an index for the B array. An index I is initialized at zero (block 2010), and the values $R_A^*(Y_{P+I})$ and $R_B^*(Y_{S+I})$ for equation (3) are computed and accumulated (block 2012). These are the normalized values to be used in the first correlation interval being processed, as illustrated in FIG. 19. In particular, inquiry is made (diamond 2015) as to whether I equals Q. If not, I is incremented (block 2017), block 2012 is re-entered, and the loop 2020 continues until the values of $R_A^*(Y_{P+I})$ and $R_B^*(Y_{S+I})$ have been obtained and stored for the present interval.

With the normalized values $R_A^*(Y_{P+I})$ and $R_B^*(Y_{S+I})$ having been computed, the block 2022 is entered, this block representing the computation and storage of the correlation value C(P,S), in accordance with equation (3). Thus, for example, after one pass, the value for C(1,1) will have been computed and stored. Inquiry is then made (diamond 2025) as to whether the last point of the B array (that is, the last point $Y_S$ (FIG. 19) at which a correlation is to be made) has been reached. (In the example of FIG. 19, there are Q points in the correlation interval, so if there are N points in each array, the last $Y_S$ for this loop will be $Y_{N-Q}$.) If the last point $Y_S$ has not been reached, S is incremented (block 2028), the block 2010 is re-entered, and the loop 2030 continues until the last S has been reached. When this occurs, the correlations C(1,1), C(1,2), C(1,3), ... C(1,N-Q) will have been computed. Inquiry is then made (diamond 2040) as to whether the last P (or point $Y_P$) has been reached. (Again, for the example of FIG. 19, the last P for which a correlation is shown in P=N-Q.) If not, P is incremented (block 2043) the block 2008 is re-entered, and the loop 2045 continues until the last P is reached. Thus, during the second pass of loop 2045, the correlations C(2,1), C(2,2), C(2,3), ... C(2,N-Q) will be computed and stored. In this example, during the last pass the correlations C(N-Q,1), C(N-Q,2), C(N-Q,3), ... C(N-Q, N-Q), will be computed and stored.

During the next portion of the routine, the weighted average of equation (5) is computed. In particular, P is initialized to 1, as represented by the block 2050. (Again, the index P is used for the A array and the index S is used for the B array.). For the present value of P (initially, 1), the largest correlation value C(P,S) is found, this value being called $C_{max}(P,S)$, along with the point $Y_{AB}(P)$ at which the maximum is located (block 2053). These values are utilized in the computation and accumulation of values to obtain the weighted average of equation (5), as represented by the block 2055. Inquiry is made (diamond 2057) as to whether the last point P has been reached. If not, P is incremented (block 2059), e.g. by Q/2, the block 2053 is re-entered, and the loop 2061 continues until all points P of the A array have been considered. When this occurs, the computation of equation (5) is complete and the computed weighted average $Y_{AB}$ is stored, as represented by the block 2065. The same procedure can then be utilized to obtain $Y_{BC}$ and $Y_{AC}$ for the other two array pairs, as represented by the block 2070. The dip angle can then be computed using equation (7), as represented by the block 2072, and the dip direction can be computed using equation (6), as represented by the block 2075. (Storage is implied, in all cases.) Theses values, which may be relative to the axial direction (in the case of dip angle) and to magnetic north (in the case of dip direction) can then be output, as represented by the block 2078. When borehole direction and inclination information are available, the output values can, if desired, be converted to true dip angle and dip direction, using techniques known in the art.

Figure 21B:
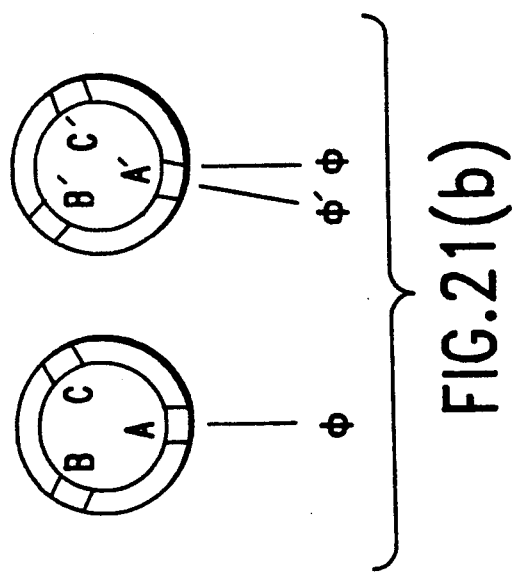
FIG. 21(b) shows the orientations of arrays before and after rotation for an illustrative example.
Figure 21A:
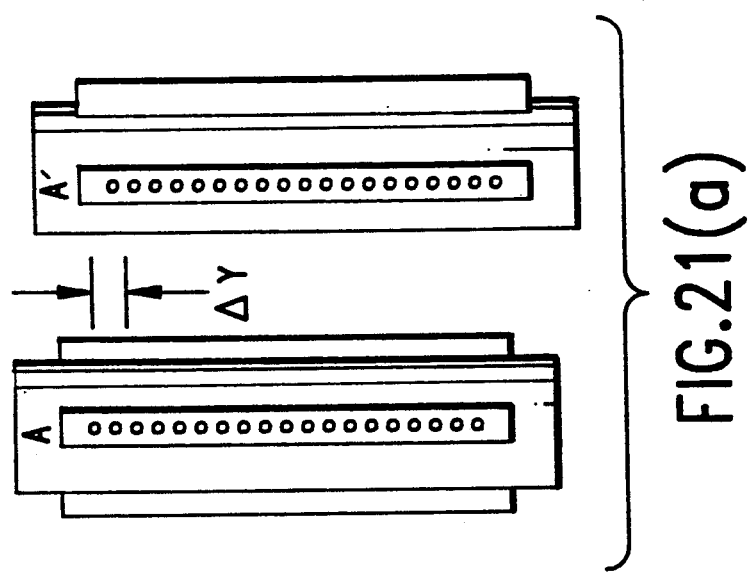
FIG. 21(a) shows an array of electrodes before and after movement for an illustrative example.
Figure 22A:
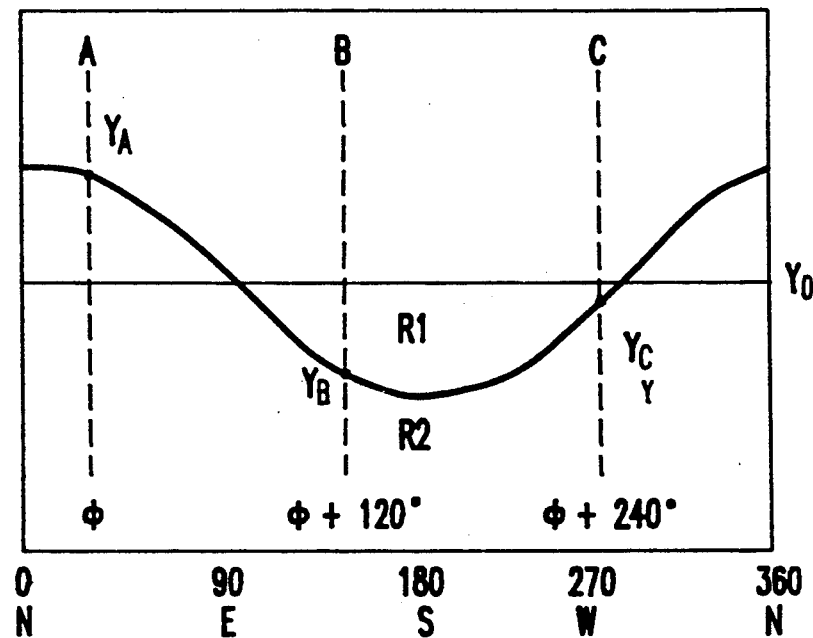
FIG. 22(a) illustrates the position of a dipping bed boundary on a borehole wall, as a function of azimuth, and initial positions of arrays thereon, for an illustrative example.
Figure 22B:
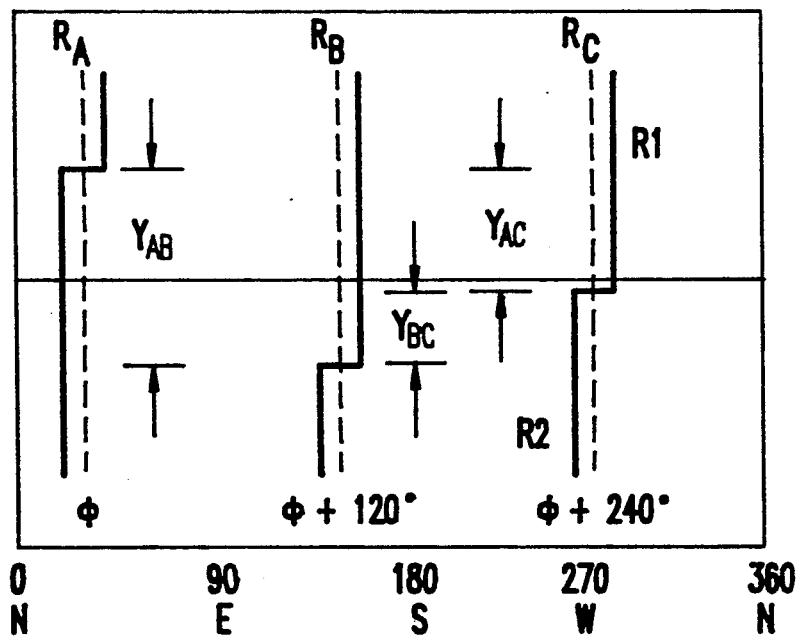
FIG. 22(b) shows the resistivity traces for the arrays in the example of FIG. 22(a).
Figure 23A:
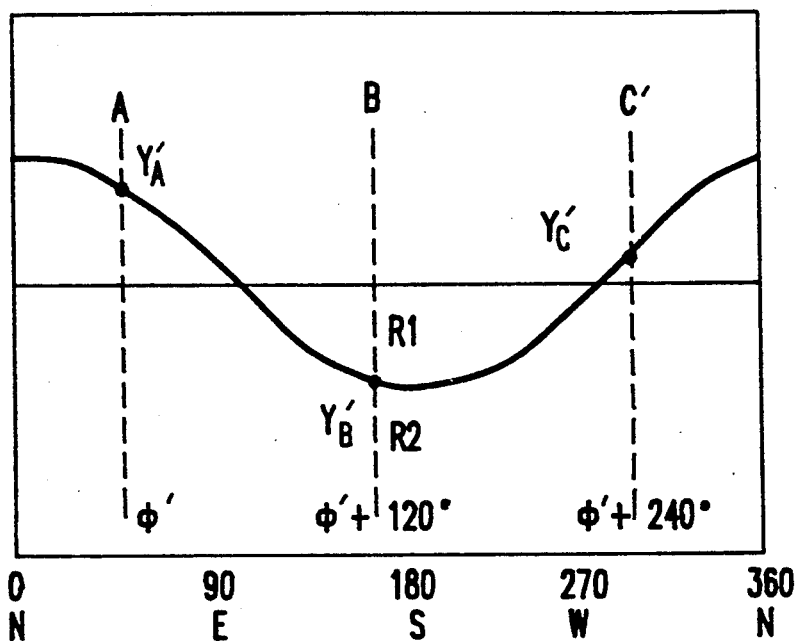
FIG. 23(a) illustrates the position of a dipping bed boundary on a borehole wall, as a function of azimuth, and positions of arrays thereon after movement, for an illustrative example.
Figure 23B:
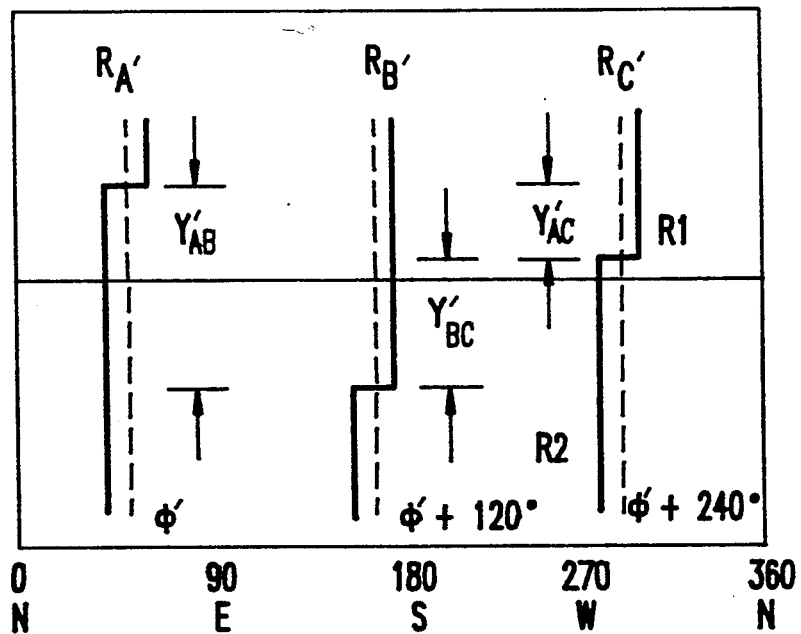
FIG. 23(b) shows the longitudinal resistivity traces for the arrays in the example of FIG. 22(a), after movement.

The technique described in conjunction with FIGS. 14-20 is applicable for low and moderate dip angles; that is, when $TAN(\delta) < L/D_h$ (see FIG. 14). In various applications, for example in directional drilling applications where drilling generally along the direction of bedding planes is implemented, large dip angles are encountered and longer signal traces (successive measurement signals to correlate) are needed to determine dip angle. Since the length of the array is limited by practical considerations, a feature of the invention is used to combine or append measurement signals taken at different locations along the borehole axis. As an example, a typical rate of penetration is 60 feet per hour, and a typical rate of revolution is 120 RPM. In 30 seconds at these rates, the subassembly 200 will have moved 6", and completed 60 revolutions. Two sets of measurements, obtained with a 30 second interval, can be correlated with each other preferably with azimuthal angles being nearly the same for the two measurements, as can be the case when the measurements are acquired as a function of azimuthal angle. Assume that the measuring device has moved an axial distance $\Delta Y < L$, and rotated by a small angle $(\Phi' - \Phi)$ between measurements, as shown in FIGS. 21(a) and 21(b). FIGS. 22(a) and 22(b) respectively illustrate the formation resistivity boundary pattern on the borehole wall and the array resistivity traces (in the axial direction as in FIGS. 17 and 18 above) before the movement and rotation. FIGS. 23(a) and 23(b) show the boundary pattern and the resistivity traces after the movement and rotation. The new positions of the electrodes are $\{Y'_1, Y'_2, \ldots, Y'_N\}$, the new resistivities are: $\{R'_A(Y'_1), R'_A(Y'_2), \ldots, R'_A(Y'_N)\}$, etc., and boundary positions are $Y'_A$, $Y'_B$, and $Y'_C$, represented as follows:

Array A: $Y_A = Y_0 - \Delta Y + \dfrac{D_h}{2} TAN(\delta)COS(\Phi' - \Phi_0)$, (8a)

Array B: $Y_B =$ (8b)

$Y_0 - \Delta Y + \dfrac{D_h}{2} TAN(\delta)COS(\Phi' + 120° - \Phi_0)$,

Array C: $Y_C =$ (8c)

$Y_0 - \Delta Y + \dfrac{D_h}{2} TAN(\delta)COS(\Phi' + 240° - \Phi_0)$,

Correlations can be computed between the two data sets (before and after tool movement) to obtain $Y_{AA} = Y_A - Y_A$, $Y_{BB} = Y_B - Y_B$, and $Y_{CC} = Y_C - Y_C$. For example, the correlation is calculated between $\{R_A(Y_P), \ldots, R_A(Y_{P+Q})\}$ and $\{R'_A(Y_S), \ldots, R'_A(Y_{S+Q})\}$ in a manner identical to that described above to obtain $Y_{AA} = Y_P - Y_S$. The axial displacement is estimated by averaging the three quantities:

$\Delta Y_A = Y_{AA} +$ (9a)

$D_h TAN(\delta) SIN\left(\dfrac{\Phi - \Phi'}{2}\right) SIN\left(\dfrac{\Phi + \Phi' - 2\Phi_0}{2}\right)$, $\Delta Y_B = Y_{BB} +$ (9b)

$D_h TAN(\delta) SIN\left(\dfrac{\Phi - \Phi'}{2}\right) SIN\left(\dfrac{\Phi + \Phi' + 240° - 2\Phi_0}{2}\right)$, -continued $\Delta Y_C = Y_{CC} +$ (9c)

Figures 24A, 24B:
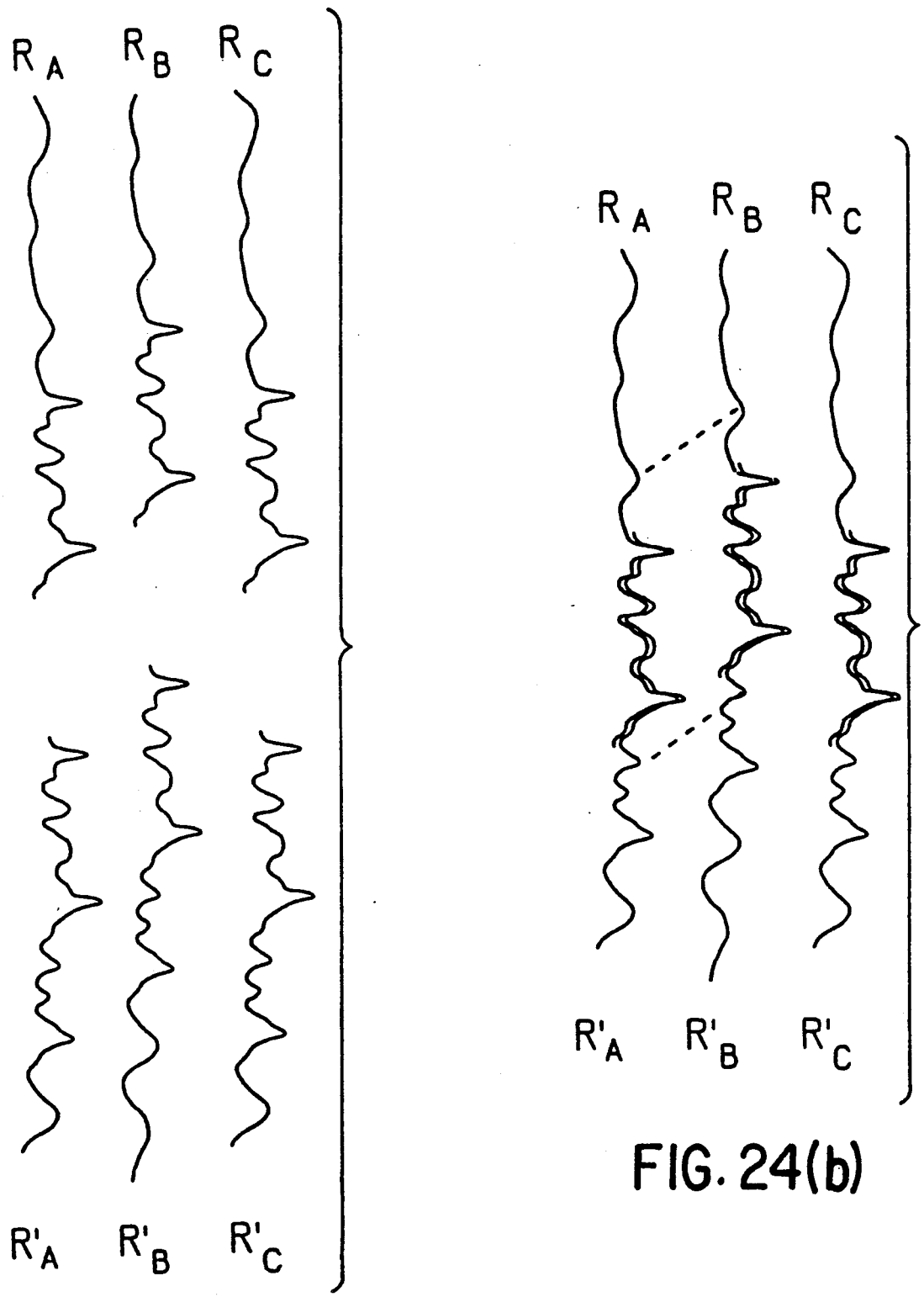
FIG. 24(a) shows examples of resistivity curves measured with three arrays at two different times and after substantial axial movement.
FIG. 24(b) shows an example of appended resistivity curves of FIG. 24(a).

$D_h TAN(\delta) SIN\left(\dfrac{\Phi - \Phi'}{2}\right) SIN\left(\dfrac{\Phi + \Phi' + 480° - 2\Phi_0}{2}\right)$, With the tool displacement ($\Delta Y$) estimated, the resistivity curves can be stacked from different axial tool positions, as illustrated in FIGS. 24(a) and 24(b). FIG. 24(a) shows (in the top curves) three resistivity curves $R_A$, $R_B$ and $R_C$ obtained before the movement and rotation and (in the bottom curves) the resistivity curves obtained after the movement and rotation, and designated $R_A'$, $R_B'$ and $R_C'$. FIG. 24(b) shows the appended curves, combined with the appropriate displacement, as determined from the correlation procedure. The smaller the angular movement ($\Phi' - \Phi$), the better the estimates are because the dependence on $\delta$ vanishes. This allows long resistivity curves to be recorded in memory by stacking multiple traces after the measuring device has moved axially. In high dip angles, where $TAN(\delta) > L/D_h$, stacked traces can be used in the correlation calculation to overcome the limitation on dip angle.

Figure 25A:
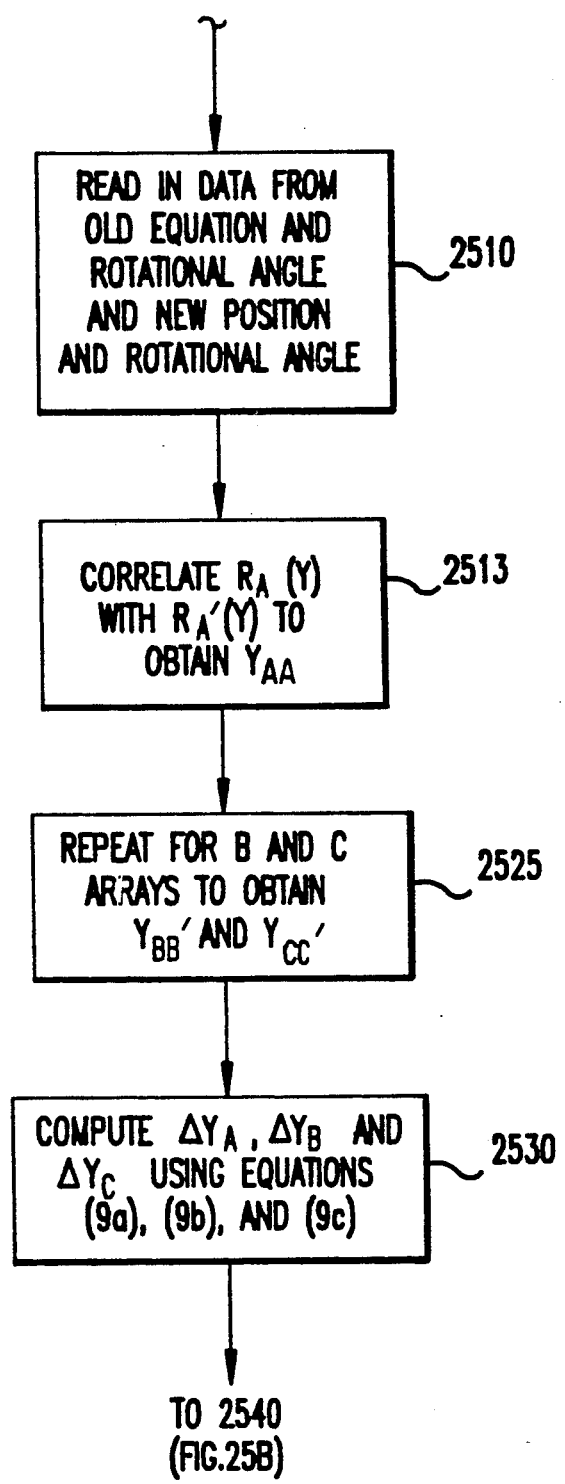
FIG. 25 which includes FIGS. 25A and 25B placed one below another, is a flow diagram of a routine for controlling a processor to implement the combining of data from different depth levels in accordance with an embodiment of the invention.
Figure 25B:
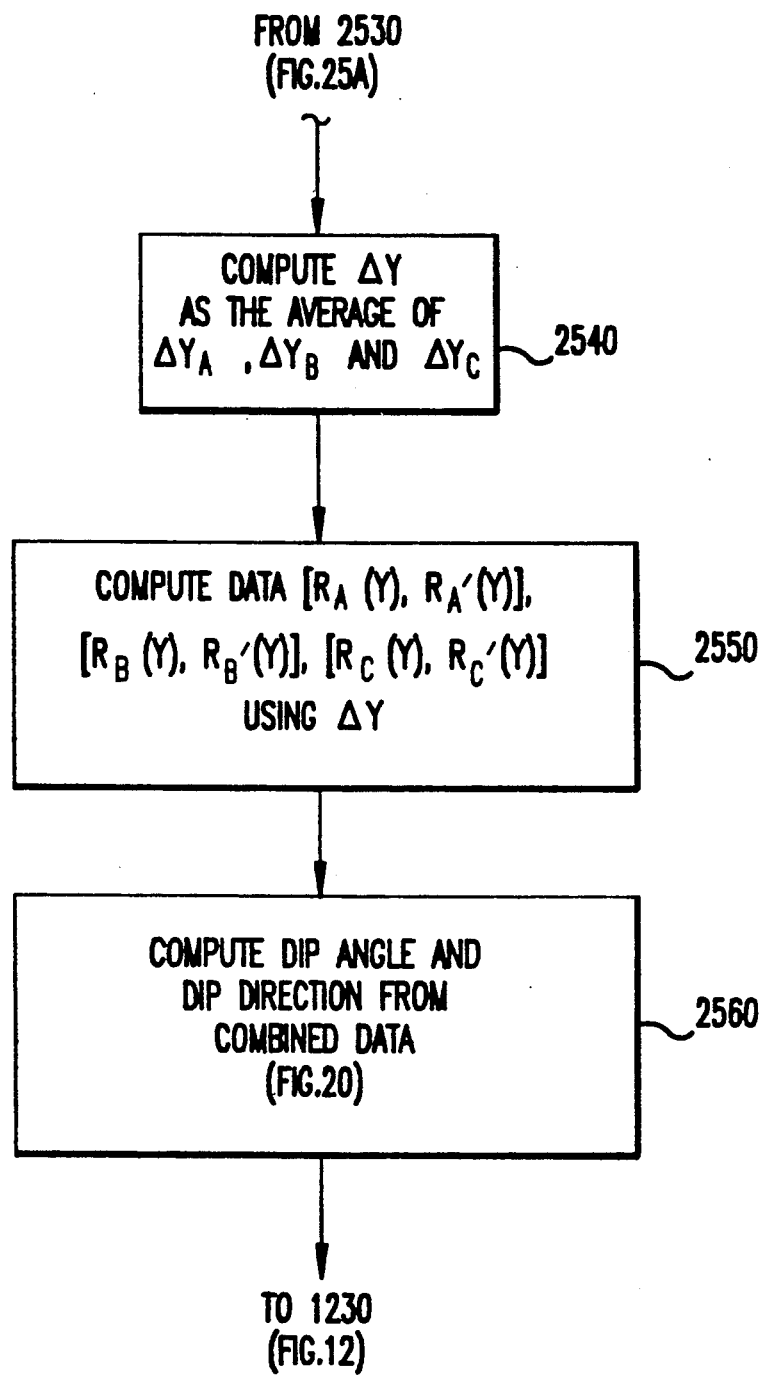

Referring to FIG. 25, there is shown a flow diagram of a routine for implementing the combining of data from different depth levels in accordance with the technique described in conjunction with equations (8), (9) and FIGS. 21-24. The block 2510 represents the reading in of two sets of data from the array taken at two different times, along with the angular (azimuthal) information associated with each data set. As before, the earlier data set is designated $R_A(Y)$ and the newer data set is designated $R_A'(Y)$. These data sets are correlated (block 2515) to obtain an offset designated $Y_{AA}'$. This correlation can be performed in the manner of the correlation described in conjunction with the flow diagram of FIG. 20. The correlation procedure can then be repeated for the B array and the C array to obtain $Y_{BB}'$ and $Y_{CC}'$, respectively, as represented by the block 2525. The values of $\Delta Y_A$, $\Delta Y_B$ and $\Delta Y_C$ can then be computed (block 2530) using equations (9a), (9b), and (9c). The average axial movement, $\Delta Y$, can then be obtained (block 2540) by averaging the values $\Delta Y_A$, $\Delta Y_B$, and $\Delta Y_C$. Next, as represented by the block 2550, the data taken before and after the movement, for each array, can be combined by implementing the determined offset ($\Delta Y$) and, for example, averaging that portion of the data which overlaps. Reference can be made to the example FIG. 24. The combined (or appended) data can then be utilized, in the manner previously described, to obtain dip angle and dip direction, as represented by the block 2560. Limitations on the axial extent of a section of data, with regard to determination of relatively large dip angles, can therefore be avoided, since relatively long data sequences are available to "see" such dips. It will be understood that the technique just set forth can also be generally employed for determination of penetration distance or of rate of penetration, when the time between data acquisition is used as an input.

In a further embodiment of the invention, measurement signals from two or more longitudinally spaced electrodes are utilized to obtain azimuthal resistivity measurements around the borehole by exploiting the natural rotation of the drill string (or, at least, the portion of the bottom hole assembly that includes the measurement subassembly 200). This embodiment can handle dip angles that approach 90 degrees. Under normal operating conditions, the measurement subsystem will not move a significant axial distance during a single revolution of the tool. For a typical case, with a rate of penetration of 60 feet per hour, and 120 RPM, the average axial displacement is only 0.1" during a full rotation of 360°. If desired, a single array (of two or more electrodes) can be used to obtain the azimuthal data. With three arrays, only 120° of rotation is required to produce a full 360° electrical scan. Resistivity traces can be recorded from each electrode as a function of the electrode's azimuth, using an azimuth-driven acquisition, as previously described. Assume that 2M+1 measurements are taken equally spaced around the borehole for each electrode, and assume insignificant axial motion of the measurement subassembly during a rotation. For this case, an electrode on array A with axial position $Y_P$, measures the resistivities $\{R_A(Y_P,\Phi_1), R_A(Y_P,\Phi_2), \ldots, R_A(Y_P,\Phi_{2M+1})\}$, at equally spaced azimuthal angles $\{\Phi_1, \Phi_2, \ldots, \Phi_{2M+1}\}$ (see FIGS. 26 and 27). These angles satisfy a modular condition, $\Phi_J = \Phi_{J+2M+1}$. For N electrodes on an array, there are $(2M+1)N$ resistivity values for each array per revolution.

Figure 26:
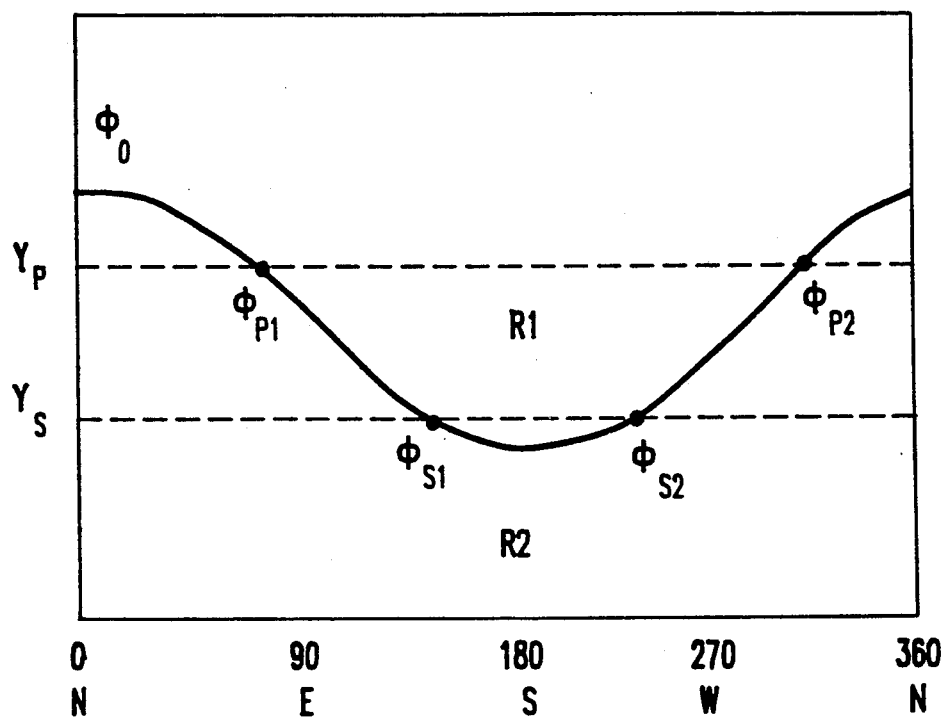
FIG. 26 shows the position of a bed boundary on the borehole wall as a function of azimuth, and the angles at which the bed boundary is crossed at two electrode positions.

The intersection of the bed boundary with the borehole wall is described by the sinusoidal function of equation (1), and illustrated in FIG. 26. The bed boundary crosses $Y=Y_P$ at two angles, $\Phi_{P1}$ and $\Phi_{P2}$, and crosses $Y=Y_S$ at two angles, $\Phi_{S1}$ and $\Phi_{S2}$. If these two angles are measured, then the dip direction, $\Phi_0$, can be found from a simple average:

$$\Phi_0 = \frac{\Phi_{P1} + \Phi_{P2}}{2} \pm 0°, \pm 180°, \text{ or} \quad (10)$$

$$\Phi_0 = \frac{\Phi_{S1} + \Phi_{S2}}{2} \pm 0°, \pm 180°.$$

The updip direction can be established by noting that the angle between $\Phi_{P1}$ and $\Phi_0$ must be less than the angle between $\Phi_{S1}$ and $\Phi_0$. The dip angle can then be found from the equation:

$$\text{TAN}(\delta) = \frac{2(Y_P - Y_S)}{D_h[\cos(\Phi_{P1} - \Phi_0) - \cos(\Phi_{S1} - \Phi_0)]}. \quad (11)$$

Figure 27:
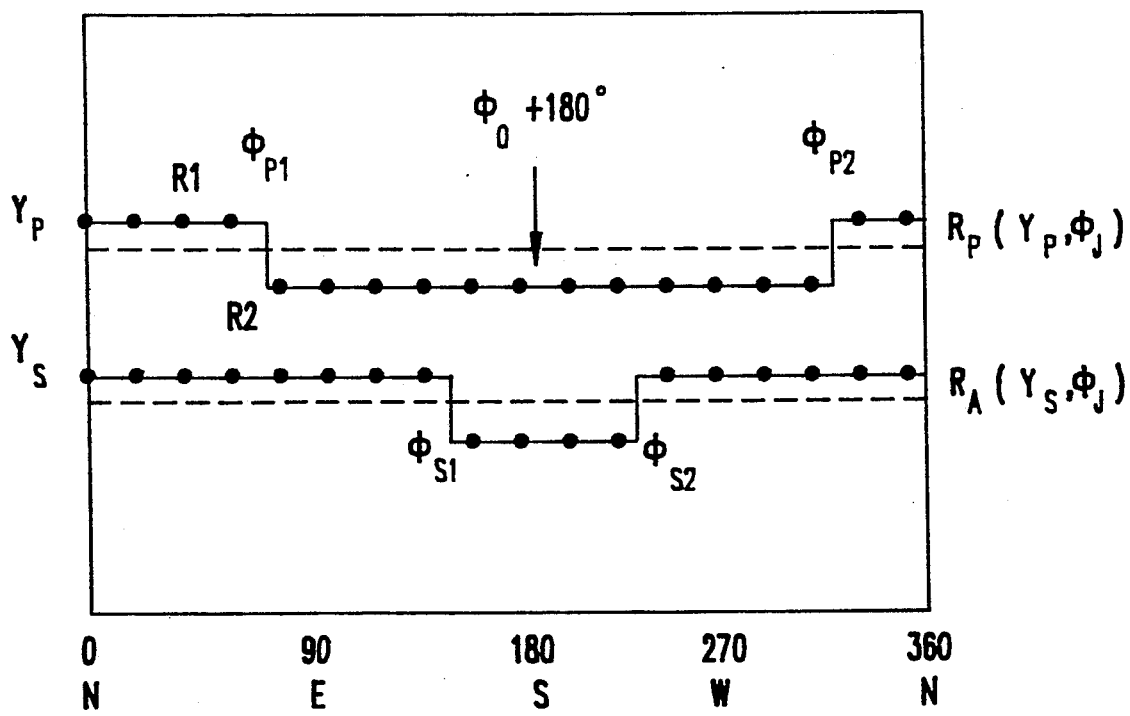
FIG. 27 illustrates measured resistivity at the two electrode positions, as a function of azimuth, for the example of FIG. 26.
Figure 28A:
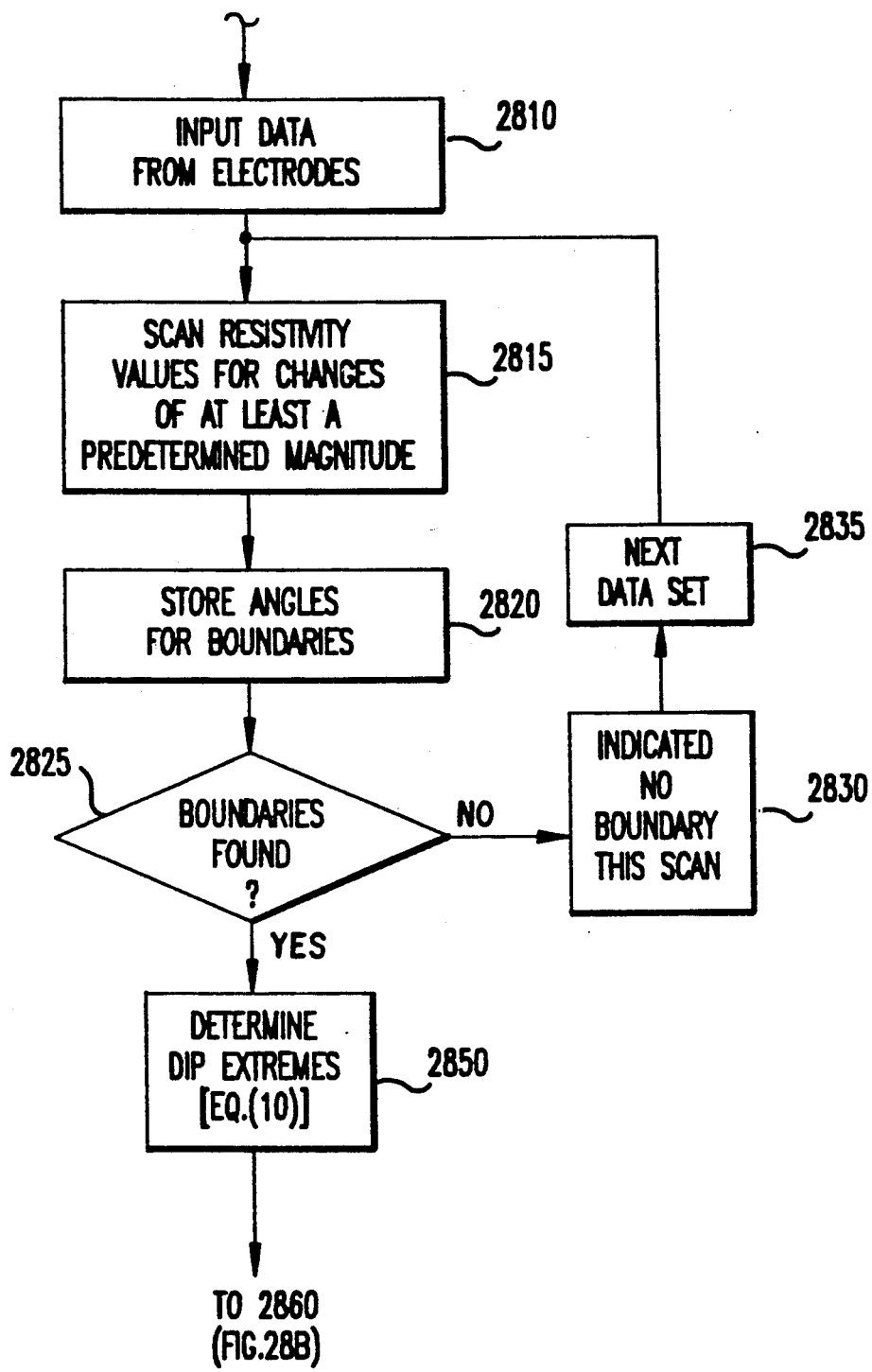
FIG. 28, which includes FIGS. 28A and 28B placed one below another, is a flow diagram of a routine for controlling a processor to implement a technique for determining dip characteristics in accordance with an embodiment of the invention.
Figure 28B:
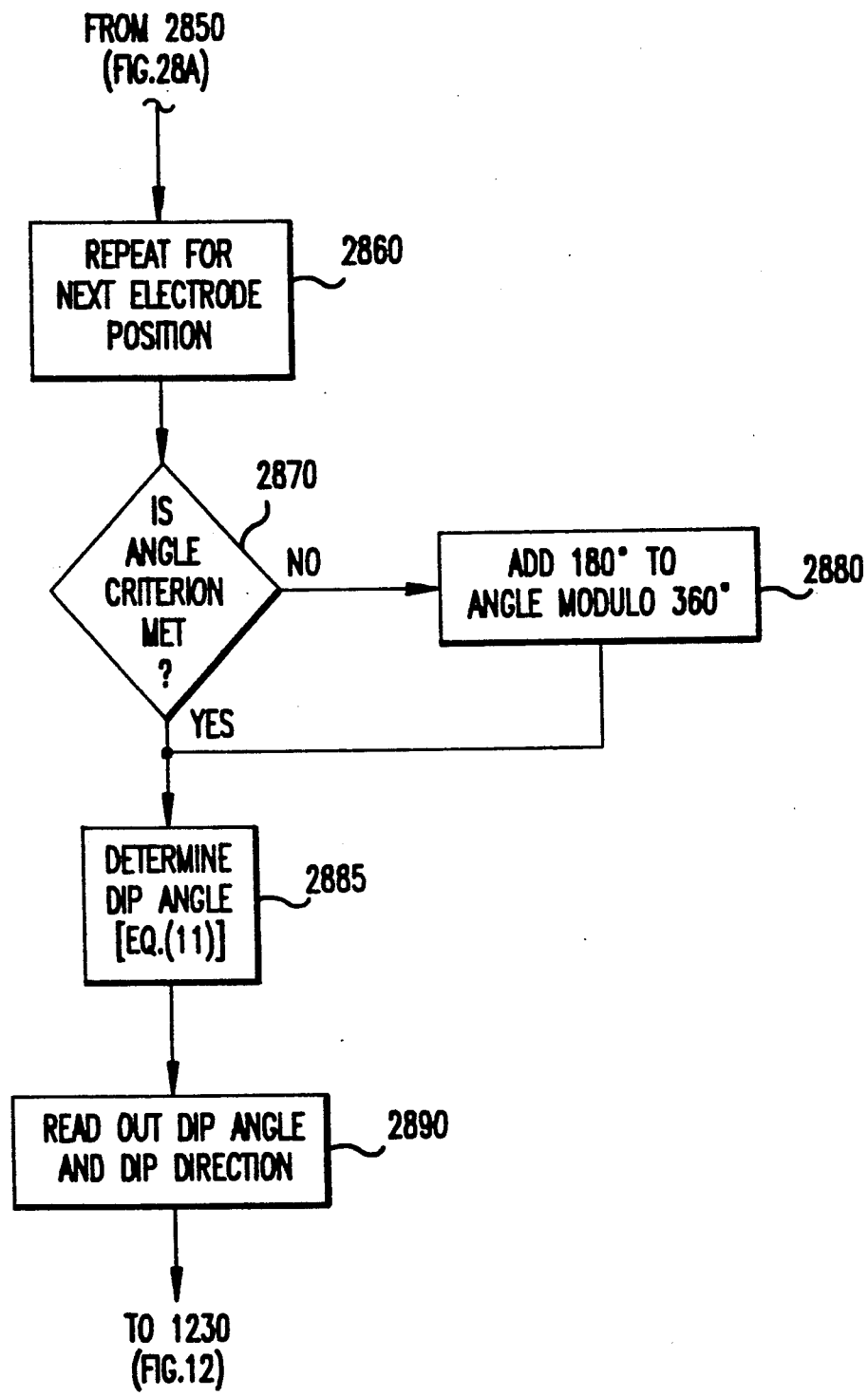

Referring to FIG. 28, there is shown a flow diagram of a routine for controlling a processor, such as the processor 1125 of FIG. 11, to implement the technique hereof as described in conjunction with FIGS. 26 and 27. The block 2810 represents the inputting of data from the electrodes; that is, data as illustrated in FIG. 27. The resistivity values (e.g. $R_A(Y_P)$), as a function of azimuthal angle, are scanned to determine the presence of point-to-point changes (or changes over a predetermined number of points) of at least a predetermined magnitude (block 2815). The azimuthal angles at which such changes occur (e.g. $\Phi_{P1}$, $\Phi_{P2}$—FIG. 27), are stored (block 2820). The change can be either an increase or a decrease, the polarity of the change being noted and stored. Inquiry is then made (diamond 2825) as to whether successive changes of at least the predetermined magnitude and of opposite polarity were found during the scan of data. If not, an indication is produced (block 2830) that no detectable dipping bed boundary was crossed at the electrode position, and the next data set is considered (block 2835). If boundary angles are found, the dip extremes are determined (block 2850) in accordance with the relationship (10) as the midpoints between the angles at each electrode position, plus or minus 180°. The procedure is then repeated (block 2860) for the second electrode position to obtain $\Phi_{S1}$ and $\Phi_{S2}$. The dip direction can then be obtained, by determining whether the angle between $\Phi_{P1}$ and $\Phi_0$ is less than the angle between $\Phi_{S1}$ and $\Phi_0$ (diamond 2870). If so, the angle $\Phi_0$ is the dip direction. If not, the angle $\Phi_0$ is the down-dip direction, and the dip direction is determined as $(\Phi_0+180°)$ modulo 360° (block 2880). The dip angle can then be determined from equation (11), as represented by the block 2885, and the dip angle and dip direction can be read out (block 2890).

Figure 29:
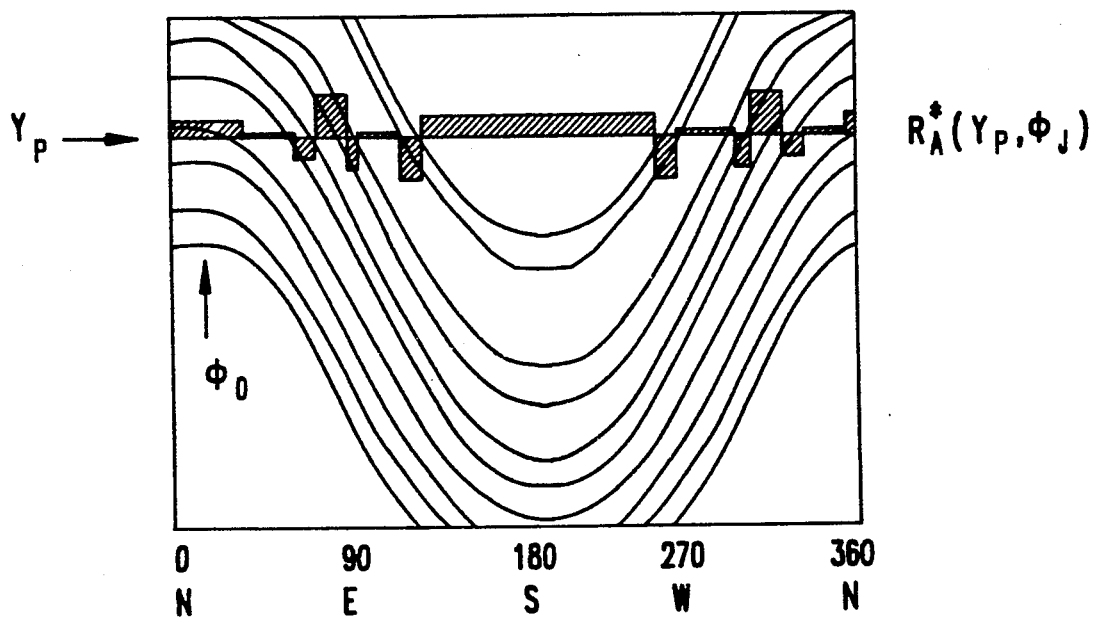
FIG. 29 illustrates several thin beds intersecting a borehole, and the resistivity as a function of azimuth at an electrode position.

It will be understood that a sharp transition between two dipping beds, and well-defined signals resulting therefrom, as illustrated in FIGS. 26 and 27, are for purposes of illustration. The routine of FIG. 28 is useful in understanding the general approach, but would be of practical use only where distinct resistivity markers are present in the signals in the type of bedding situation shown, and this is not the usual case. Subsequent routines, which employ correlation techniques, handle more general cases for intersection of two or more beds, irregular signals, noise, etc., and correlation between multiple electrode pairs at multiple spacings. In practice, several thin, dipping beds may cross the borehole over the region scanned by the electrode array, as illustrated in FIG. 29. The routine used to obtain dip direction and dip angle should be sufficiently robust to account for multiple beds and for some degree of inconsistency in the signal patterns. This can be achieved using correlation techniques, such as are described next.

In FIG. 29 the dip direction $\Phi_0$ can be found by correlating the resistivity data in one azimuthal scan, $\{R_A(Y_P,\Phi_1), R_A(Y_P,\Phi_2), \ldots, R_A(Y_P,\Phi_{2M+1})\}$, with its mirror image (see FIGS. 30A and 30B). For each angle $\Phi_J$ (the point around which the signal is reflected or "reversed"), the resistivity values at $\Phi_{J-K}$ are correlated with the resistivity values at $\Phi_{J+K}$. Due to the symmetries involved, if $\Phi_J = \Phi_o$ or $\Phi_J = \Phi_o + 180°$, the mirror image of the resistivities about $\Phi_J$ will be substantially the same as the original image. These two angles correspond to the maxima of the correlation function:

$$C(P, J) = \frac{\sum_{K=-M}^{M} R^*_A(Y_P, \Phi_{J+K}) R^*_A(Y_P, \Phi_{J-K})}{\sum_{K=-M}^{M} \{R^*_A(Y_P, \Phi_K)\}^2} \quad (12)$$

where $$R^*_A(Y_P, \Phi_J) = R_A(Y_P, \Phi_J) - \frac{1}{2M+1} \sum_{K=-M}^{M} R_A(Y_P, \Phi_K). \quad (13)$$

The resistivity data is processed according to these equations, and $\Phi_o$ is assigned to a maximum of C(P,J). The possibility that $\Phi_o$ is assigned to the wrong maximum (that is, the down-dip direction rather than the up-dip direction) is treated hereinbelow.

Figure 31:
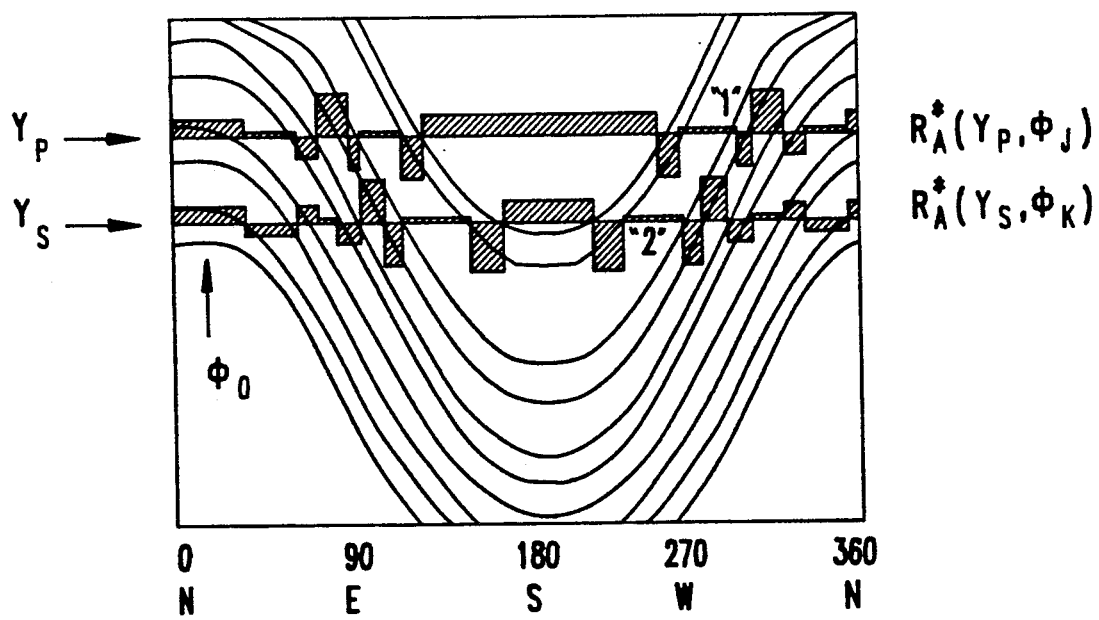
FIG. 31 shows several thin dipping beds intersecting a borehole as in FIG. 29, in this case with resistivity as a function of azimuth at two axially spaced electrode positions.

Once the dip direction is estimated, the dip angle ($\delta$) is computed by correlating azimuthal traces at different heights (i.e. $Y_P$ and $Y_S$), as illustrated in FIG. 31. The two traces are correlated by explicitly taking the dip effect into account. Consider the feature in the upper resistivity trace of FIG. 31 labelled "1" with coordinates $(Y_P,\Phi_J)$. It correlates with the feature labelled "2" with coordinates $(Y_S,\Phi_K)$ in the lower resistivity trace.

The two features' coordinates are related by the equation:

$$\cos(\Phi_K - \Phi_0) = \cos(\Phi_J - \Phi_0) - \frac{2(Y_P - Y_S)}{D_h \text{TAN}(\delta)} \quad (14)$$

In this equation, once $\Phi_o$ has been determined, the dip $\delta$ is an unknown quantity that can be determined since the other quantities $Y_P$, $Y_S$, and $D_h$ are known. A trial value can be assigned to $\delta$ between the limits of $-90°$ to $90°$. A negative value for $\delta$ accounts for the possibility that $\Phi_o + 180°$ was obtained from the self-correlation procedure described above. The procedure is described in conjunction with the flow diagrams hereinbelow.

Figure 32:
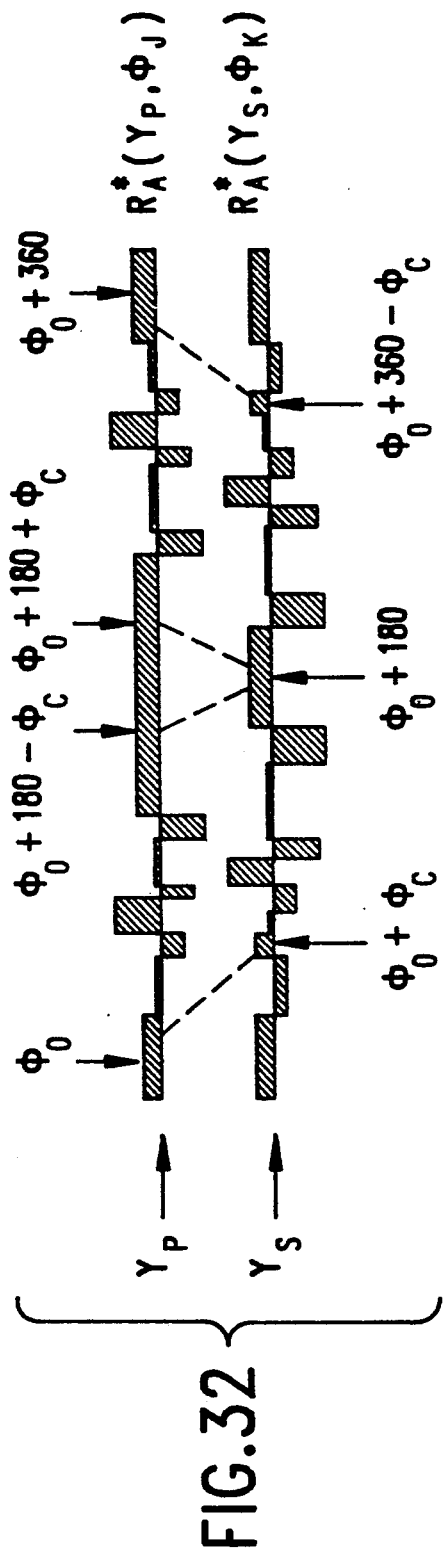
FIG. 32 illustrates correlation between the resistivities measured at the electrode positions in FIG. 31.

The correlation between the two resistivity traces does not extend over all angles. The features between $(\Phi_0 + 180° - \Phi_C)$ and $(\Phi_0 + 180° + \Phi_C)$ in the upper trace of FIG. 32 do not correspond to any features in the lower trace, and should not be included in the correlation range. Similarly, only the features between $(\Phi_0 + \Phi_C)$ and $(\Phi_0 + 360° - \Phi_C)$ in the lower trace correspond to features in the upper trace, and should be included. The critical angle, $\Phi_C$, is found from the equation:

$$\Phi_C = \Phi_0 + \cos^{-1}\left[1 - \frac{2(Y_P - Y_S)}{D_h \text{TAN}(\delta)}\right]. \quad (15)$$

The appropriate correlation function is:

$$C(P, S) = \frac{\sum_J R^*_A(Y_P, \Phi_J) R^*_A(Y_S, \Phi_K)}{\sqrt{\sum_J R^*_A(Y_P, \Phi_J)^2 \sum_K R^*_A(Y_S, \Phi_K)^2}}, \quad (16)$$

where J and K are limited so that $\Phi_J$ and $\Phi_K$ remain within the ranges described above, where $\Phi_K$ is a function of $\Phi_J$ given by equation (14), and where $R^*_A(Y_P, \Phi_J)$ and $R^*_A(Y_S, \Phi_K)$ are obtained from $R_A(Y_P, \Phi_J)$ and $R_A(Y_S, \Phi_K)$ by subtracting constants from each, such that they have an average value of zero over the limited angular ranges used in the correlation function. The maximum of $C(P,S)$ is the estimate of $\delta$ for these two azimuthal resistivity traces. As described below, correlations can be computed with the other electrodes in the array, and all estimates combined via a weighted average to obtain the final estimate for $\delta$ at each depth in the borehole.

Figure 33A:
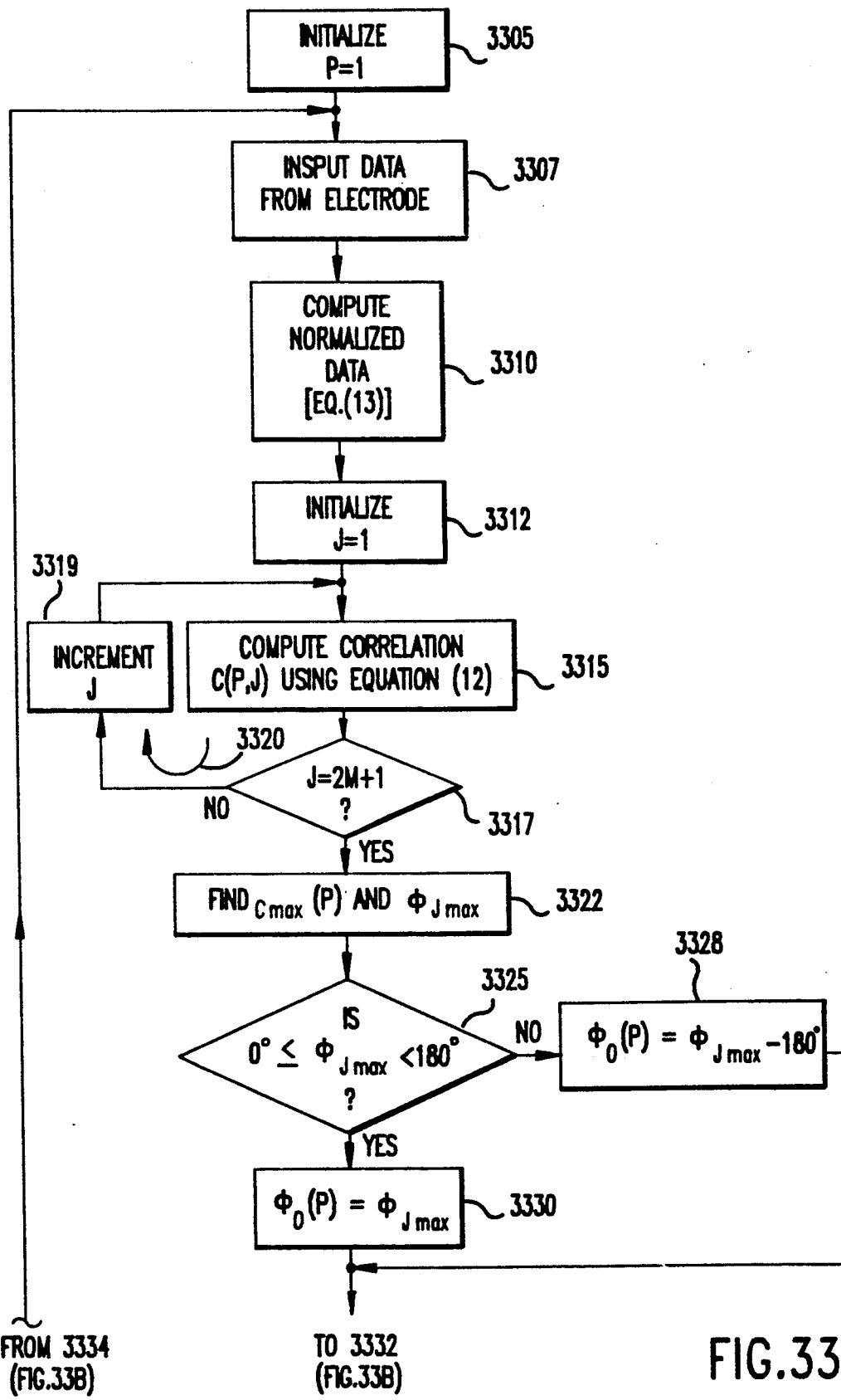
FIG. 33, which includes FIGS. 33A, 33B and 33C placed one below another, is a flow diagram of a routine for controlling a processor to determine formation dip angle and dip azimuth in accordance with the techniques described in conjunction with FIGS. 29–32.
Figure 33B:
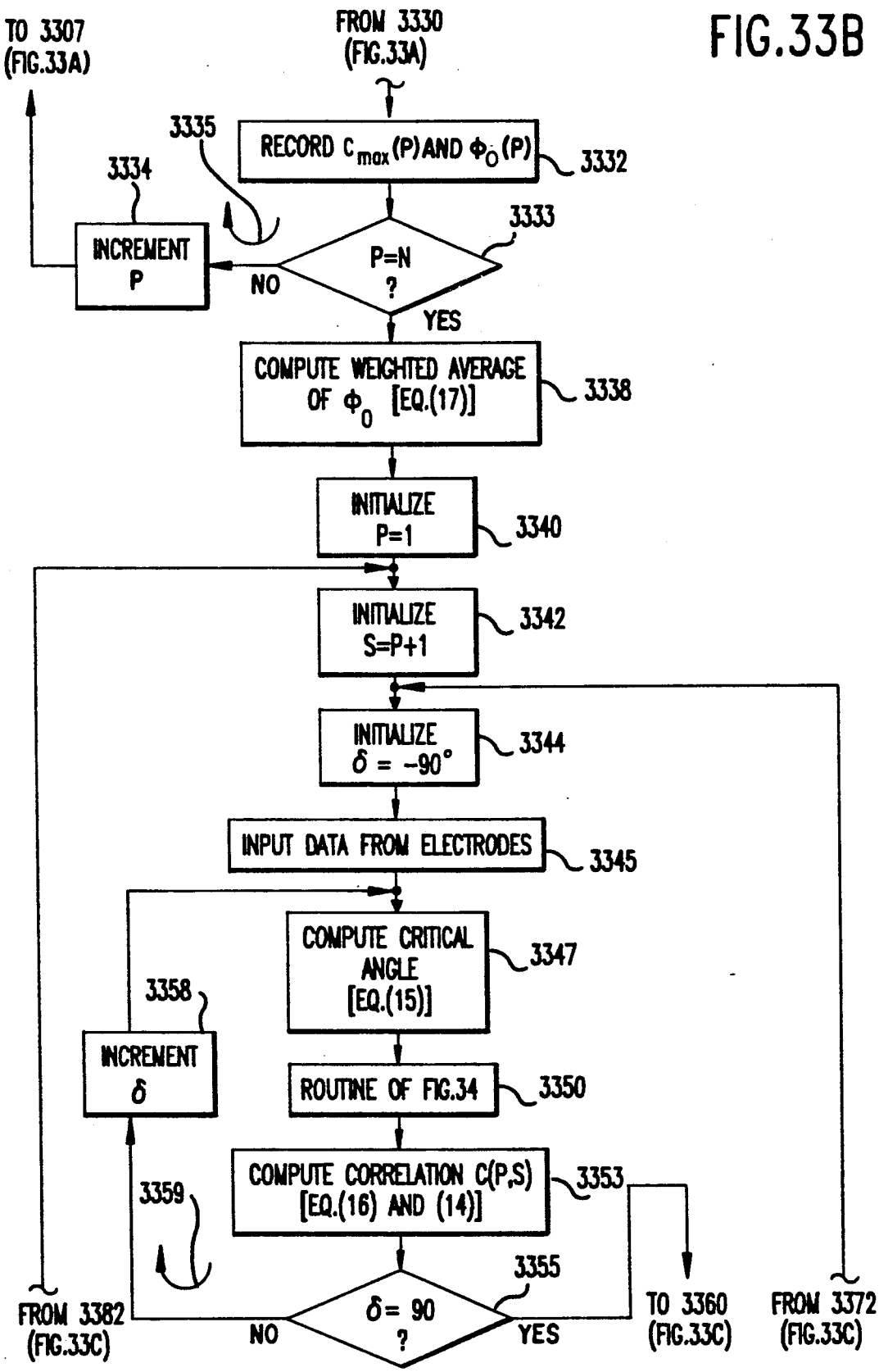
Figure 33C:
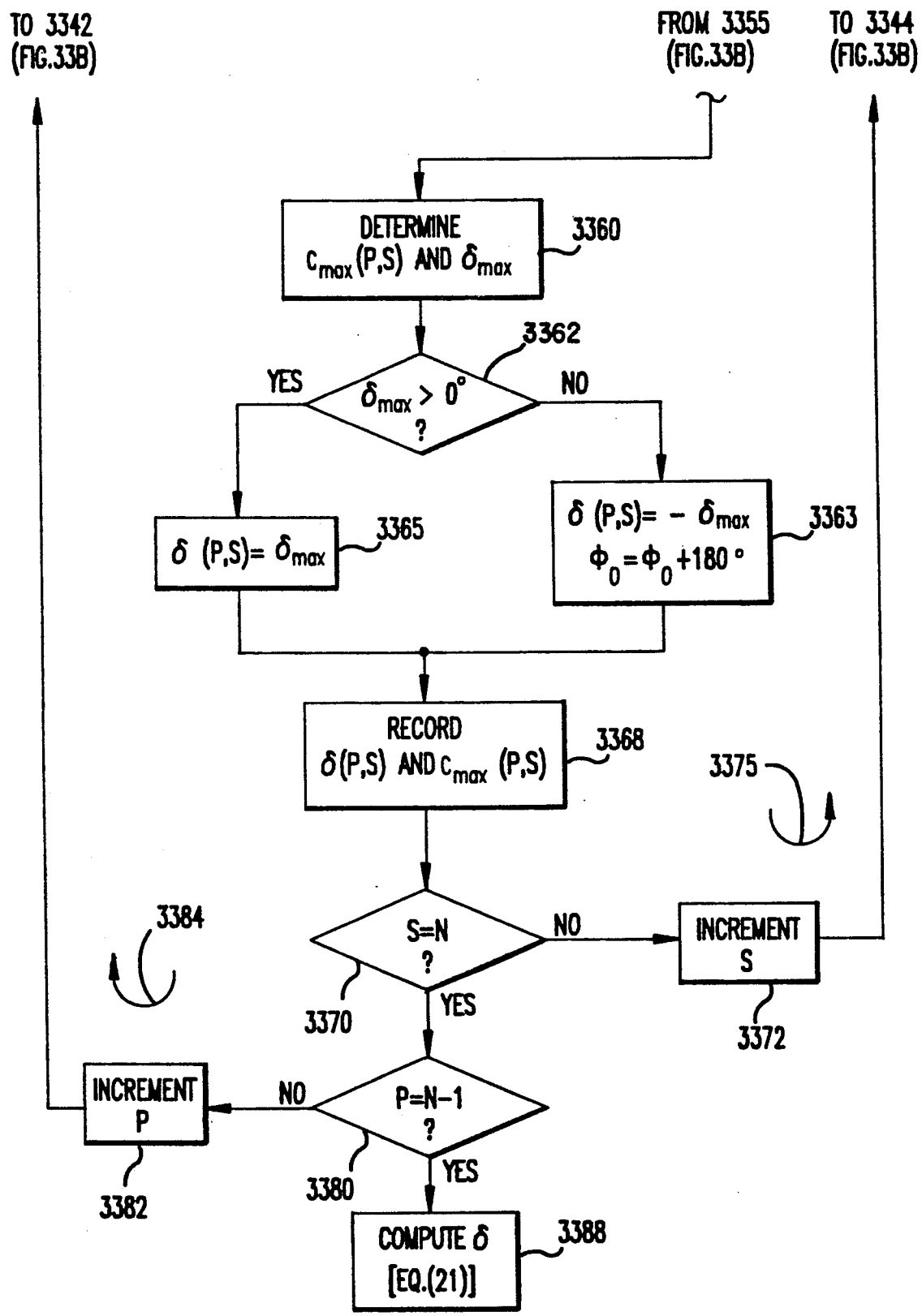

FIG. 33 is a flow diagram of a routine for controlling a processor (such as processor 1125) to determine dip direction and dip angle as described in conjunction with FIGS. 29-32. An electrode index P is initialized at 1, as represented by the block 3305. The resistivity data, as a function of azimuthal angle, is then read in (block 3307). The data, such as from array A (it being understood that it can come from more than one array) is represented as $R_A(Y_P,\Phi_1), R_A(Y_P,\Phi_2) \ldots R_A(Y_P,\Phi_{2M+1})$. The normalized data values $R_A^*(Y_P,\Phi_J)$ can then be computed (block 3310) in accordance with equation (13). An index J is then initialized (block 3312), the azimuthal angle $\Phi_J$ being the angle around which the data is reversed, as previously described. The correlation C(P,J) is then computed (block 3315) using equation (12), which correlates the data with the mirror image of itself, as reversed around the angle $\Phi_J$. Inquiry is made (diamond 3317) as to whether the last J has been reached. If not, J is incremented (block 3319), and the block 3315 is re-entered. When the last J has been considered, the block 3322 is entered, this block representing the determination, from the stored correlation values, of the maximum correlation, called $C_{max}(P)$, and the angle at which the maximum correlation occurs, called $\Phi_{Jmax}$.

As explained above, the maximum correlation could be either dip extreme (up-dip or down-dip), and the next portion of the routine arbitrarily forces $\Phi_{Jmax}$ to be less than 180 degrees. Resolution of the ambiguity is handled later, to obtain the correct dip direction (which is the up-dip direction by general convention and in the present embodiment).

The decision diamond 3325 represents inquiry as to whether $\Phi_{Jmax}$ is greater than or equal to 0 degrees and less than 180 degrees. If not, a provisional dip direction extreme, $\Phi_0(P)$ is set equal to $\Phi_{Jmax}$ minus 180 degrees (block 3328), and the block 3332 is entered. If the inquiry of diamond 3325 is answered in the affirmative, the provisional dip direction extreme value, $\Phi_0(P)$ is set equal to $\Phi_{Jmax}$ (block 3330) and the block 3332 is entered. The block 3332 represents the storing of $C_{max}(P)$ and $\Phi_0(P)$ for the current P. Inquiry is then made (diamond 3333) as to whether the last P has been reached. If not, P is incremented (block 3334), the block 3307 is re-entered, and the loop 3335 is continued until all electrodes have been considered. When this is the case, the block 3338 is entered, and a weighted average of $\Phi_0$ is obtained, for example using the following equation:

$$\Phi_0 = \frac{\sum_{P=1}^{N} C_{max}(P) \Phi_0(P)}{\sum_{P=1}^{N} C_{max}(P)} \quad (17)$$

Figure 34:
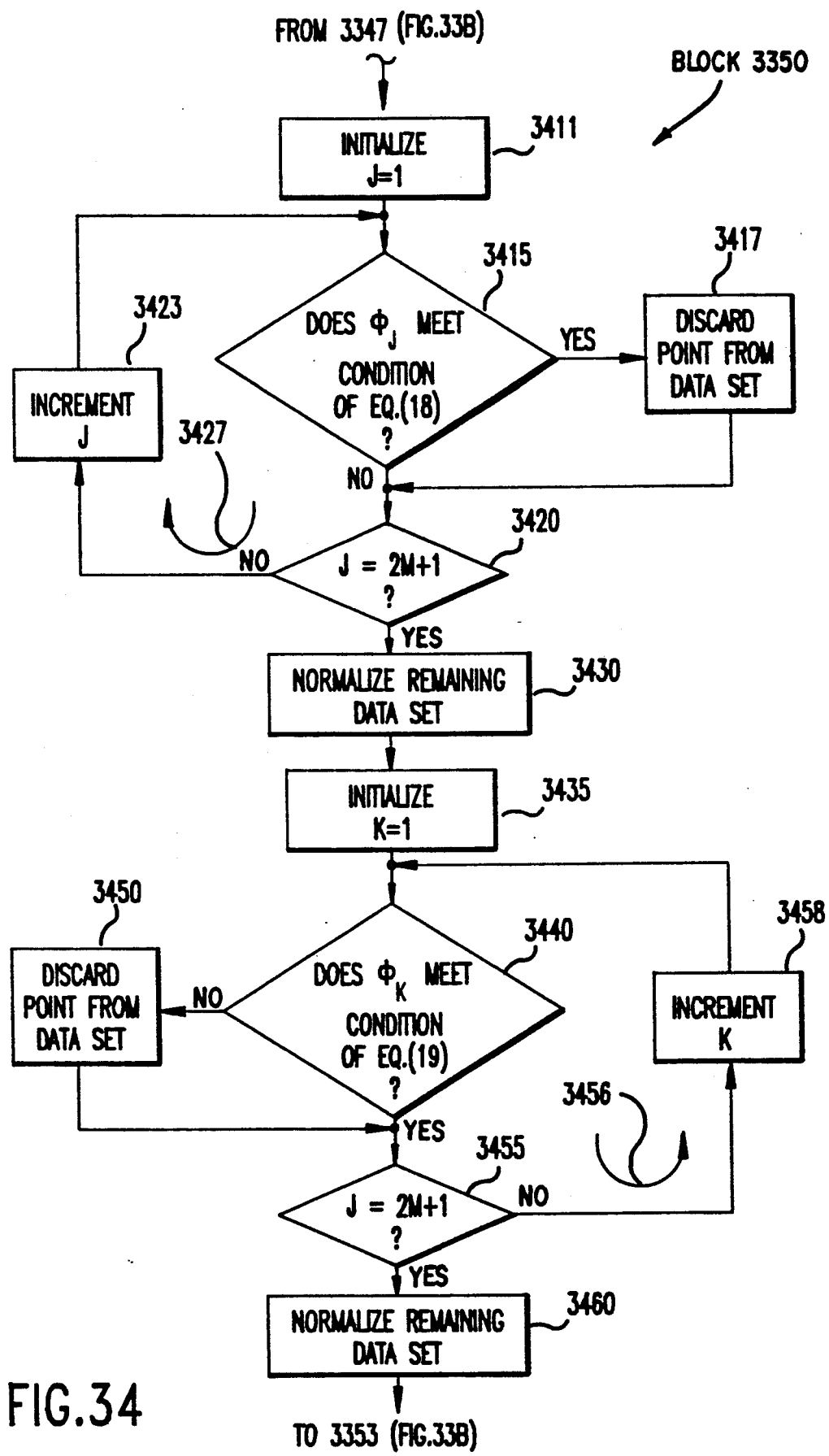
FIG. 34 is a flow diagram of part of the FIG. 33 routine.

In the next portion of the routine, correlations are performed between signals (in this embodiment, resistivity as a function of azimuth) for all electrode pairs of the array to obtain the dip angle and to resolve the dip direction ambiguity. Electrode indices P and S are used, with P running from 1 to N-1, and S running from 2 to N. The indices P and S are initialized at 1 and P+1, respectively, as represented by the blocks 3340 and 3342. The dip angle, $\delta$, is initialized at $-90$ degrees, as represented by the block 3334. Data is then read in for electrodes at the positions $Y_P$ and $Y_S$, as a function of azimuthal angle, as represented by the block 3345. The signals that were obtained from the electrode at $Y_P$ are $R_A(Y_P,\Phi_1), R_A(Y_P,\Phi_2) \ldots R_A(Y_P, \Phi_{2M+1})$. The signals that were obtained from the electrode at $Y_S$ are $R_A(Y_S,\Phi_1), R_A(Y_S,\Phi_2) \ldots R_A(Y_S,\Phi_{2M+1})$. Next, the critical angle, $\Phi_C$ is computed using equation (15), as represented by the block 3347. The block 3350 is then entered, this block representing a routine, described in conjunction with FIG. 34, which is used to select and normalize the data to be employed in the correlation, as first described in conjunction with FIGS. 31 and 32. Referring to the indicated FIG. 34, an index J is initialized at 1 (block 3411), and a test is made (diamond 3415) to determine if $\Phi_J$ lies in a range defined by the critical angle; namely, to determine if $$\Phi_0 + 180° - \Phi_C \leq \Phi_J \leq \Phi_0 180° + \Phi_C \quad (18)$$

If the condition of equation (18) is met, the data point $R_A(Y_P,\Phi_J)$ is discarded from the data set. Inquiry is then made (diamond 3420) as to whether the last J has been reached. If not, J is incremented (block 3423), diamond 3415 is re-entered, and the loop 3427 is continued until all J have been considered. Then, as represented by the block 3430, the remaining data set is normalized so that the average of the normalized values is zero. In the next portion of the routine of FIG. 34, the data from the electrode at $Y_S$ is considered. The index K is initialized at 1 (block 3435) and a test is made (diamond 3440) as to whether the following critical angle condition is met:

$$\Phi_0 + \Phi_C \leq \Phi_K \leq \Phi_0 + 360° - \Phi_C \quad (19)$$

If not, the data point $R_A(Y_S, \Phi_K)$ is discarded from the data set (block 3450). Inquiry is then made (diamond 3455) as to whether all K have been considered. If not, K is incremented (block 3458), diamond 3440 is re-entered, and the loop 3456 is continued until all K have been considered. The remaining data set is then normalized so that the average is 0 (block 3460), and return is implemented to FIG. 33.

Referring again to FIG. 33, the correlation of equation (16) can now be performed (block 3353) using the normalized data values. In the numerator of equation (16), $\Phi_K$ is related to $\Phi_J$ by equation (14), which can be re-written as:

$$\Phi_K = \Phi_0 + \cos^{-1}[\cos(\Phi_J - \Phi_0) - 2(Y_P - Y_S)/D_h \tan\delta] \quad (20)$$

In using equation (20), $\Phi_K$ can be computed as a function of $\Phi_K$, and then the closest value of $\Phi_K$ (or one obtained by interpolation) can be used in equation (16). Inquiry is then made (diamond 3355) as to whether $\delta$ has reached 90 degrees. If not, $\delta$ is incremented (block 3358), for example by 1 or 2 degrees, the block 3347 is re-entered, and the loop 3359 is continued until $\delta$ is 90 degrees. The maximum correlation $C_{max}(P,S)$, and the angle $\delta_{max}$ at which it occurs, are then determined, as represented by the block 3360. Determination is then made (diamond 3362) as to whether $\delta_{max}$ is greater than 0 degrees. If so, the dip angle for the present electrode pair (P,S) being considered, namely $\delta(P,S)$, is set equal to $\delta_{max}$, as represented by the block 3365. If not, as noted above, the wrong dip direction extreme is indicated. In such case, as represented by the block 3363, $\delta(P,S)$ is set equal to $-\delta_{max}$, and the dip direction is set equal to the provisional dip direction plus 180 degrees (thereby correcting the ambiguity). The block 3368 represents the recording of the dip and the maximum correlation for the present electrode pair (P,S). Inquiry is then made (diamond 3370) as to whether the last S has been reached. If not, S is incremented (block 3372), block 3344 is re-entered, and the loop 3375 is continued until all S have been considered for the current P. When this is the case, inquiry is made (diamond 3380) as to whether the last P has been reached. If not, P is incremented (block 3382), block 3342 is re-entered, and the loop 3384 is continued until all P have been considered. The dip angle, $\delta$, is then obtained, in the present embodiment, from a weighted average of the values of $\delta(P,S)$ in accordance with the following equation $$\delta = \frac{\sum_{P=1}^{N-1} \sum_{S=P+1}^{N} C_{max}(P,S)\delta(P,S)}{\sum_{P=1}^{N-1} \sum_{S=P+1}^{N} C_{max}(P,S)} \quad (21)$$

as represented by the block 3388. Processing can then be implemented for the next array position. It will be understood that other approaches can be used for solution of equation (15), for example simultaneous optimization of $\delta$ and $\Phi_0$.

FIGS. 35–39 illustrate an embodiment of equipment that can be utilized for obtaining signals representative of the instantaneous rotational orientation of the drill collar with respect to a reference direction, typically the high side of the borehole ("up") that is 180° from the direction of gravity ("down"). The instantaneous direction of a reference mark (for example, at the radial center of the stabilizer 220A) with respect to "up" is known in the art as "toolface".

Figure 35:
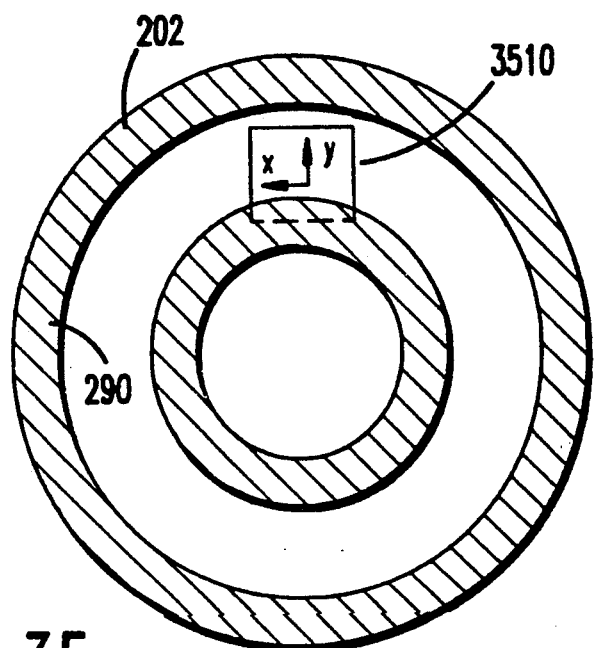
FIG. 35 is top view of a cross-section of a drill collar and chassis mounting a 3-axis magnetometer package utilized in an embodiment of the invention.
Figure 36:
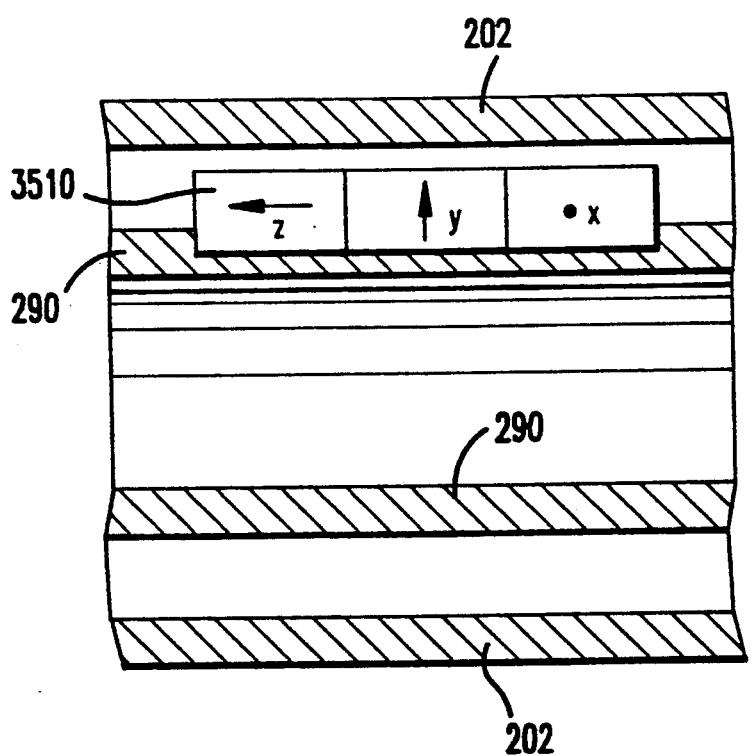
FIG. 36 is an axial cross-sectional view of the drill collar, chassis, and magnetometer package shown in FIG. 35.

Referring to FIGS. 35–39 there is shown an embodiment of a triaxial magnetometer package 3510 that can be utilized to obtain azimuth (or "magnetic toolface") relative to the tool axis direction (the z direction herein) while stationary or while rotating. The package 3510 can be mounted, for example, on the chassis 290 within drill collar 202, such as in conjunction with the circuit boards in the slot formed in the chassis 290 shown in FIG. 3. FIGS. 35 and 36 show the general relationship between the chassis 290, the magnetometer package 3510 and the drill collar 202. As seen in FIG. 36, the magnetometer package includes a z-component magnetometer, an x-component magnetometer, and a y-component magnetometer. The z-component magnetometer is oriented in a direction parallel to the drill collar direction (defined as the z-direction), and the x-component and y-component magnetometers are oriented in mutually perpendicular directions (the x-direction and y-direction, respectively) in the plane orthogonal to the z-direction. The y direction, for example, may be the direction pointing to the radial center of the stabilizer blade 220A o a known offset therefrom.

Figure 37:
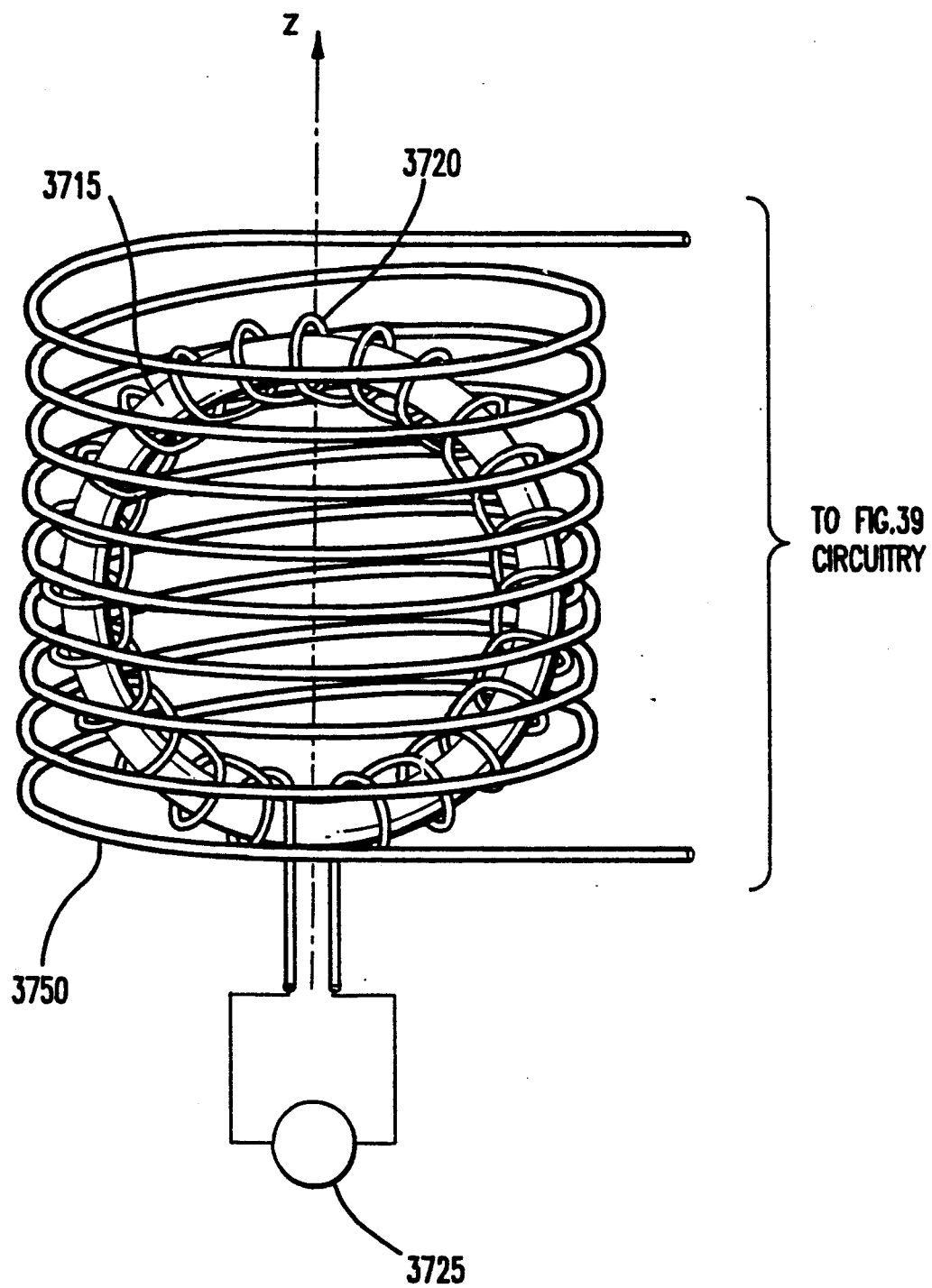
FIG. 37 is a schematic diagram, partially in block form, of a portion of a magnetometer utilized in an embodiment of the invention.
Figure 38:
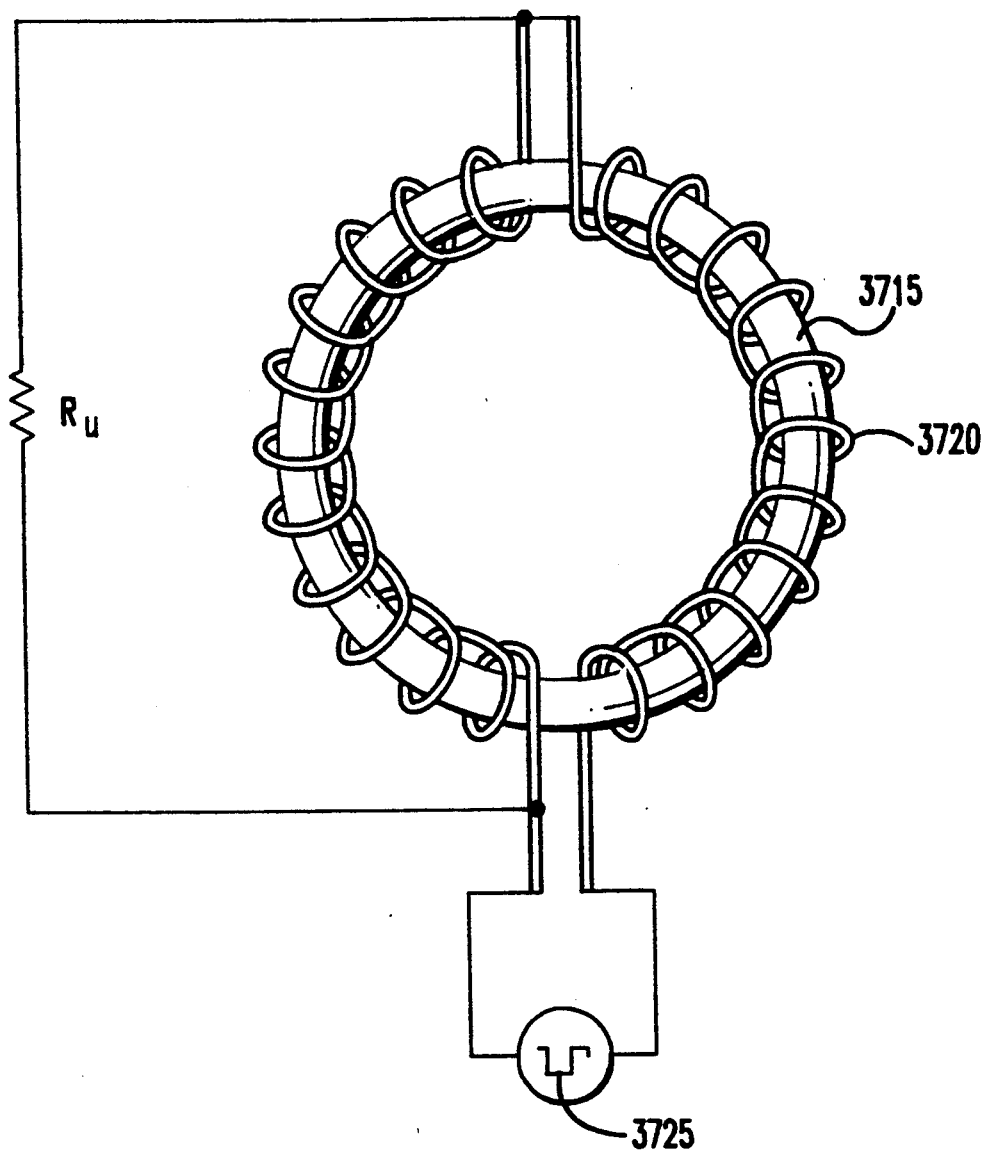
FIG. 38 is a schematic diagram, partially in block form, of a core and a toroidal winding utilized in the FIG. 37 magnetometer.

FIG. 37 illustrates an example of the z-component magnetometer. A toroidal core 3715 of magnetic material is wound with a toroidal drive winding 3720 coupled with drive circuitry 3725. A cylindrically wound pickup coil 3750, also coupled with circuitry to be described, surrounds the toroid. The axis of the pickup coil is in the z-direction, and the toroidal core is in a plane containing the z-direction. The pickup coil is coupled to circuitry described in conjunction with FIG. 39. The toroidal excitation coil 3720 is wound with a center tap, as shown in FIG. 38, in a manner such that one-half of the coil is imbalanced with an unbalancing resistor $R_u$.

Figure 39:
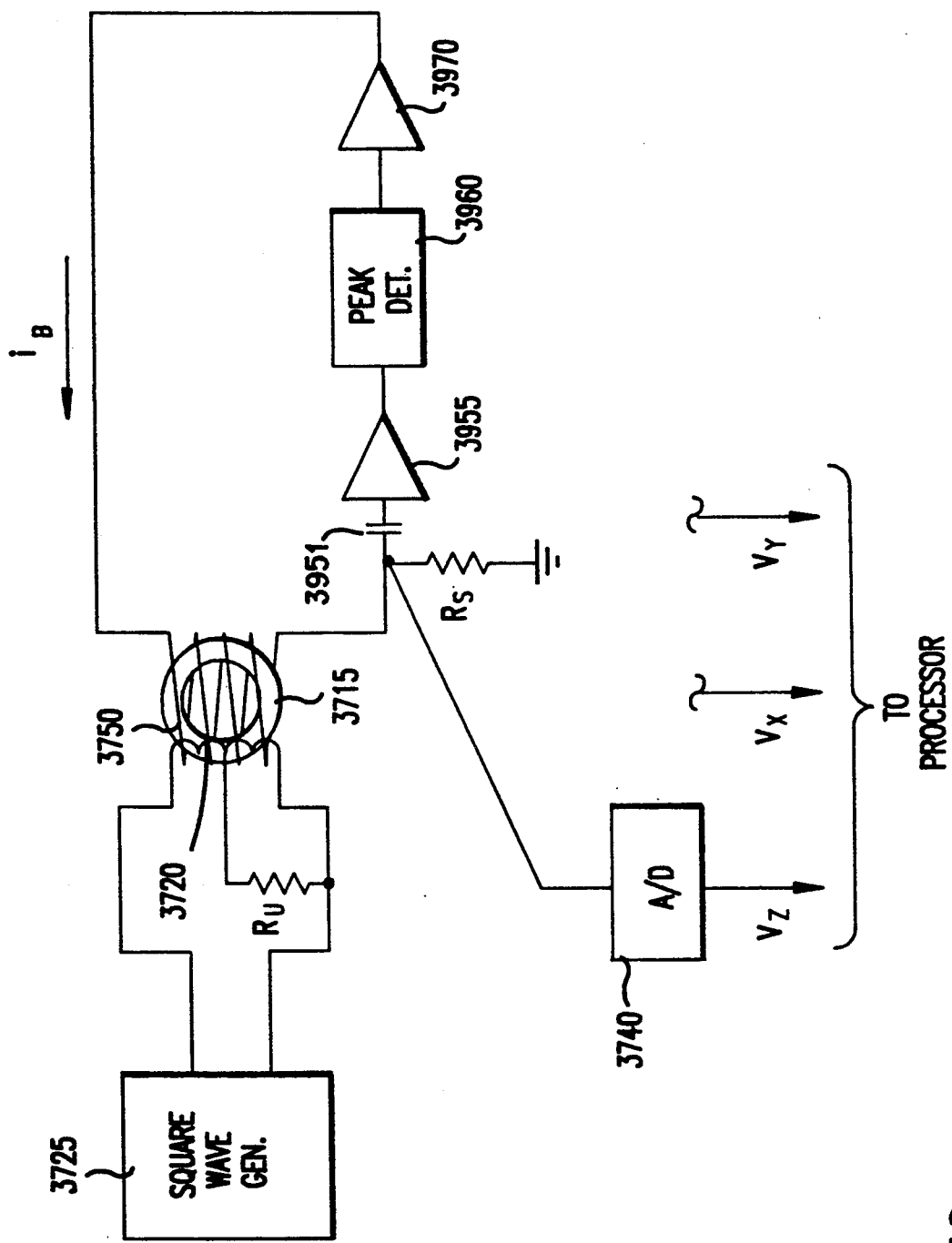
FIG. 39 is a schematic diagram, partially in block form, which illustrates the circuitry used in conjunction with the magnetometer of FIG. 37.

FIG. 39 shows the circuitry associated with the z-component magnetometer. The square wave generator 3725 is coupled to the input terminals of the toroidal excitation coil. The square wave generator and/or its output can be gated and/or controlled by the processor 1125 (FIG. 11). One end of the pickup coil 3750 is coupled, via capacitor 3951, to a high impedance amplifier 3955, such as an operational amplifier. The output of amplifier 3955 is coupled to peak detector 3960 and error amplifier 3970, the output of which is coupled to the other end of the pickup coil 3750. The current in pickup coil is sensed by a sensing resistor $R_s$, and the voltage across this resistor, $V_s$, indicative of the sensed current, is coupled to an analog-to-digital converter 3740. The output of analog-to-digital converter 3740 is a digital signal $V_z$, that is coupled to the processor 1125.

In operation, as the flux lines of the earth's magnetic field are drawn into and expelled from the core 3715, the flux in the pickup coil 3750 changes and an induced voltage appears across the terminals of the coil. The core material has a magnetic permeability which is a function of the magnetic flux in the core. At low flux levels the magnetic permeability is very high and the flux lines of the earth's field are drawn into the core. At high flux levels, the magnetic permeability is very low and the flux lines of the earth's field are not drawn into the core. The field which drives the core through its hysteresis loop is produced by the toroidal drive winding 3720. The square wave excitation (3725) alternately drives the core through the opposing saturation points of its hysteresis loop. The "gating" action of the core results from the alternation between the state of very low permeability (the saturation regions) and the state of very high permeability (the transition regions). When the permeability of the core is very low, the presence of the core has little effect on the flux lines of the earth's field. When the permeability of the core is very high, the lines of flux of the earth's field become highly concentrated in the core as they would be by a magnetic object.

As the core oscillates between states of very high and very low permeability, the flux lines of the earth's field are alternately drawn into and released from the core. The net magnetic field near the core, in the area enclosed by the pickup coil, increases and decreases at twice the frequency of the driving excitation. The changing flux in the area enclosed by the pickup coil induces a voltage at the terminals of the coil. Because of the particular shape of the hysteresis loop, the flux is expelled from the core much more quickly then it enters. Stated another way, the core goes into saturation more abruptly than it goes into the transition region. As a result, the primary pulse generated in the pickup coil when the core goes into saturation is larger and more distinct than the secondary pulse generated when the core enters the transition region. Since the core goes into saturation twice in each cycle (once on each end of the hysteresis loop), there are two primary pulses per cycle generated in the pickup coil. The two pulses have the same polarity since the change in flux enclosed by the pickup coil is independent of the direction (clockwise or counter clockwise) of the field which drives the core into saturation.

In the present embodiment, the waveform appearing at the terminals of the pickup coil is a series of pulses. The polarity of the pulses reverses if the direction of the ambient field is reversed, and the amplitude of the pulses goes to zero if the ambient field parallel to the axis of the pickup coil is zero. The magnitude and polarity of the pulses are proportional to the cosine of the angle between the ambient field and the pickup coil axis. In the illustrated circuit, the second harmonic pulse train is not used directly as a measure of the earth's field. Instead, a small DC current, $i_B$ in FIG. 39, is passed through the pickup coil to null out the component of the earth's field parallel to the axis of the coil. This is implemented by the feedback system of FIG. 39 which detects the peak amplitude of the primary pulses and generates a bucking current to null out the effect of earth's field.

Azimuths measured while rotating can be corrected for tool rpm. Since the subassembly is rotating, an observer on the subassembly will see a rotating magnetic field rather than a static field. The components of the earth's field perpendicular to the tool axis will be both attenuated and spatially delayed (angularly displaced) due to the eddy currents induced in the casing wall by the time-varying magnetic field, i.e., electromagnetic skin effect. If desired, correction can be implemented empirically by measuring the attenuations and phase shifts of the orthogonal components as a function of RPM and loading these into a reference table in the memory of the processor.

The x-component and y-component magnetometers can use the same circuitry, with orientations as previously described, to obtain signals designated $V_x$ and $V_y$ which, together with $V_z$, are coupled to processor 1125 as shown in FIG. 39. The azimuth (magnetic toolface, $\Phi_{tmag}$) can be determined from the inverse tangent of $(V_x/V_y)$.

The obtained magnetic toolface can, if desired be converted to gravity toolface. For example, assume that the subassembly 130 (FIG. 1) of bottom hole assembly 100 includes conventional direction and inclination ("D and I") measuring equipment, and that when the subassembly 130 is stationary the accelerometers and magnetometers therein can be used, in conventional fashion, to obtain the offset angle $\Phi_{diff}$ between the earth's magnetic direction and gravitational direction at the current location. (This will generally not change significantly in the time until the next rotational pause.) The gravitational toolface, $\Phi_{tg}$, can then be obtained from $\Phi_{tg}=\Phi_{tmag}+\Phi_{diff}$. It will be understood that other techniques can be utilized for determining the azimuth of the electrodes hereof, while stationary and/or while rotating. Stationary measurements of direction, inclination, and toolface (or components thereof) can be conventionally obtained using available equipment. Stationary measurements, or a series of such stationary measurements, could, of course, be utilized herein, even for the techniques that require measurements at different rotational orientations, at the disadvantage of acquisition speed. Conventional measurements can also be used to convert from measurements with respect to the borehole to measurements with respect to an earth's coordinate system. Clock synchronization of acquired measurement and directional signals can also be employed.

Figure 40:
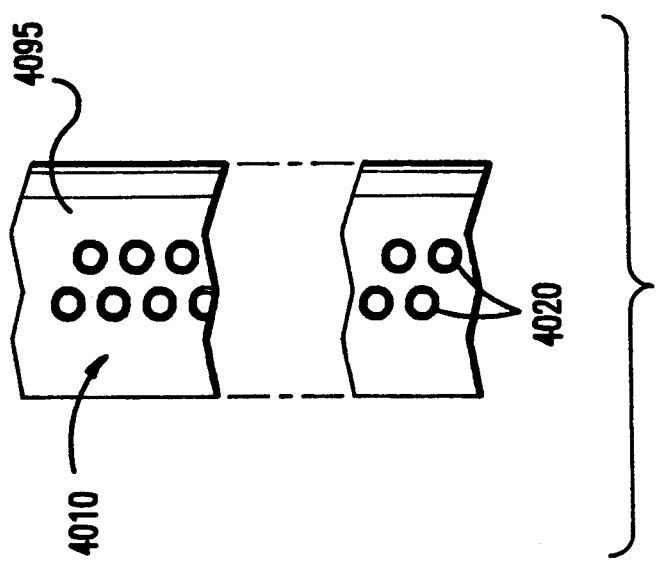
FIG. 40 is a partially broken away view of a stabilizer blade with an array of electrodes in accordance with an embodiment of the invention.

FIG. 40 illustrates a stabilizer blade 4095 having an array 4010 of electrodes 4020 that includes a plurality of columns with vertical positions staggered to achieve increased vertical resolution.

Figure 41:
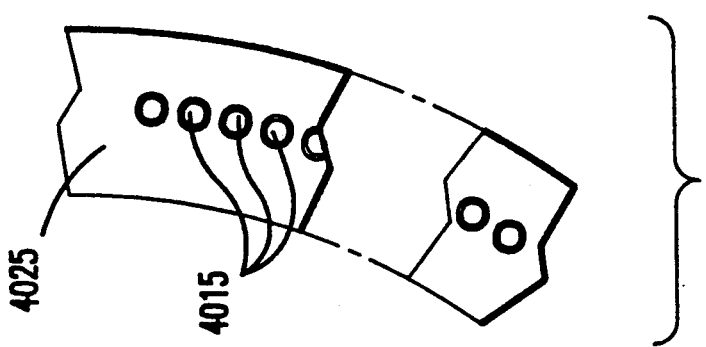
FIG. 41 is a partially broken away view of a curved stabilizer blade with an array of electrodes in accordance with an embodiment of the invention.

FIG. 41 illustrates electrode buttons 4015 on a curved stabilizer blade 4025, which can be used in place of previously illustrated straight stabilizer blades. The different fixed azimuthal spacings of the electrode buttons can be taken into account in processing, as in the cases for longitudinal and angular displacement treated above.

Figure 42:
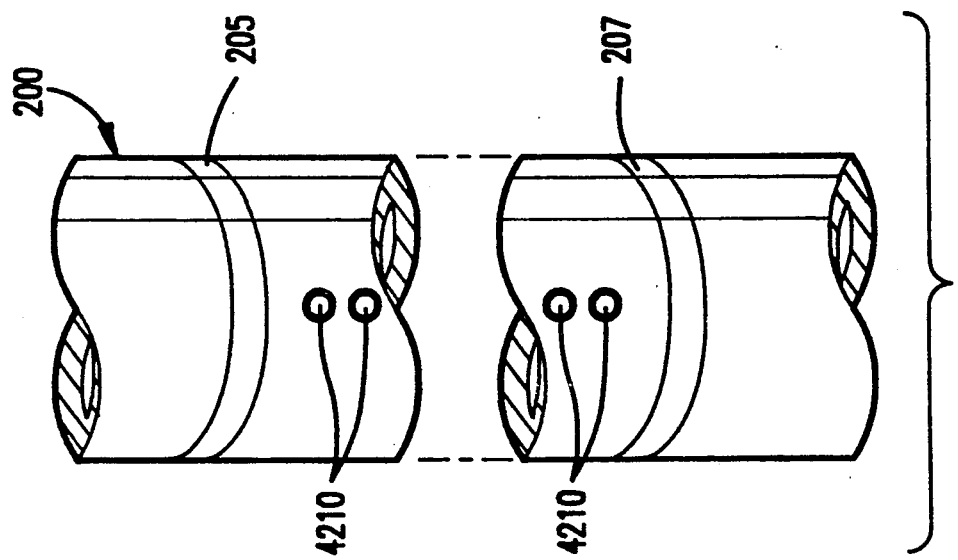
FIG. 42 is a partially broken away view of a drill collar with electrodes, in accordance with an embodiment of the invention.

FIG. 42 shows an embodiment wherein the array of transducers 4210 are mounted directly in drill collar 200, instead of on a stabilizer blade. The button electrodes can be mounted on a strip as in FIG. 8, and fitted through apertures in the drill collar. The toroidal coil antennas 205 and 207 and the associated circuitry, operate as previously described. The embodiment can be useful under conditions where use of a slick collar is indicated or beneficial.

The invention has been described with reference to particular preferred embodiments, but variations within the spirit and scope of the invention will occur to those skilled in the art. As an example, it will be understood that the transducers of the invention can be of other types. For instance, electrodes can be employed which measure the spontaneous potential ("SP") of the formations, or transducers can be utilized which operate on other principles, but which provide signal measurements or traces that can be correlated and utilized in the manner described and claimed herein. Also, while the described invention is particularly advantageous for measuring-while-drilling, features hereof have applicability to well logging in general, such as wireline logging; for example, use of arrays of several transducers to obtain signals from which dip characteristics are determined, and appending of signals from measurements taken with such arrays at different depth levels to obtain signals from which relatively high dip angles can be determined.

We claim:

1. A measuring-while-drilling system for determining a dip characteristic of formations surrounding a borehole being drilled in the earth by a drill bit at the end of a drill string, comprising:
a drill collar in said drill string;
a stabilizer blade mounted on said drill collar;
a plurality of transducers mounted in said stabilizer blade, said transducers having respectively different locations along the longitudinal direction of said drill collar;
means for producing indications of the relative rotational orientation of said drill collar;
means coupled with said transducers for generating a plurality of signals from measurements taken at respective ones of said plurality of transducers; and
means for determining a dip characteristic of said formations from said plurality of signals and said orientation indications.

2. The system as defined by claim 1, wherein said means for determining a dip characteristic of formations comprises means for determining the dip angle of said formations.

3. The system as defined by claim 1, wherein said means for determining a dip characteristic of formations comprises means for determining the dip direction said formations.

4. The system as defined by claim 2, wherein said means for determining a dip characteristic of formations further comprises means for determining the dip direction of said formations.

5. The system as defined by claim 1, wherein said transducers comprise electrodes.

6. The system as defined by claim 4, wherein said transducers comprise electrodes.

7. The system as defined by claim 1, wherein said stabilizer blade comprises a metal blade, and said transducers are metal button electrodes mounted in insulating media in said blade.

8. The system as defined by claim 4, wherein said stabilizer blade comprises a metal blade, and said electrodes are metal button electrodes mounted in insulating media in said blade.

9. The system as defined by claim 5, further comprising a toroidal coil antenna disposed on said drill collar, and means for energizing said toroidal coil antenna to induce a current which travels in a path that includes said drill collar and said formations; and wherein said means for generating signals comprise means for measuring the electrical effect of said current on said electrodes.

10. The system as defined by claim 6, further comprising a toroidal coil antenna disposed on said drill collar, and means for energizing said toroidal coil antenna to induce a current which travels in a path that includes said drill collar and said formations; and wherein said means for generating signals comprise means for measuring the electrical effect of said current on said electrodes.

11. The system as defined by claim 7, further comprising a toroidal coil antenna disposed on said drill collar, and means for energizing said toroidal coil antenna to induce a current which travels in a path that includes said drill collar and said formations; and wherein said means for generating signals comprise means for measuring the electrical effect of said current on said electrodes.

12. The system as defined by claim 9, wherein said toroidal coil antenna is disposed on said drill collar toward one end of said stabilizer blade, and further comprising a second toroidal coil antenna disposed on said drill collar toward the other end of said stabilizer blade, and wherein said means for energizing said toroidal coil antenna is operative to energize said second toroidal coil antenna in phase opposition with said toroidal coil antenna.

13. The system as defined by claim 11, wherein said toroidal coil antenna is disposed on said drill collar toward one end of said stabilizer blade, and further comprising a second toroidal coil antenna disposed on said drill collar toward the other end of said stabilizer blade, and wherein said means for energizing said toroidal coil antenna is operative to energize said second toroidal coil antenna in phase opposition with said toroidal coil antenna.

14. The system as defined by claim 9, wherein said means for measuring the electrical effect on said electrodes comprises means for measuring the current flow in said electrodes.

15. The system as defined by claim 13, wherein said means for measuring the electrical effect on said electrodes comprises means for measuring the current flow in said electrodes.

16. The system as defined by claim 1, wherein said plurality of signals are stored during rotation of said drill collar, and wherein said means for determining a dip characteristic of said formations includes means for correlating at least one of said signals with a reversed version of itself to determine a dip direction of said formations.

17. The system as defined by claim 6, wherein said plurality of signals are stored during rotation of said drill collar, and wherein said means for determining a dip characteristic of said formations includes means for correlating at least one of said signals with a reversed version of itself to determine a dip direction of said formations.

18. The system as defined by claim 1, wherein said plurality of signals are stored during rotation of said drill collar, and wherein said step of determining a dip characteristic of said formations includes correlating at least one of said signals with at least another of said signals to determine an angular offset therebetween, and determining the dip angle of said formations from said angular offset.

19. The system as defined by claim 6, wherein said plurality of signals are stored during rotation of said drill collar, and wherein said step of determining a dip characteristic of said formations includes correlating at least one of said signals with at least another of said signals to determine an angular offset therebetween, and determining the dip angle of said formations from said angular offset.

20. The system as defined by claim 17, wherein said step of determining a dip characteristic of said formations further includes correlating said at least one of said signals with at least another of said signals to determine the dip angle of said formations.

21. The system as defined by claim 18, wherein said means for determining a dip characteristic of said formations includes means for correlating at least one of said signals with a reversed version of itself to determine a dip direction of said formations and to determine the up-dip direction of said formations.

22. The system as defined by claim 17, wherein said signals represent resistivity of the formations adjacent respective electrodes.

23. The system as defined by claim 19, wherein said signals represent resistivity of the formations adjacent respective electrodes.

24. The system as defined by claim 1, wherein said means for determining a dip characteristic of said formations includes means for correlating signals generated at a plurality of different rotational orientations of said drill collar.

25. The system as defined by claim 24, wherein said plurality of different rotational orientations comprises at least three different rotational orientations.

26. The system as defined by claim 1, wherein said plurality of transducers comprises several transducers.

27. The system as defined by claim 5, wherein said plurality of electrodes comprises several electrodes.

28. The system as defined by claim 1, further comprising:
a further stabilizer blade mounted on said drill collar;
a further plurality of transducers mounted in said further stabilizer blade, said further transducers having respectively different locations along the longitudinal direction of said drill collar;
means coupled with said further transducers for generating a further plurality of signals from measurements taken at respective ones of said further plurality of transducers;
and wherein said means for determining a dip characteristic of said formations is operative to determine said characteristic from said plurality of signals and said further plurality of signals.

29. The system as defined by claim 4, further comprising:
a further stabilizer blade mounted on said drill collar;
a further plurality of transducers mounted in said further stabilizer blade, said further transducers having respectively different locations along the longitudinal direction of said drill collar;
means coupled with said further transducers for generating a further plurality of signals from measurements taken at respective ones of said further plurality of transducers;
and wherein said means for determining a dip characteristic of said formations is operative to determine said characteristic from said plurality of signals and said further plurality of signals.

30. The system as defined by claim 28, wherein said further plurality of transducers comprise electrodes.

31. The system as defined by claim 28, wherein said means for determining a dip characteristic of said formations includes means for correlating said signals and said further signals.

32. The system as defined by claim 30, wherein said means for determining a dip characteristic of said formations includes means for correlating said signals and said further signals.

33. A measurement-while-drilling system for determining a dip characteristic of formations surrounding a borehole being drilled in the earth by a drill bit at the end of a drill string, comprising:
a drill collar in said drill string;
a plurality of transducers mounted in said drill collar, said transducers having respectively different locations along the longitudinal direction of said drill collar;
means for producing indications of the relative rotational orientation of said drill collar;
means coupled with said transducers for generating a plurality of signals from measurements taken at respective ones of said plurality of transducers; and
means for determining a dip characteristic of said formations from said plurality of signals and said orientation indications.

34. The system as defined by claim 33, wherein said means for determining a dip characteristic of formations comprises means for determining the dip angle or the dip direction of said formations.

35. The system as defined by claim 34, wherein said transducers comprise electrodes.

36. The system as defined by claim 35, wherein said transducers are metal button electrodes mounted in insulating media in said drill collar.

37. The system as defined by claim 36, further comprising a toroidal coil antenna disposed on said drill collar, and means for energizing said toroidal coil antenna to induce a current which travels in a path that includes said drill collar and said formations; and wherein said means for generating signals comprise means for measuring the electrical effect of said current on said electrodes.

38. The system as defined by claim 37, wherein said means for measuring the electrical effect on said electrodes comprises means for measuring the current flow in said electrodes.

39. The system as defined by claim 33, wherein said plurality of signals are stored during rotation of said drill collar, and wherein said means for determining a dip characteristic of said formations includes means for correlating at least one of said signals with a reversed version of itself to determine a dip direction of said formations.

40. The system as defined by claim 35, wherein said plurality of signals are stored during rotation of said drill collar, and wherein said means for determining a dip characteristic of said formations includes means for correlating at least one of said signals with a reversed version of itself to determine a dip direction of said formations.

41. The system as defined by claim 33, wherein said plurality of signals are stored during rotation of said drill collar, and wherein said step of determining a dip characteristic of said formations includes correlating at least one of said signals with at least another of said signals to determine an angular offset therebetween, and determining the dip angle of said formations from said angular offset.

42. The system as defined by claim 35, wherein said plurality of signals are stored during rotation of said drill collar, and wherein said step of determining a dip characteristic of said formations includes correlating at least one of said signals with at least another of said signals to determine an angular offset therebetween, and determining the dip angle of said formations from said angular offset.

43. The system as defined by claim 40, wherein said step of determining a dip characteristic of said formations further includes correlating said at least one of said signals with at least another of said signals to determine the dip angle of said formations.

44. The system as defined by claim 41, wherein said means for determining a dip characteristic of said formations includes means for correlating at least one of said signals with a reversed version of itself to determine a dip direction of said formations and to determine the up-dip direction of said formations.

45. The system as defined by claim 35, wherein said signals represent resistivity of the formations adjacent respective electrodes.

46. The system as defined by claim 33, wherein said means for determining a dip characteristic of said formations includes means for correlating signals generated at a plurality of different rotational orientations of said drill collar.

47. The system as defined by claim 46, wherein said plurality of different rotational orientations comprises at least three different rotational orientations.

48. The system as defined by claim 33, wherein said plurality of transducers comprises several transducers.

49. The system as defined by claim 33, further comprising:
a further plurality of transducers mounted on said drill collar and azimuthally offset from said first-mentioned plurality of transducers, said further transducers having respectively different locations along the longitudinal direction of said drill collar;
means coupled with said further transducers for generating a further plurality of signals from measurements taken at respective ones of said further plurality of transducers;
and wherein said means for determining a dip characteristic of said formations is operative to determine said characteristic from s id further plurality of signals.

50. The system as defined by claim 35, further comprising:
a further plurality of transducers mounted on said drill collar and azimuthally offset from said first-mentioned plurality of transducers, said further transducers having respectively different locations along the longitudinal direction of said drill collar;
means coupled with said further transducers for generating a further plurality of signals from measurements taken at respective ones of said further plurality of transducers;
and wherein said means for determinig a dip characteristic of said formations is operative to determine said characteristic from said further plurality of signals.

51. The system as defined by claim 50, wherein said further plurality of transducers comprise electrodes.

52. The system as defined by claim 49, wherein said means for determining a dip characteristic of said formations includes means for correlating said signals and said further signals.

53. Apparatus for determining a dip characteristic of formations surrounding a borehole, comprising:
an elongated device moveable through the borehole;
an array of several transducers mounted in said device, said transducers having respectively different locations along the longitudinal direction of the borehole;
means for producing indications of the relative rotational orientation of said device with respect to the longitudinal direction of the borehole;
means coupled to with said transducers for generating signals from measurements taken at respective ones of said transducers; and
means for determining a dip characteristic of said formations from said signals and said orientation indications.

54. Apparatus as defined by claim 53, further comprising:
a plurality of further arrays of transducers mounted in said device, each of said further arrays including several transducers at respectively different locations along the longitudinal direction of said device, said arrays being at different azimuthal orientations with respect to the longitudinal axis of said device;
means coupled with the transducers of said further arrays for generating signals from measurements taken at respective ones of said transducers of said further arrays;
and wherein said means for determining a dip characteristic of said formations is operative to determine said characteristic from signals from all of said arrays.

55. Apparatus as defined by claim 54, wherein said means for determining a dip characteristic of formations comprises means for determining the dip angle of said formations.

56. Apparatus as defined by claim 54, wherein said means for determining a dip characteristic of formations comprises means for determining the dip direction said formations.

57. Apparatus as defined by claim 53, wherein said transducers comprise electrodes.

58. Apparatus as defined by claim 53, where said device includes a metal body, and further comprising a toroidal coil antenna disposed on said body, and means for energizing said toroidal coil antenna to induce a current which travels in a path that includes said body and said formations; and wherein said means for generating signals comprise means for measuring the electrical effect of said current on said electrodes.

59. Apparatus as defined by claim 53, where said device includes a metal body, and further comprising a toroidal coil antenna disposed on said body, and means for energizing said toroidal coil antenna to induce a current which travels in a path that includes said body and said formations; and wherein said means for generating signals comprise means for measuring the electrical effect of said current on said electrodes.

60. Apparatus as defined by claim 58, wherein said toroidal coil antenna is disposed on said body toward one end of said array, and further comprising a second toroidal coil antenna disposed on said body toward the other end of said array, and wherein said means for energizing said toroidal coil antenna is operative to energize said second toroidal coil antenna in phase opposition with said toroidal coil antenna.

61. Apparatus as defined by claim 59, wherein said toroidal coil antenna is disposed on said body toward one end of said array, and further comprising a second toroidal coil antenna disposed on said body toward the other end of said array, and wherein said means for energizing said toroidal coil antenna is operative to energize said second toroidal coil antenna in phase opposition with said toroidal coil antenna.

62. A method for determining a dip characteristic of formations surrounding a borehole being drilled in the earth by a drill bit at the end of a drill string, comprising the steps of:
providing an array of several transducers on a drill collar in said drill string, said transducers having respectively different locations along the longitudinal direction of said drill collar;
producing indications of the relative rotational orientation of said drill collar;
generating signals from measurements taken at respective ones of said transducers; and
determining a dip characteristic of said formations from said signals and said orientation indications.

63. The method as defined by claim 62, wherein said step of generating said signals comprises generating signals at at least three different rotational orientations of said drill collar.

64. The method as defined by claim 62, wherein said step of providing an array of transducers comprises providing a plurality of said arrays of transducers at different rotational positions on said drill collar, and wherein said determination of a dip characteristic is a determination from signals from said plurality of arrays.

65. The method as defined by claim 62, wherein said step of determining a dip characteristic of formations comprises determining the dip angle of said formations.

66. The method as defined by claim 62, wherein said step of determining a dip characteristic of formations further comprises determining the dip direction of said formations.

67. The method as defined by claim 65, wherein said step of determining a dip characteristic of formations further comprises determining the dip direction of said formations.

68. The method as defined by claim 62, wherein said step of providing an array of transducers comprises providing an array of electrodes.

69. The method as defined by claim 62, wherein said step of providing an array of transducers comprises providing an array of electrodes, and further comprising providing a toroidal coil antenna on said drill collar, and wherein said step of generating signals includes measuring the current at the electrodes.

70. The method as defined by claim 67, wherein said step of providing an array of transducers comprises providing an array of electrodes, and further comprising providing a toroidal coil antenna on said drill collar, and wherein said step of generating signals includes measuring the current at the electrodes.

71. The method as defined by claim 68, wherein said step of providing an array of electrodes comprises providing said electrodes in a stabilizer blade on said drill collar.

72. A method for determining a dip characteristic of formations surrounding a borehole being drilled in the earth by a drill bit at the end of a drill string, comprising the steps of:
providing first and second spaced apart transducers on said drill string, said transducers having respectively different locations along the longitudinal direction of said drill string;
producing indications of the relative rotational orientation of the drill string in the region where said transducers are located;
generating first and second signals from measurements taken at said first and second transducers, respectively; and
determining a dip characteristic of said formations from said first and second signals and said orientation indications.

73. The method as defined by claim 72, wherein said step of determining a dip characteristic of said formations comprises determining the dip direction of said formations.

74. The method as defined by claim 72, wherein said step of determining a dip characteristic of said formations comprises determining the dip angle of said formations.

75. The method as defined by claim 73, wherein said step of determining a dip characteristic of said formations comprises determining the dip angle of said formations.

76. The method as defined by claim 72, wherein said step of providing first and second transducers comprises providing first and second electrodes, and wherein said signals are representative of the resistivity of the formations adjacent the respective electrodes.

77. The method as defined by claim 72, wherein said first and second signals are generated during rotation of said transducers, and wherein said step of determining a dip characteristic of said formations includes correlating at least one of said signals with a reversed version of itself to determine a dip direction of said formations.

78. The method as defined by claim 76, wherein said first and second signals are generated during rotation of said electrodes, and wherein said step of determining a dip characteristic of said formations includes correlating at least one of said signals with a reversed version of itself to determine a dip direction of said formations.

79. The method as defined by claim 72, wherein said first and second signals are generated during rotation of said transducers, and wherein said step of determining a dip characteristic of said formations includes correlating said first and second signals to determine an angular offset therebetween and determining the dip angle of said formations from said angular offset.

80. The method as defined by claim 77, wherein said step of determining a dip characteristic of said formations includes correlating said first and second signals to determine an angular offset therebetween and determining the dip angle of said formations from said angular offset.

81. The method as defined by claim 79, wherein said correlating of said first and second signals comprises correlating fractional portions of said signals, the fractions thereof depending on the dip angle of said formations.

82. The method as defined by claim 72, wherein said step of providing said first and second transducers on said drill string comprises providing said first and second transducers on a stabilizer blade on said drill string.

83. The method as defined by claim 74, wherein said step of providing said first and second electrodes comprises providing said electrodes on a stabilizer blade on said drill string.

84. A method for determining a dip characteristic of formations surrounding a borehole being drilled in the earth by a drill bit at the end of a drill string, comprising the steps of:
providing an array of several transducers on a drill collar in said drill string, said transducers having respectively different locations along the longitudinal direction of said drill collar;

storing first measurement signals taken with said transducers at a first longitudinal position of said array;

storing second measurement signals taken at a second longitudinal position of said array.

correlating said first and second measurement signals, and determining the longitudinal offset between said signals from said correlation;

generating appended signals by combining said first and second measurement signals with a longitudinal overlap that depends on said offset; and determining said dip characteristic from said appended signals.

85. The method as defined by claim 84, wherein said first measurement signals and said second measurement signals are taken with said array at substantially the same azimuthal orientation with respect to the borehole axis.

86. The method as defined by claim 84, wherein a plurality of said appended signals are generated for respective different azimuthal orientations in said borehole, and wherein said step of determining a dip characteristic of said formations comprises determining said dip characteristic from said plurality of appended measurement signals.

* * * * *